(12) United States Patent
Koo et al.

(10) Patent No.: US 12,256,103 B2
(45) Date of Patent: *Mar. 18, 2025

(54) IMAGE CODING METHOD BASED ON SECONDARY TRANSFORM AND DEVICE THEREFOR

(71) Applicant: LG Electronics Inc., Seoul (KR)

(72) Inventors: Moonmo Koo, Seoul (KR); Jaehyun Lim, Seoul (KR); Seunghwan Kim, Seoul (KR); Mehdi Salehifar, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/388,108

(22) Filed: Nov. 8, 2023

(65) Prior Publication Data

US 2024/0098305 A1 Mar. 21, 2024

Related U.S. Application Data

(63) Continuation of application No. 17/743,187, filed on May 12, 2022, now Pat. No. 11,856,224, which is a
(Continued)

(51) Int. Cl.
*H04N 19/61* (2014.01)
*H04N 19/11* (2014.01)
(Continued)

(52) U.S. Cl.
CPC ............. *H04N 19/61* (2014.11); *H04N 19/11* (2014.11); *H04N 19/122* (2014.11);
(Continued)

(58) Field of Classification Search
CPC ...... H04N 19/61; H04N 19/11; H04N 19/122; H04N 19/124; H04N 19/129;
(Continued)

(56) References Cited

U.S. PATENT DOCUMENTS 12,058,374 B2 * 8/2024 Koo ..................... H04N 19/122
12,143,585 B2 * 11/2024 Koo ..................... H04N 19/176
(Continued)

FOREIGN PATENT DOCUMENTS

KR 10-2018-0063186 A 6/2018

OTHER PUBLICATIONS

Koo et al., "Description of SDR video coding technology proposal by LG Electronics," JVET-J0017-v1, Joint Video Experts Team (JVET) of ITU-T SG 16 WP 3 and ISO/IEC JTC 1/SC 29/WG 11, 10th Meeting, San Diego, CA, Apr. 10-20, 2018, 71 pages.
(Continued)

*Primary Examiner* — Jose L Couso
(74) *Attorney, Agent, or Firm* — Fish & Richardson P.C.

(57) ABSTRACT

An image decoding method according to the present specification comprises the steps of: deriving transform coefficients through inverse quantization on the basis of quantized transform coefficient for a target block; deriving modified transform coefficients on the basis of inverse reduced secondary transform (RST) of the transform coefficients; and generating a reconstructed picture on the basis of residual samples for the target block on the basis of an inverse primary transform of the modified transform coefficients, wherein the step of deriving the modified transform coefficients is characterized in deriving 16 modified transform coefficients by applying a transform kernel matrix to 8 transform coefficients in a 4×4 region of the target block.

3 Claims, 21 Drawing Sheets

Related U.S. Application Data continuation of application No. 17/337,148, filed on Jun. 2, 2021, now Pat. No. 11,425,421, which is a continuation of application No. PCT/KR2020/000035, filed on Jan. 2, 2020.

(60) Provisional application No. 62/787,356, filed on Jan. 1, 2019.

(51) Int. Cl.
| | |
|---|---|
| *H04N 19/122* | (2014.01) |
| *H04N 19/124* | (2014.01) |
| *H04N 19/129* | (2014.01) |
| *H04N 19/132* | (2014.01) |
| *H04N 19/159* | (2014.01) |
| *H04N 19/176* | (2014.01) |
| *H04N 19/18* | (2014.01) |

(52) U.S. Cl.
CPC ......... *H04N 19/124* (2014.11); *H04N 19/129* (2014.11); *H04N 19/132* (2014.11); *H04N 19/159* (2014.11); *H04N 19/176* (2014.11); *H04N 19/18* (2014.11)

(58) Field of Classification Search
CPC .. H04N 19/132; H04N 19/159; H04N 19/176; H04N 19/18; H04N 19/625; H04N 19/60; H04N 19/12; H04N 19/86; G06K 19/07767; G06K 19/07771; G06F 17/16; G06F 17/147; G06T 9/007; G06T 2207/20048; G06T 2207/20052; G06T 2207/20056

See application file for complete search history.

(56) References Cited

U.S. PATENT DOCUMENTS

| | | | | |
|---|---|---|---|---|
| 2012/0201303 | A1* | 8/2012 | Yang | H04N 19/147 375/240.14 |
| 2016/0044323 | A1* | 2/2016 | Sasaki | H04N 19/86 382/233 |
| 2018/0176556 | A1* | 6/2018 | Zhao | H04N 19/176 |
| 2019/0149822 | A1* | 5/2019 | Kim | H04N 19/70 375/240.02 |
| 2019/0306536 | A1* | 10/2019 | Lim | H04N 19/146 |
| 2021/0160487 | A1* | 5/2021 | Kim | H04N 19/593 |

OTHER PUBLICATIONS

Office Action in Korean Appln. No. 10-2021-7014537, mailed on Jul. 17, 2024, 14 pages (with English translation).

* cited by examiner

FIG. 6
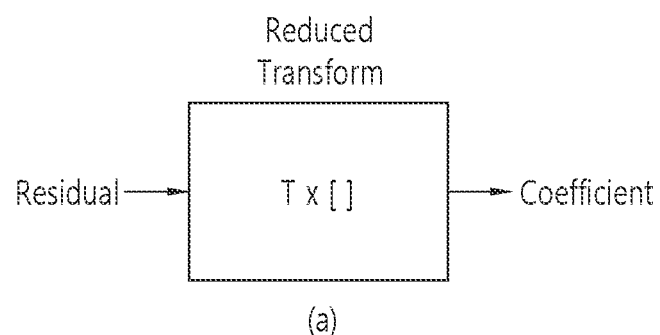
(a)
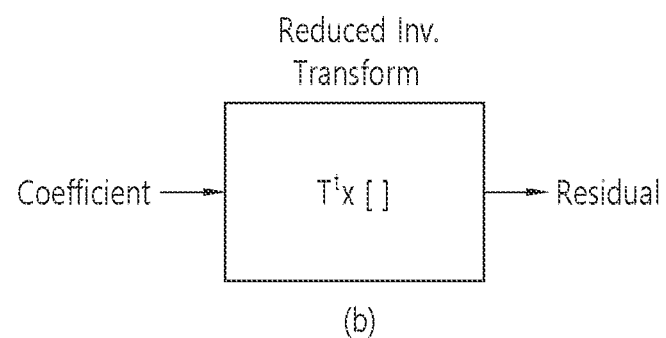
(b)

FIG. 12
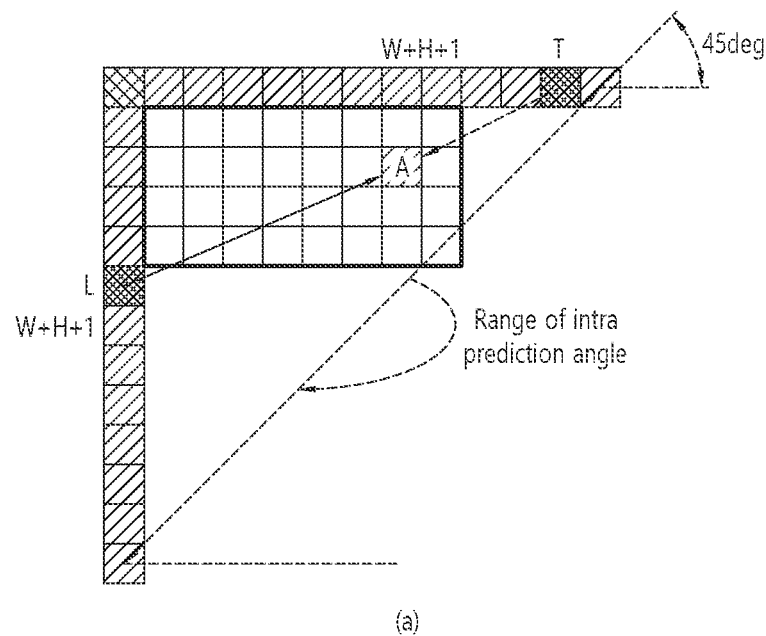
(a)
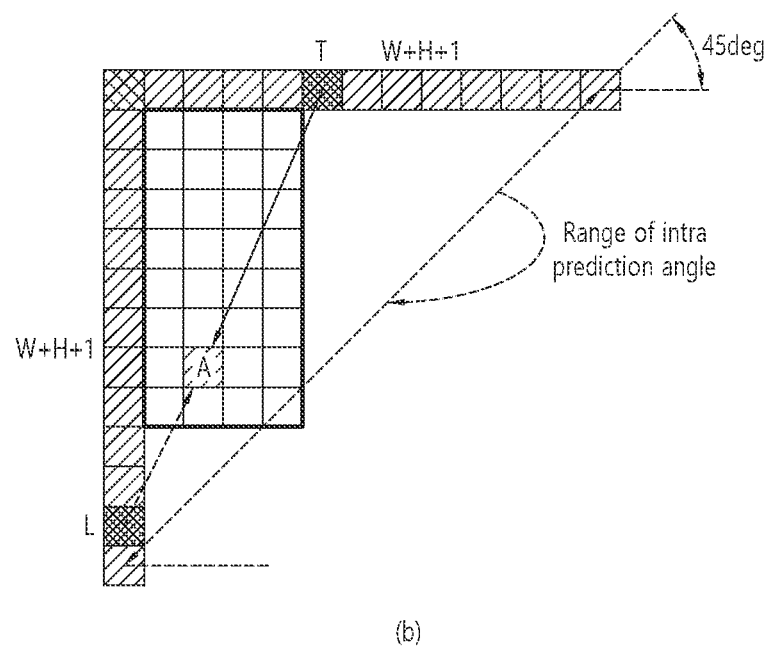
(b)

IMAGE CODING METHOD BASED ON SECONDARY TRANSFORM AND DEVICE THEREFOR

CROSS-REFERENCE TO RELATED APPLICATIONS

This application is a continuation of U.S. application Ser. No. 17/743,187, filed on May 12, 2022, which is a continuation of U.S. application Ser. No. 17/337,148, filed on Jun. 2, 2021, now U.S. Pat. No. 11,425,421, which is a continuation pursuant to 35 U.S.C. § 119(e) of International Application PCT/KR2020/000035, with an international filing date of Jan. 2, 2020, which claims the benefit of U.S. Provisional Patent Application No. 62/787,356, filed on Jan. 1, 2019, the contents of which are hereby incorporated by reference herein in their entirety.

REFERENCE TO A "SEQUENCE LISTING," A TABLE, OR A COMPUTER PROGRAM LISTING APPENDIX SUBMITTED

This application contains a Computer Program Listing Appendix that has been submitted electronically as an ASCII text file named Appendix_tables8-9.txt. The ASCII text file, created on Sep. 8, 2023, is 30 kilobytes/bytes in size. The material in the ASCII text file is hereby incorporated by reference in its entirety.

TECHNICAL FIELD

The present disclosure relates generally to an image coding technology and, more particularly, to an image coding method based on a transform in an image coding system and an apparatus therefor.

RELATED ART

Nowadays, the demand for high-resolution and high-quality images/videos such as 4K, 8K or more ultra high definition (UHD) images/videos has been increasing in various fields. As the image/video data becomes higher resolution and higher quality, the transmitted information amount or bit amount increases as compared to the conventional image data. Therefore, when image data is transmitted using a medium such as a conventional wired/wireless broadband line or image/video data is stored using an existing storage medium, the transmission cost and the storage cost thereof are increased.

Further, nowadays, the interest and demand for immersive media such as virtual reality (VR), artificial reality (AR) content or hologram, or the like is increasing, and broadcasting for images/videos having image features different from those of real images, such as a game image is increasing.

Accordingly, there is a need for a highly efficient image/video compression technique for effectively compressing and transmitting or storing, and reproducing information of high resolution and high quality images/videos having various features as described above.

SUMMARY

A technical aspect of the present disclosure is to provide a method and an apparatus for increasing image coding efficiency.

Another technical aspect of the present disclosure is to provide a method and an apparatus for increasing transform efficiency.

Still another technical aspect of the present disclosure is to provide an image coding method and an image coding apparatus which are based on a reduced secondary transform (RST).

Yet another technical aspect of the present disclosure is to provide a method and an apparatus for increasing the efficiency of a secondary transform by changing the array of transform coefficients according to an intra prediction mode.

Still another technical aspect of the present disclosure is to provide an image coding method and an image coding apparatus for increasing the efficiency of a secondary transform by optimizing the transformation kernel matrix applied to the secondary transform.

Still another technical aspect of the present disclosure is to provide an image coding method and an image coding apparatus which are based on a transform set for increasing coding efficiency.

According to an embodiment of the present disclosure, there is provided an image decoding method performed by a decoding apparatus. The method may include: deriving transform coefficients through dequantization based on quantized transform coefficients for a target block; deriving modified transform coefficients based on an inverse reduced secondary transform (RST) using a preset transform kernel matrix for the transform coefficients; deriving residual samples for the target block based on an inverse primary transform for the modified transform coefficients; and generating a reconstructed picture based on the residual samples for the target block, wherein the deriving the modified transform coefficients derive 16 of the modified transform coefficients by applying the transform kernel matrix to 8 of the transform coefficients in a 4×4 region of the target block.

When performing a matrix operation between the transform coefficients of the 4×4 region and the transform kernel matrix, 8 of the transform coefficients are one-dimensionally arranged according to a forward diagonal scanning order.

The transform coefficients arranged one-dimensional are two-dimensionally arranged in the 4×4 region according to a row-first direction or a column-first direction corresponding to the intra prediction mode applied to the target block after the matrix operation with the transform kernel matrix.

According to another embodiment of the present disclosure, there is provided a decoding apparatus for performing image decoding. The decoding apparatus may include: an entropy decoder to derive quantized transform coefficients for a target block and information on prediction from a bitstream; a predictor to generate a prediction sample for the target block based on the information on prediction; a dequantizer to derive transform coefficients through dequantization based on the quantized transform coefficients for the target block; an inverse transformer to include an inverse reduced secondary transformer (RST) that derives modified transform coefficients based on inverse RST of the transform coefficients and an inverse primary transformer that derives residual samples for the target block based on first inverse transform of the modified transform coefficients; and an adder to generate reconstructed samples based on the residual samples and the prediction samples, wherein the inverse reduced secondary transformer derive 16 modified transform coefficients by applying the transform kernel matrix to 8 of the transform coefficients in a 4×4 region of the target block.

According to still another embodiment of the present disclosure, there is provided an image encoding method performed by an encoding apparatus. The method may include: deriving prediction samples based on an intra prediction mode applied to a target block; deriving residual samples for the target block based on the prediction samples; deriving transform coefficients for the target block based on a primary transform for the residual samples; deriving modified transform coefficients based on a reduced secondary transform (RST) for the transform coefficients; and deriving quantized transform coefficients by performing quantization based on the modified transform coefficients, wherein the deriving the modified transform coefficients derive 8 modified transform coefficients by applying the transform kernel matrix to 16 transform coefficients in a 4×4 region of the target block.

According to yet another embodiment of the present disclosure, there may be provided a digital storage medium that stores image data including encoded image information and a bitstream generated according to an image encoding method performed by an encoding apparatus.

According to still another embodiment of the present disclosure, there may be provided a digital storage medium that stores image data including encoded image information and a bitstream to cause a decoding apparatus to perform the image decoding method.

According to the present disclosure, it is possible to increase overall image/video compression efficiency.

According to the present disclosure, it is possible to increase the efficiency of a secondary transform by changing the array of transform coefficients according to an intra prediction mode.

According to the present disclosure, it is possible to increase image coding efficiency by performing image coding based on a transform set.

According to the present disclosure, it is possible to increase the efficiency of a secondary transform by optimizing the transformation kernel matrix applied to the secondary transform.

BRIEF DESCRIPTION OF THE DRAWINGS

FIG. 6 is a diagram illustrating an RST according to an embodiment of the present disclosure.

FIG. 12 is a diagram for explaining an intra prediction for a non-square block according to an embodiment of the present disclosure.

DESCRIPTION OF EXEMPLARY EMBODIMENTS

Figure 1:
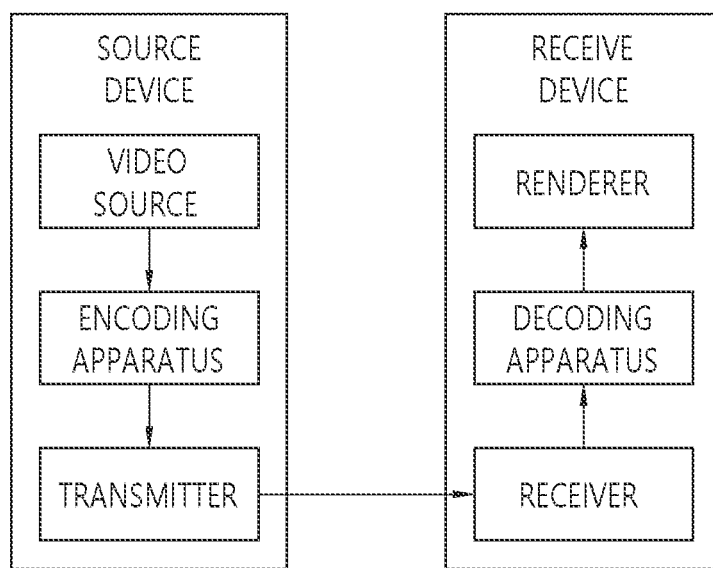
FIG. 1 schematically illustrates an example of a video/image coding system to which the present disclosure is applicable.

While the present disclosure may be susceptible to various modifications and include various embodiments, specific embodiments thereof have been shown in the drawings by way of example and will now be described in detail. However, this is not intended to limit the present disclosure to the specific embodiments disclosed herein. The terminology used herein is for the purpose of describing specific embodiments only, and is not intended to limit technical idea of the present disclosure. The singular forms may include the plural forms unless the context clearly indicates otherwise. The terms such as "include" and "have" are intended to indicate that features, numbers, steps, operations, elements, components, or combinations thereof used in the following description exist, and thus should not be understood as that the possibility of existence or addition of one or more different features, numbers, steps, operations, elements, components, or combinations thereof is excluded in advance.

Meanwhile, each component on the drawings described herein is illustrated independently for convenience of description as to characteristic functions different from each other, and however, it is not meant that each component is realized by a separate hardware or software. For example, any two or more of these components may be combined to form a single component, and any single component may be divided into plural components. The embodiments in which components are combined and/or divided will belong to the scope of the patent right of the present disclosure as long as they do not depart from the essence of the present disclosure.

Hereinafter, preferred embodiments of the present disclosure will be explained in more detail while referring to the attached drawings. In addition, the same reference signs are used for the same components on the drawings, and repeated descriptions for the same components will be omitted.

This document relates to video/image coding. For example, the method/example disclosed in this document may relate to a VVC (Versatile Video Coding) standard (ITU-T Rec. H.266), a next-generation video/image coding standard after VVC, or other video coding related standards (e.g., HEVC (High Efficiency Video Coding) standard (ITU-T Rec. H.265), EVC (essential video coding) standard, AVS2 standard, etc.).

In this document, a variety of embodiments relating to video/image coding may be provided, and, unless specified to the contrary, the embodiments may be combined to each other and be performed.

In this document, a video may mean a set of a series of images over time. Generally a picture means a unit representing an image at a specific time zone, and a slice/tile is a unit constituting a part of the picture. The slice/tile may include one or more coding tree units (CTUs). One picture may be constituted by one or more slices/tiles. One picture may be constituted by one or more tile groups. One tile group may include one or more tiles.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component. Alternatively, the sample may refer to a pixel value in the spatial domain, or when this pixel value is converted to the frequency domain, it may refer to a transform coefficient in the frequency domain.

A unit may represent the basic unit of image processing. The unit may include at least one of a specific region and information related to the region. One unit may include one luma block and two chroma (e.g., cb, cr) blocks. The unit and a term such as a block, an area, or the like may be used in place of each other according to circumstances. In a general case, an M×N block may include a set (or an array) of samples (or sample arrays) or transform coefficients consisting of M columns and N rows.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may include 1) only A, 2) only B, and/or 3) both A and B. In other words, the term "or" in this document should be interpreted to indicate "additionally or alternatively."

FIG. 1 schematically illustrates an example of a video/image coding system to which the present disclosure is applicable.

Referring to FIG. 1, the video/image coding system may include a first device (source device) and a second device (receive device). The source device may deliver encoded video/image information or data in the form of a file or streaming to the receive device via a digital storage medium or network.

The source device may include a video source, an encoding apparatus, and a transmitter. The receive device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may obtain a video/image through a process of capturing, synthesizing, or generating a video/image. The video source may include a video/image capture device and/or a video/image generating device. The video/image capture device may include, for example, one or more cameras, video/image archives including previously captured video/images, or the like. The video/image generating device may include, for example, a computer, a tablet and a smartphone, and may (electronically) generate a video/image. For example, a virtual video/image may be generated through a computer or the like. In this case, the video/image capturing process may be replaced by a process of generating related data.

The encoding apparatus may encode an input video/image. The encoding apparatus may perform a series of procedures such as prediction, transform, and quantization for compression and coding efficiency. The encoded data (encoded video/image information) may be output in the form of a bitstream.

The transmitter may transmit the encoded video/image information or data output in the form of a bitstream to the receiver of the receive device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format, and may include an element for transmission through a broadcast/communication network. The receiver may receive/extract the bitstream and transmit the received/extracted bitstream to the decoding apparatus.

The decoding apparatus may decode a video/image by performing a series of procedures such as dequantization, inverse transform, prediction, and the like corresponding to the operation of the encoding apparatus.

The renderer may render the decoded video/image. The rendered video/image may be displayed through the display.

Figure 2:
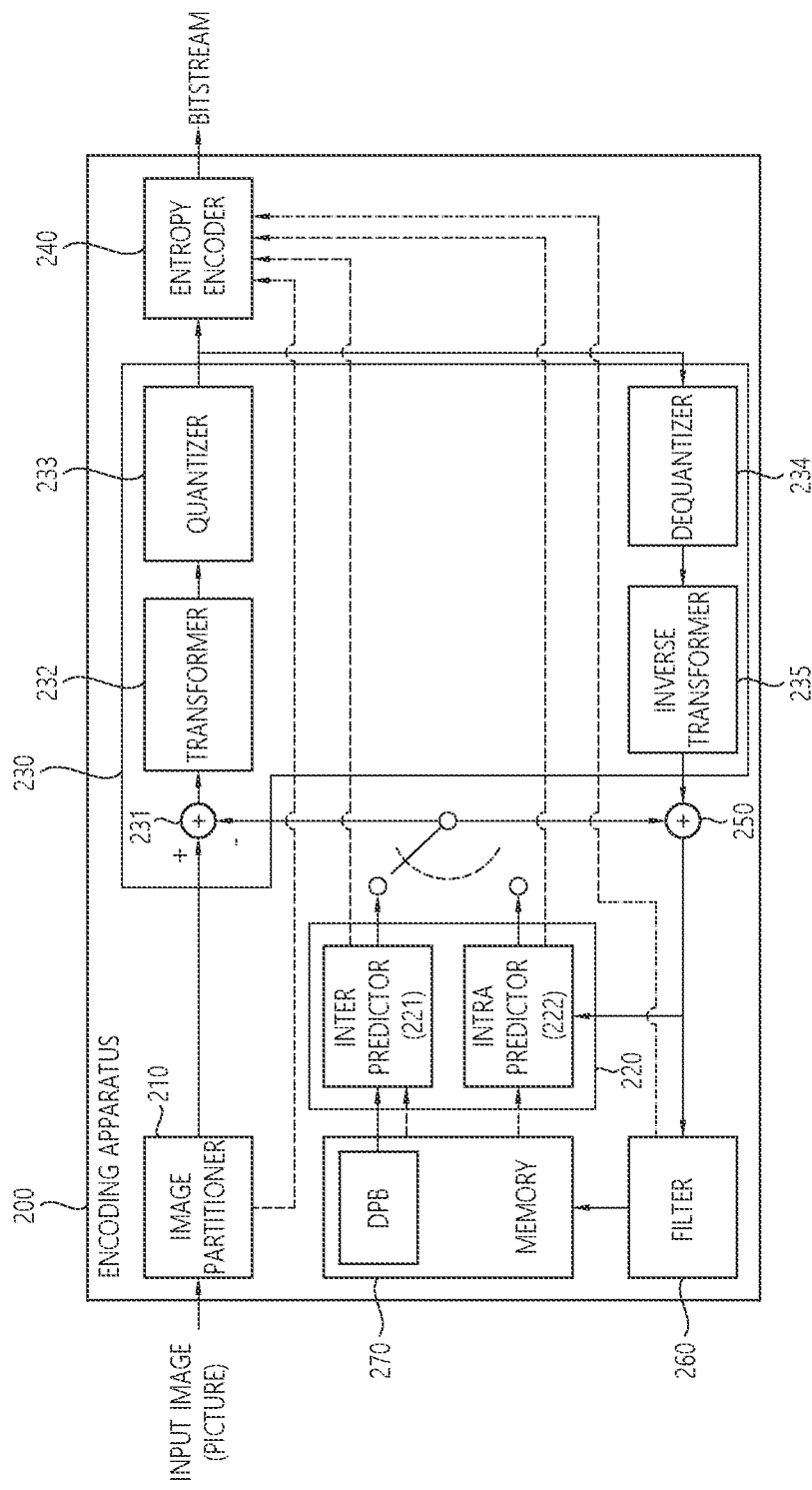
FIG. 2 is a diagram schematically illustrating a configuration of a video/image encoding apparatus to which the present disclosure is applicable.

FIG. 2 is a diagram schematically illustrating a configuration of a video/image encoding apparatus to which the present disclosure is applicable. Hereinafter, what is referred to as the video encoding apparatus may include an image encoding apparatus.

Referring to FIG. 2, the encoding apparatus 200 may include an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be constituted by one or more hardware components (e.g., encoder chipsets or processors) according to an embodiment. Further, the memory 270 may include a decoded picture buffer (DPB), and may be constituted by a digital storage medium. The hardware component may further include the memory 270 as an internal/external component.

The image partitioner 210 may partition an input image (or a picture or a frame) input to the encoding apparatus 200 into one or more processing units. As one example, the processing unit may be called a coding unit (CU). In this case, starting with a coding tree unit (CTU) or the largest coding unit (LCU), the coding unit may be recursively partitioned according to the Quad-tree binary-tree ternary-tree (QTBTTT) structure. For example, one coding unit may be divided into a plurality of coding units of a deeper depth based on the quad-tree structure, the binary-tree structure, and/or the ternary structure. In this case, for example, the quad-tree structure may be applied first and the binary-tree structure and/or the ternary structure may be applied later. Alternatively, the binary-tree structure may be applied first. The coding procedure according to the present disclosure may be performed based on the final coding unit which is not further partitioned. In this case, the maximum coding unit may be used directly as a final coding unit based on coding efficiency according to the image characteristic. Alternatively, the coding unit may be recursively partitioned into coding units of a further deeper depth as needed, so that the coding unit of an optimal size may be used as a final coding unit. Here, the coding procedure may include procedures such as prediction, transform, and reconstruction, which will be described later. As another example, the processing unit may further include a prediction unit (PU) or a transform unit (TU). In this case, the prediction unit and the transform unit may be split or partitioned from the above-described final coding unit. The prediction unit may be a unit of sample prediction, and the transform unit may be a unit for deriving a transform coefficient and/or a unit for deriving a residual signal from a transform coefficient.

The unit and a term such as a block, an area, or the like may be used in place of each other according to circumstances. In a general case, an M×N block may represent a set of samples or transform coefficients consisting of M columns and N rows. The sample may generally represent a pixel or a value of a pixel, and may represent only a pixel/pixel value of a luma component, or only a pixel/pixel value of a chroma component. The sample may be used as a term corresponding to a pixel or a pel of one picture (or image).

The subtractor 231 subtracts a prediction signal (predicted block, prediction sample array) output from the inter predictor 221 or the intra predictor 222 from an input image signal (original block, original sample array) to generate a residual signal (residual block, residual sample array), and the generated residual signal is transmitted to the transformer 232. In this case, as shown, a unit which subtracts the prediction signal (predicted block, prediction sample array) from the input image signal (original block, original sample array) in the encoder 200 may be called the subtractor 231. The predictor may perform prediction on a processing target block (hereinafter, referred to as 'current block'), and may generate a predicted block including prediction samples for the current block. The predictor may determine whether intra prediction or inter prediction is applied on a current block or CU basis. As discussed later in the description of each prediction mode, the predictor may generate various information relating to prediction, such as prediction mode information, and transmit the generated information to the entropy encoder 240. The information on the prediction may be encoded in the entropy encoder 240 and output in the form of a bitstream.

The intra predictor 222 may predict the current block by referring to samples in the current picture. The referred samples may be located in the neighbor of or apart from the current block according to the prediction mode. In the intra prediction, prediction modes may include a plurality of non-directional modes and a plurality of directional modes. The non-directional modes may include, for example, a DC mode and a planar mode. The directional mode may include, for example, 33 directional prediction modes or 65 directional prediction modes according to the degree of detail of the prediction direction. However, this is merely an example, and more or less directional prediction modes may be used depending on a setting. The intra predictor 222 may determine the prediction mode applied to the current block by using the prediction mode applied to the neighboring block.

The inter predictor 221 may derive a predicted block for the current block based on a reference block (reference sample array) specified by a motion vector on a reference picture. At this time, in order to reduce the amount of motion information transmitted in the inter prediction mode, the motion information may be predicted on a block, subblock, or sample basis based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block existing in the current picture and a temporal neighboring block existing in the reference picture. The reference picture including the reference block and the reference picture including the temporal neighboring block may be same to each other or different from each other. The temporal neighboring block may be called a collocated reference block, a collocated CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion information prediction (motion vector prediction, MVP) mode, the motion vector of the neighboring block may be used as a motion vector predictor and the motion vector of the current block may be indicated by signaling a motion vector difference.

The predictor 220 may generate a prediction signal based on various prediction methods. For example, the predictor may apply intra prediction or inter prediction for prediction on one block, and, as well, may apply intra prediction and inter prediction at the same time. This may be called combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). Although the IBC basically performs prediction in a current block, it can be performed similarly to inter prediction in that it derives a reference block in a current block. That is, the IBC may use at least one of inter prediction techniques described in the present disclosure.

The prediction signal generated through the inter predictor 221 and/or the intra predictor 222 may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a Karhunen-Loeve transform (KLT), a graph-based transform (GBT), or a conditionally non-linear transform (CNT). Here, the GBT means transform obtained from a graph when relationship information between pixels is represented by the graph. The CNT refers to transform obtained based on a prediction signal generated using all previously reconstructed pixels. In addition, the transform process may be applied to square pixel blocks having the same size or may be applied to blocks having a variable size rather than the square one.

The quantizer 233 may quantize the transform coefficients and transmit them to the entropy encoder 240, and the entropy encoder 240 may encode the quantized signal (information on the quantized transform coefficients) and output the encoded signal in a bitstream. The information on the quantized transform coefficients may be referred to as residual information. The quantizer 233 may rearrange block type quantized transform coefficients into a one-dimensional vector form based on a coefficient scan order, and generate information on the quantized transform coefficients based on the quantized transform coefficients of the one-dimensional vector form. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (e.g. values of syntax elements, etc.) together or separately. Encoded information (e.g., encoded video/image information) may be transmitted or stored on a unit basis of a network abstraction layer (NAL) in the form of a bitstream. The video/image information may further include information on various parameter sets such as an adaptation parameter set (APS), a picture parameter set (PPS), a sequence parameter set (SPS), a video parameter set (VPS) or the like. Further, the video/image information may further include general constraint information. In the present disclosure, information and/or syntax elements which are transmitted/signaled to the decoding apparatus from the encoding apparatus may be included in video/image information. The video/image information may be encoded through the above-described encoding procedure and included in the bitstream. The bitstream may be transmitted through a network, or stored in a digital storage medium. Here, the network may include a broadcast network, a communication network and/or the like, and the digital storage medium may include various storage media such as USB, SD, CD, DVD, Blu-ray, HDD, SSD, and the like. A transmitter (not shown) which transmits a signal output from the entropy encoder 240 and/or a storage (not shown) which stores it may be configured as an internal/external element of the encoding apparatus 200, or the transmitter may be included in the entropy encoder 240.

Quantized transform coefficients output from the quantizer 233 may be used to generate a prediction signal. For example, by applying dequantization and inverse transform to quantized transform coefficients through the dequantizer 234 and the inverse transformer 235, the residual signal (residual block or residual samples) may be reconstructed. The adder 155 adds the reconstructed residual signal to a prediction signal output from the inter predictor 221 or the intra predictor 222, so that a reconstructed signal (reconstructed picture, reconstructed block, reconstructed sample array) may be generated. When there is no residual for a processing target block as in a case where the skip mode is applied, the predicted block may be used as a reconstructed block. The adder 250 may be called a reconstructor or a reconstructed block generator. The generated reconstructed signal may be used for intra prediction of a next processing target block in the current block, and as described later, may be used for inter prediction of a next picture through filtering.

Meanwhile, in the picture encoding and/or reconstructing process, luma mapping with chroma scaling (LMCS) may be applied.

The filter 260 may improve subjective/objective video quality by applying the filtering to the reconstructed signal. For example, the filter 260 may generate a modified reconstructed picture by applying various filtering methods to the reconstructed picture, and may store the modified reconstructed picture in the memory 270, specifically in the DPB of the memory 270. The various filtering methods may include, for example, deblocking filtering, sample adaptive offset, an adaptive loop filter, a bilateral filter or the like. As discussed later in the description of each filtering method, the filter 260 may generate various information relating to filtering, and transmit the generated information to the entropy encoder 240. The information on the filtering may be encoded in the entropy encoder 240 and output in the form of a bitstream.

The modified reconstructed picture which has been transmitted to the memory 270 may be used as a reference picture in the inter predictor 221. Through this, the encoding apparatus can avoid prediction mismatch in the encoding apparatus 100 and a decoding apparatus when the inter prediction is applied, and can also improve coding efficiency.

The memory 270 DPB may store the modified reconstructed picture in order to use it as a reference picture in the inter predictor 221. The memory 270 may store motion information of a block in the current picture, from which motion information has been derived (or encoded) and/or motion information of blocks in an already reconstructed picture. The stored motion information may be transmitted to the inter predictor 221 to be utilized as motion information of a neighboring block or motion information of a temporal neighboring block. The memory 270 may store reconstructed samples of reconstructed blocks in the current picture, and transmit them to the intra predictor 222.

Figure 3:
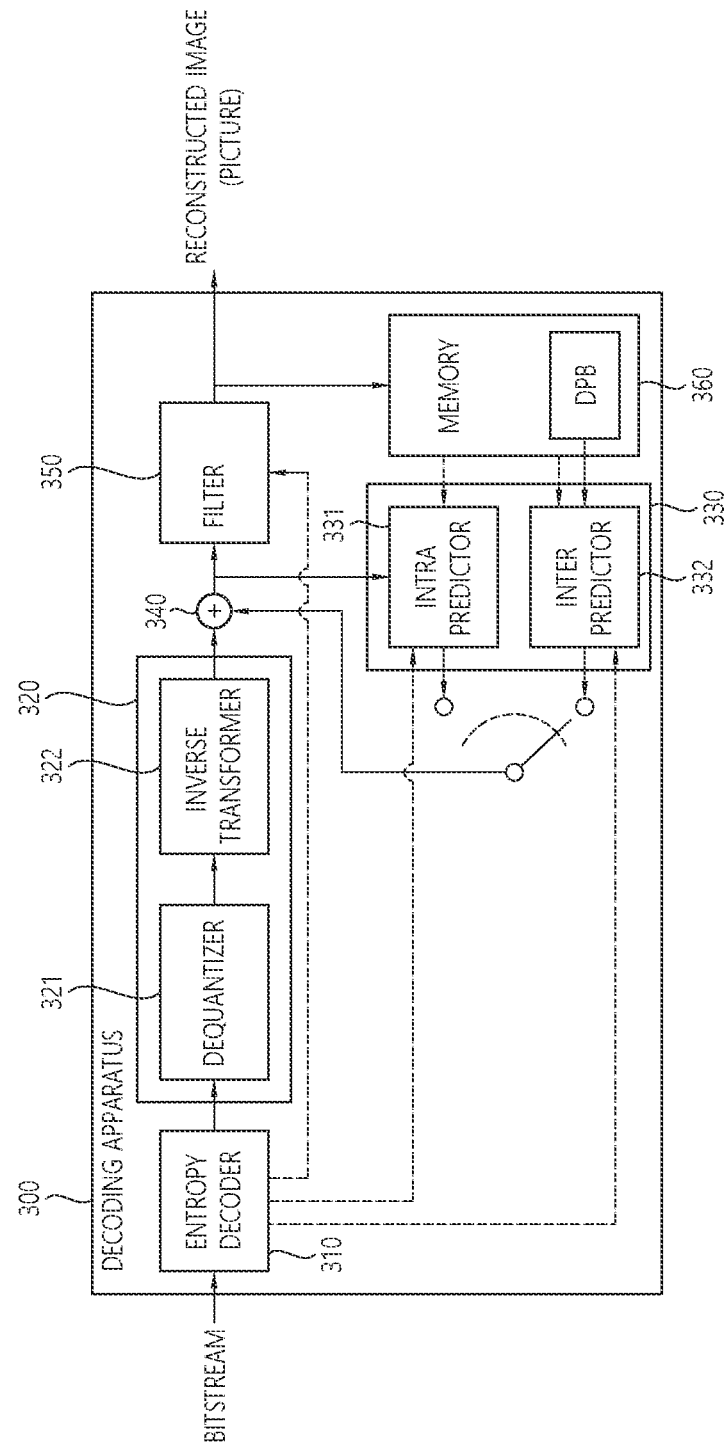
FIG. 3 is a diagram schematically illustrating a configuration of a video/image decoding apparatus to which the present disclosure is applicable.

FIG. 3 is a diagram schematically illustrating a configuration of a video/image decoding apparatus to which the present disclosure is applicable.

Referring to FIG. 3, the video decoding apparatus 300 may include an entropy decoder 310, a residual processor 320, a predictor 330, an adder 340, a filter 350 and a memory 360. The predictor 330 may include an inter predictor 331 and an intra predictor 332. The residual processor 320 may include a dequantizer 321 and an inverse transformer 321. The entropy decoder 310, the residual processor 320, the predictor 330, the adder 340, and the filter 350, which have been described above, may be constituted by one or more hardware components (e.g., decoder chipsets or processors) according to an embodiment. Further, the memory 360 may include a decoded picture buffer (DPB), and may be constituted by a digital storage medium. The hardware component may further include the memory 360 as an internal/external component.

When a bitstream including video/image information is input, the decoding apparatus 300 may reconstruct an image correspondingly to a process by which video/image information has been processed in the encoding apparatus of FIG. 2. For example, the decoding apparatus 300 may derive units/blocks based on information relating to block partition obtained from the bitstream. The decoding apparatus 300 may perform decoding by using a processing unit applied in the encoding apparatus. Therefore, the processing unit of decoding may be, for example, a coding unit, which may be partitioned along the quad-tree structure, the binary-tree structure, and/or the ternary-tree structure from a coding tree unit or a largest coding unit. One or more transform units may be derived from the coding unit. And, the reconstructed image signal decoded and output through the decoding apparatus 300 may be reproduced through a reproducer.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (e.g., video/image information) required for image reconstruction (or picture reconstruction). The video/image information may further include information on various parameter sets such as an adaptation parameter set (APS), a picture parameter set (PPS), a sequence parameter set (SPS), a video parameter set (VPS) or the like. Further, the video/image information may further include general constraint information. The decoding apparatus may decode a picture further based on information on the parameter set and/or the general constraint information. In the present disclosure, signaled/received information and/or syntax elements, which will be described later, may be decoded through the decoding procedure and be obtained from the bitstream. For example, the entropy decoder 310 may decode information in the bitstream based on a coding method such as exponential Golomb encoding, CAVLC, CABAC, or the like, and may output a value of a syntax element necessary for image reconstruction and quantized values of a transform coefficient regarding a residual. More specifically, a CABAC entropy decoding method may receive a bin corresponding to each syntax element in a bitstream, determine a context model using decoding target syntax element information and decoding information of neighboring and decoding target blocks, or information of symbol/bin decoded in a previous step, predict bin generation probability according to the determined context model and perform arithmetic decoding of the bin to generate a symbol corresponding to each syntax element value. Here, the CABAC entropy decoding method may update the context model using information of a symbol/bin decoded for a context model of the next symbol/bin after determination of the context model. Information on prediction among information decoded in the entropy decoder 310 may be provided to the predictor (inter predictor 332 and intra predictor 331), and residual values, that is, quantized transform coefficients, on which entropy decoding has been performed in the entropy decoder 310, and associated parameter information may be input to the residual processor 320. The residual processor 320 may derive a residual signal (residual block, residual samples, residual sample array). Further, information on filtering among information decoded in the entropy decoder 310 may be provided to the filter 350. Meanwhile, a receiver (not shown) which receives a signal output from the encoding apparatus may further constitute the decoding apparatus 300 as an internal/external element, and the receiver may be a component of the entropy decoder 310. Meanwhile, the decoding apparatus according to the present disclosure may be called a video/image/picture coding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may output transform coefficients by dequantizing the quantized transform coefficients. The dequantizer 321 may rearrange the quantized transform coefficients in the form of a two-dimensional block. In this case, the rearrangement may perform rearrangement based on an order of coefficient scanning which has been performed in the encoding apparatus. The dequantizer 321 may perform dequantization on the quantized transform coefficients using quantization parameter (e.g., quantization step size information), and obtain transform coefficients.

The deqauntizer 322 obtains a residual signal (residual block, residual sample array) by inverse transforming transform coefficients.

The predictor may perform prediction on the current block, and generate a predicted block including prediction samples for the current block. The predictor may determine whether intra prediction or inter prediction is applied to the current block based on the information on prediction output from the entropy decoder 310, and specifically may determine an intra/inter prediction mode.

The predictor may generate a prediction signal based on various prediction methods. For example, the predictor may apply intra prediction or inter prediction for prediction on one block, and, as well, may apply intra prediction and inter prediction at the same time. This may be called combined inter and intra prediction (CIIP). In addition, the predictor may perform intra block copy (IBC) for prediction on a block. The intra block copy may be used for content image/video coding of a game or the like, such as screen content coding (SCC). Although the IBC basically performs prediction in a current block, it can be performed similarly to inter prediction in that it derives a reference block in a current block. That is, the IBC may use at least one of inter prediction techniques described in the present disclosure.

The intra predictor 331 may predict the current block by referring to the samples in the current picture. The referred samples may be located in the neighbor of or apart from the current block according to the prediction mode. In the intra prediction, prediction modes may include a plurality of non-directional modes and a plurality of directional modes. The intra predictor 331 may determine the prediction mode applied to the current block by using the prediction mode applied to the neighboring block.

The inter predictor 332 may derive a predicted block for the current block based on a reference block (reference sample array) specified by a motion vector on a reference picture. At this time, in order to reduce the amount of motion information transmitted in the inter prediction mode, the motion information may be predicted on a block, subblock, or sample basis based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block existing in the current picture and a temporal neighboring block existing in the reference picture. For example, the inter predictor 332 may configure a motion information candidate list based on neighboring blocks, and derive a motion vector and/or a reference picture index of the current block based on received candidate selection information. Inter prediction may be performed based on various prediction modes, and the information on prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, prediction sample array) output from the predictor 330. When there is no residual for a processing target block as in a case where the skip mode is applied, the predicted block may be used as a reconstructed block.

The adder 340 may be called a reconstructor or a reconstructed block generator. The generated reconstructed signal may be used for intra prediction of a next processing target block in the current block, and as described later, may be output through filtering or be used for inter prediction of a next picture.

Meanwhile, in the picture decoding process, luma mapping with chroma scaling (LMCS) may be applied.

The filter 350 may improve subjective/objective video quality by applying the filtering to the reconstructed signal. For example, the filter 350 may generate a modified reconstructed picture by applying various filtering methods to the reconstructed picture, and may transmit the modified reconstructed picture in the memory 360, specifically in the DPB of the memory 360. The various filtering methods may include, for example, deblocking filtering, sample adaptive offset, an adaptive loop filter, a bilateral filter or the like.

The (modified) reconstructed picture which has been stored in the DPB of the memory 360 may be used as a reference picture in the inter predictor 332. The memory 360 may store motion information of a block in the current picture, from which motion information has been derived (or decoded) and/or motion information of blocks in an already reconstructed picture. The stored motion information may be transmitted to the inter predictor 260 to be utilized as motion information of a neighboring block or motion information of a temporal neighboring block. The memory 360 may store reconstructed samples of reconstructed blocks in the current picture, and transmit them to the intra predictor 331.

In this specification, the examples described in the predictor 330, the dequantizer 321, the inverse transformer 322, and the filter 350 of the decoding apparatus 300 may be similarly or correspondingly applied to the predictor 220, the dequantizer 234, the inverse transformer 235, and the filter 260 of the encoding apparatus 200, respectively.

As described above, prediction is performed in order to increase compression efficiency in performing video coding. Through this, a predicted block including prediction samples for a current block, which is a coding target block, may be generated. Here, the predicted block includes prediction samples in a space domain (or pixel domain). The predicted block may be identically derived in the encoding apparatus and the decoding apparatus, and the encoding apparatus may increase image coding efficiency by signaling to the decoding apparatus not original sample value of an original block itself but information on residual (residual information) between the original block and the predicted block. The decoding apparatus may derive a residual block including residual samples based on the residual information, generate a reconstructed block including reconstructed samples by adding the residual block to the predicted block, and generate a reconstructed picture including reconstructed blocks.

The residual information may be generated through transform and quantization procedures. For example, the encoding apparatus may derive a residual block between the original block and the predicted block, derive transform coefficients by performing a transform procedure on residual samples (residual sample array) included in the residual block, and derive quantized transform coefficients by performing a quantization procedure on the transform coefficients, so that it may signal associated residual information to the decoding apparatus (through a bitstream). Here, the residual information may include value information, position information, a transform technique, transform kernel, a quantization parameter or the like of the quantized transform coefficients. The decoding apparatus may perform a quantization/dequantization procedure and derive the residual samples (or residual sample block), based on residual information. The decoding apparatus may generate a reconstructed block based on a predicted block and the residual block. The encoding apparatus may derive a residual block by dequantizing/inverse transforming quantized transform coefficients for reference for inter prediction of a next picture, and may generate a reconstructed picture based on this.

Figure 4:
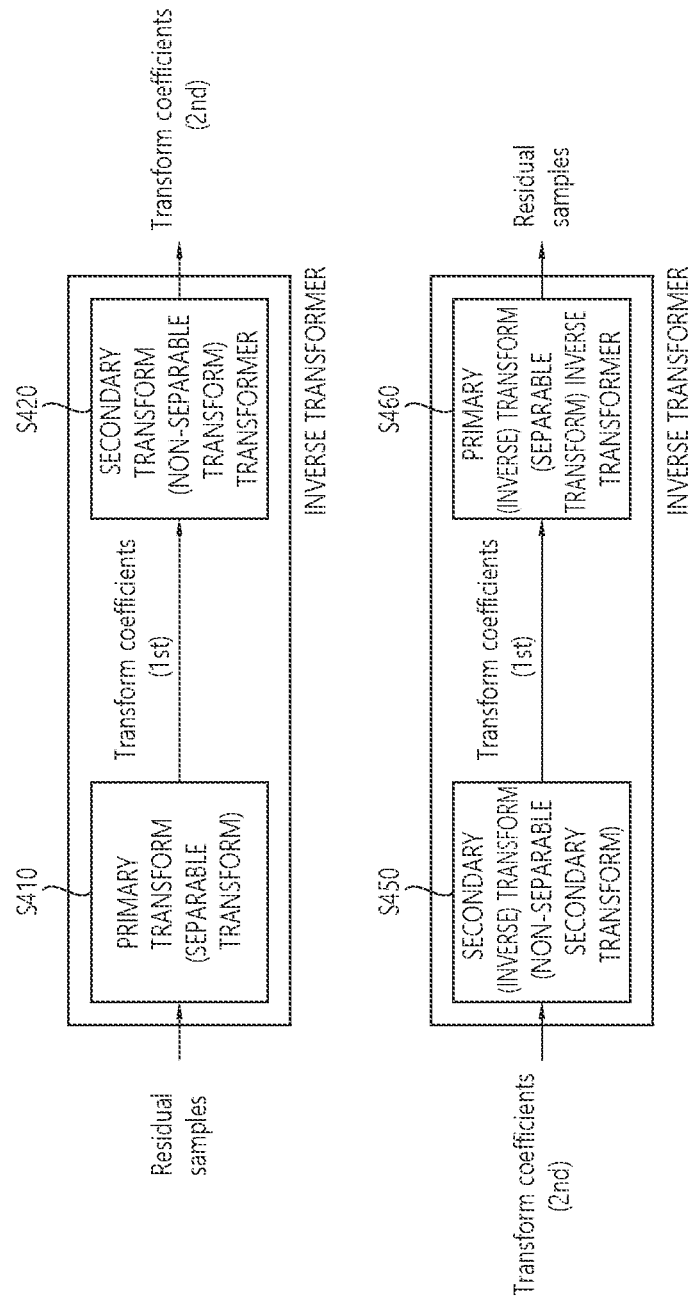
FIG. 4 schematically illustrates a multiple transform technique according to an embodiment of the present disclosure.

FIG. 4 schematically illustrates a multiple transform technique according to an embodiment of the present disclosure.

Referring to FIG. 4, a transformer may correspond to the transformer in the encoding apparatus of foregoing FIG. 2, and an inverse transformer may correspond to the inverse transformer in the encoding apparatus of foregoing FIG. 2, or to the inverse transformer in the decoding apparatus of FIG. 3.

The transformer may derive (primary) transform coefficients by performing a primary transform based on residual samples (residual sample array) in a residual block (S410). This primary transform may be referred to as a core transform. Herein, the primary transform may be based on multiple transform selection (MTS), and when a multiple transform is applied as the primary transform, it may be referred to as a multiple core transform.

The multiple core transform may represent a method of transforming additionally using discrete cosine transform (DCT) type 2 and discrete sine transform (DST) type 7, DCT type 8, and/or DST type 1. That is, the multiple core transform may represent a transform method of transforming a residual signal (or residual block) of a space domain into transform coefficients (or primary transform coefficients) of a frequency domain based on a plurality of transform kernels selected from among the DCT type 2, the DST type 7, the DCT type 8 and the DST type 1. Herein, the primary transform coefficients may be called temporary transform coefficients from the viewpoint of the transformer.

In other words, when the conventional transform method is applied, transform coefficients might be generated by applying transform from a space domain to a frequency domain for a residual signal (or residual block) based on the DCT type 2. Unlike to this, when the multiple core transform is applied, transform coefficients (or primary transform coefficients) may be generated by applying transform from a space domain to a frequency domain for a residual signal (or residual block) based on the DCT type 2, the DST type 7, the DCT type 8, and/or DST type 1. Herein, the DCT type 2, the DST type 7, the DCT type 8, and the DST type 1 may be called a transform type, transform kernel or transform core.

For reference, the DCT/DST transform types may be defined based on basis functions, and the basis functions may be represented as in the following table.

TABLE 1

| Transform Type | Basis function $T_i(j)$, $i, j = 0, 1, \ldots, N-1$ |
|---|---|
| DCT-II | $T_i(j) = \omega_0 \cdot \sqrt{\dfrac{2}{N}} \cdot \cos\left(\dfrac{\pi \cdot i \cdot (2j+1)}{2N}\right)$ where $\omega_0 = \begin{cases} \sqrt{\dfrac{2}{N}} & i = 0 \\ 1 & i \neq 0 \end{cases}$ |
| DCT-V | $T_i(j) = \omega_0 \cdot \omega_1 \cdot \sqrt{\dfrac{2}{2N-1}} \cdot \cos\left(\dfrac{2\pi \cdot i \cdot j}{2N-1}\right)$, where $\omega_0 = \begin{cases} \sqrt{\dfrac{2}{N}} & i = 0 \\ 1 & i \neq 0 \end{cases} \cdot \omega_1 = \begin{cases} \sqrt{\dfrac{2}{N}} & j = 0 \\ 1 & j \neq 0 \end{cases}$ |
| DCT-VIII | $T_i(j) = \sqrt{\dfrac{4}{2N+1}} \cdot \cos\left(\dfrac{\pi \cdot (2i+1) \cdot (2j+1)}{4N+2}\right)$ |
| DST-I | $T_i(j) = \sqrt{\dfrac{2}{N+1}} \cdot \sin\left(\dfrac{\pi \cdot (i+1) \cdot (j+1)}{N+1}\right)$ |
| DST-VII | $T_i(j) = \sqrt{\dfrac{4}{2N+1}} \cdot \sin\left(\dfrac{\pi \cdot (2i+1) \cdot (j+1)}{2N+1}\right)$ |

If the multiple core transform is performed, then a vertical transform kernel and a horizontal transform kernel for a target block may be selected from among the transform kernels, a vertical transform for the target block may be performed based on the vertical transform kernel, and a horizontal transform for the target block may be performed based on the horizontal transform kernel. Here, the horizontal transform may represent a transform for horizontal components of the target block, and the vertical transform may represent a transform for vertical components of the target block. The vertical transform kernel/horizontal transform kernel may be adaptively determined based on a prediction mode and/or a transform index of a target block (CU or sub-block) including a residual block.

Further, according to an example, if the primary transform is performed by applying the MTS, a mapping relationship for transform kernels may be set by setting specific basis functions to predetermined values and combining basis functions to be applied in the vertical transform or the horizontal transform. For example, when the horizontal transform kernel is expressed as trTypeHor and the vertical direction transform kernel is expressed as trTypeVer, a trTypeHor or trTypeVer value of 0 may be set to DCT2, a trTypeHor or trTypeVer value of 1 may be set to DST7, and a trTypeHor or trTypeVer value of 2 may be set to DCT8.

In this case, MTS index information may be encoded and signaled to the decoding apparatus to indicate any one of a plurality of transform kernel sets. For example, an MTS index of 0 may indicate that both trTypeHor and trTypeVer values are 0, an MTS index of 1 may indicate that both trTypeHor and trTypeVer values are 1, an MTS index of 2 may indicate that the trTypeHor value is 2 and the trTypeVer value. Is 1, an MTS index of 3 may indicate that the trTypeHor value is 1 and the trTypeVer value is 2, and an MTS index of 4 may indicate that both trTypeHor and trTypeVer values are 2.

The transformer may derive modified (secondary) transform coefficients by performing the secondary transform based on the (primary) transform coefficients (S420). The primary transform is a transform from a spatial domain to a frequency domain, and the secondary transform refers to transforming into a more compressive expression by using a correlation existing between (primary) transform coefficients. The secondary transform may include a non-separable transform. In this case, the secondary transform may be called a non-separable secondary transform (NSST), or a mode-dependent non-separable secondary transform (MDNSST). The non-separable secondary transform may represent a transform which generates modified transform coefficients (or secondary transform coefficients) for a residual signal by secondary-transforming, based on a non-separable transform matrix, (primary) transform coefficients derived through the primary transform. At this time, the vertical transform and the horizontal transform may not be applied separately (or horizontal and vertical transforms may not be applied independently) to the (primary) transform coefficients, but the transforms may be applied at once based on the non-separable transform matrix. In other words, the non-separable secondary transform may represent a transform method in which the vertical and horizontal components of the (primary) transform coefficients are not separated, and for example, two-dimensional signals (transform coefficients) are rearranged to a one-dimensional signal through a certain determined direction (e.g., row-first direction or column-first direction), and then modified transform coefficients (or secondary transform coefficients) are generated based on the non-separable transform matrix. For example, according to a row-first order, M×N blocks are disposed in a line in an order of a first row, a second row, . . . , and an Nth row. According to a column-first order, M×N blocks are disposed in a line in an order of a first column, a second column, . . . , and an Nth column. The non-separable secondary transform may be applied to a top-left region of a block configured with (primary) transform coefficients (hereinafter, may be referred to as a transform coefficient block). For example, if the width (W) and the height (H) of the transform coefficient block are all equal to or greater than 8, an 8×8 non-separable secondary transform may be applied to a top-left 8×8 region of the transform coefficient block. Further, if the width (W) and the height (H) of the transform coefficient block are all equal to or greater than 4, and the width (W) or the height (H) of the transform coefficient block is less than 8, then a 4×4 non-separable secondary transform may be applied to a top-left min(8,W)×min(8,H) region of the transform coefficient block. However, the embodiment is not limited to this, and for example, even if only the condition that the width (W) or height (H) of the transform coefficient block is equal to or greater than 4 is satisfied, the 4×4 non-separable secondary transform may be applied to the top-left min(8,W)×min(8,H) region of the transform coefficient block.

Specifically, for example, if a 4×4 input block is used, the non-separable secondary transform may be performed as follows.

The 4×4 input block X may be represented as follows.

$$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix} \quad \text{[Equation 1]}$$

If the X is represented in the form of a vector, the vector $\vec{X}$ may be represented as below.

$$\vec{X} = [X_{00}X_{01}X_{02}X_{03}X_{10}X_{11}X_{12}X_{13}X_{20} X_{21}X_{22}X_{23}X_{30}X_{31}X_{32}X_{33}]^T \quad \text{[Equation 2]}$$

In Equation 2, the vector $\vec{X}$ is a one-dimensional vector obtained by rearranging the two-dimensional block X of Equation 1 according to the row-first order.

In this case, the secondary non-separable transform may be calculated as below.

$$\vec{F} = T \cdot \vec{X} \quad \text{[Equation 3]}$$

In this equation, $\vec{F}$ represents a transform coefficient vector, and T represents a 16×16 (non-separable) transform matrix.

Through foregoing Equation 3, a 16×1 transform coefficient vector $\vec{F}$ may be derived, and the $\vec{F}$ may be re-organized into a 4×4 block through a scan order (horizontal, vertical, diagonal and the like). However, the above-described calculation is an example, and hypercube-Givens transform (HyGT) or the like may be used for the calculation of the non-separable secondary transform in order to reduce the computational complexity of the non-separable secondary transform.

Meanwhile, in the non-separable secondary transform, a transform kernel (or transform core, transform type) may be selected to be mode dependent. In this case, the mode may include the intra prediction mode and/or the inter prediction mode.

As described above, the non-separable secondary transform may be performed based on an 8×8 transform or a 4×4 transform determined based on the width (W) and the height (H) of the transform coefficient block. The 8×8 transform refers to a transform that is applicable to an 8×8 region included in the transform coefficient block when both W and H are equal to or greater than 8, and the 8×8 region may be a top-left 8×8 region in the transform coefficient block. Similarly, the 4×4 transform refers to a transform that is applicable to a 4×4 region included in the transform coefficient block when both W and H are equal to or greater than 4, and the 4×4 region may be a top-left 4×4 region in the transform coefficient block. For example, an 8×8 transform kernel matrix may be a 64×64/16×64 matrix, and a 4×4 transform kernel matrix may be a 16×16/8×16 matrix.

Here, to select a mode-based transform kernel, three non-separable secondary transform kernels may be configured per transform set for the non-separable secondary transform for both the 8×8 transform and the 4×4 transform, and there may be 35 transform sets. That is, 35 transform sets may be configured for the 8×8 transform, and 35 transform sets may be configured for the 4×4 transform. In this case, three 8×8 transform kernels may be included in each of the 35 transform sets for the 8×8 transform, and three 4×4 transform kernels may be included in each of the 35 transform sets for the 4×4 transform. The sizes of the transforms, the numbers of sets, and the numbers of transform kernels in each set mentioned above are merely for illustration. Instead, a size other than 8×8 or 4×4 may be used, n sets may be configured, and k transform kernels may be included in each set.

The transform set may be called an NSST set, and the transform kernel in the NSST set may be called an NSST kernel. The selection of a specific set from among the transform sets may be performed, for example, based on the intra prediction mode of the target block (CU or sub-block).

For reference, as an example, the intra prediction mode may include two non-directional (or non-angular) intra prediction modes and 65 directional (or angular) intra prediction modes. The non-directional intra prediction modes may include a No. 0 planar intra prediction mode, and a No. 1 DC intra prediction mode, and the directional intra prediction modes may include 65 intra prediction modes between a No. 2 intra prediction mode and a No. 66 intra prediction mode. However, this is an example, and the present disclosure may be applied to a case where there are different number of intra prediction modes. Meanwhile, according to circumstances, a No. 67 intra prediction mode may be further used, and the No. 67 intra prediction mode may represent a linear model (LM) mode.

Figure 5:
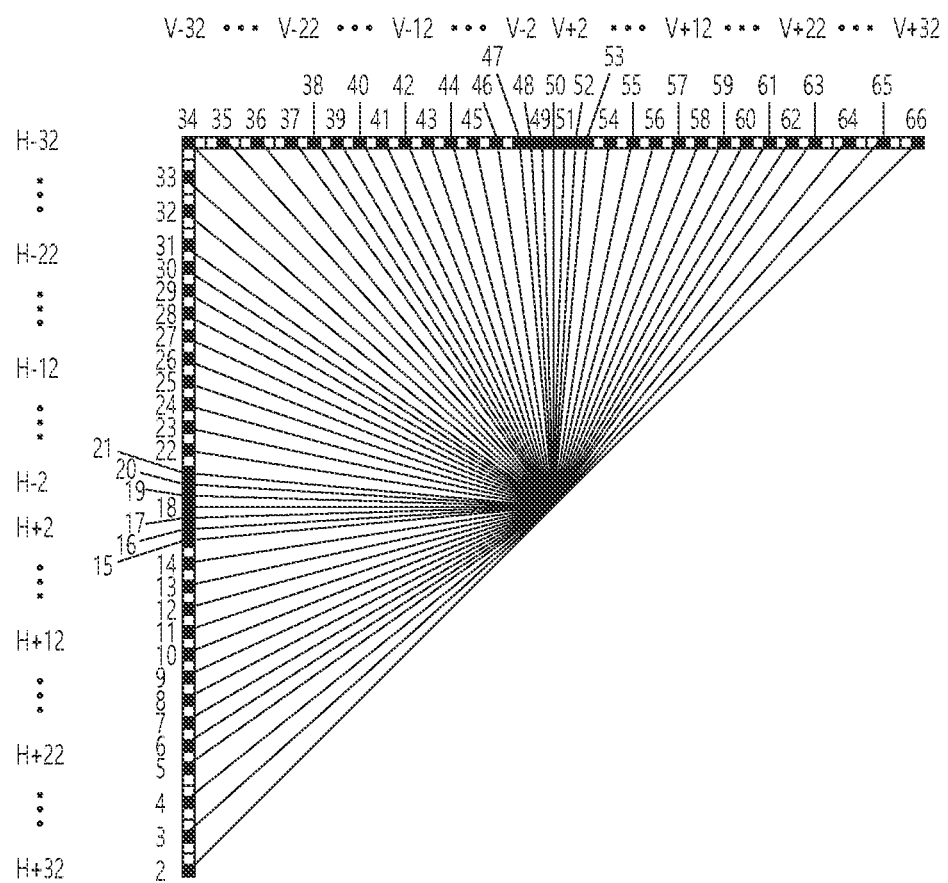
FIG. 5 illustrates directional intra modes of 65 prediction directions.

FIG. 5 illustrates directional intra modes of 65 prediction directions.

Referring to FIG. 5, on the basis of the No. 34 intra prediction mode having a left upward diagonal prediction direction, the intra prediction mode having a horizontal directionality and the intra prediction mode having vertical directionality may be classified. H and V of FIG. 5 mean horizontal directionality and vertical directionality, respectively, and numerals −32 to 32 indicate displacements in 1/32 units on the sample grid position. This may represent an offset for the mode index value. The Nos. 2 to 33 intra prediction modes have the horizontal directionality, and the Nos. 34 to 66 intra prediction modes have the vertical directionality. Meanwhile, strictly speaking, the No. 34 intra prediction mode may be considered as being neither horizontal nor vertical, but it may be classified as belonging to the horizontal directionality in terms of determining the transform set of the secondary transform. This is because the input data is transposed to be used for the vertical direction mode symmetrical on the basis of the No. 34 intra prediction mode, and the input data alignment method for the horizontal mode is used for the No. 34 intra prediction mode. Transposing input data means that rows and columns of two-dimensional block data M×N are switched into N×M data. The No. 18 intra prediction mode and the No. 50 intra prediction mode may represent a horizontal intra prediction mode and a vertical intra prediction mode, respectively, and the No. 2 intra prediction mode may be called a right upward diagonal intra prediction mode because it has a left reference pixel and predicts in a right upward direction. In the same manner, the No. 34 intra prediction mode may be called a right downward diagonal intra prediction mode, and the No. 66 intra prediction mode may be called a left downward diagonal intra prediction mode.

In this case, mapping between the 35 transform sets and the intra prediction modes may be, for example, represented as in the following table. For reference, if an LM mode is applied to a target block, the secondary transform may not be applied to the target block.

TABLE 2

| intra mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| set | 0 | 1 | 2 | 3 | 4 | 5 | 6 | 7 | 8 | 9 | 10 | 11 | 12 | 13 | 14 | 15 | 16 | 17 |
| intra mode | 34 | 35 | 36 | 37 | 38 | 39 | 40 | 41 | 42 | 43 | 44 | 45 | 46 | 47 | 48 | 49 | 50 | 51 |
| set | 34 | 33 | 32 | 31 | 30 | 29 | 28 | 27 | 26 | 25 | 24 | 23 | 22 | 21 | 20 | 19 | 18 | 17 |

TABLE 2-continued

| intra mode | 18 | 19 | 20 | 21 | 22 | 23 | 24 | 25 | 26 | 27 | 28 | 29 | 30 | 31 | 32 | 33 |
|---|---|---|---|---|---|---|---|---|---|---|---|---|---|---|---|---|
| set | 18 | 19 | 20 | 21 | 22 | 23 | 24 | 25 | 26 | 27 | 28 | 29 | 30 | 31 | 32 | 33 |
| intra mode | 52 | 53 | 54 | 55 | 56 | 57 | 58 | 59 | 60 | 61 | 62 | 63 | 64 | 65 | 66 | 67 (LM) |
| set | 16 | 15 | 14 | 13 | 12 | 11 | 10 | 9 | 8 | 7 | 6 | 5 | 4 | 3 | 2 | NULL |

Meanwhile, if a specific set is determined to be used, one of k transform kernels in the specific set may be selected through the non-separable secondary transform index. The encoding apparatus may derive a non-separable secondary transform index indicating a specific transform kernel based on the rate-distortion (RD) check, and may signal the non-separable secondary transform index to the decoding apparatus. The decoding apparatus may select one from among k transform kernels in the specific set based on the non-separable secondary transform index. For example, the NSST index value 0 may indicate a first non-separable secondary transform kernel, the NSST index value 1 may indicate a second non-separable secondary transform kernel, and the NSST index value 2 may indicate a third non-separable secondary transform kernel. Alternatively, the NSST index value 0 may indicate that the first non-separable secondary transform is not applied to a target block, and the NSST index values 1 to 3 may indicate the three transform kernels.

Referring back to FIG. 4, the transformer may perform the non-separable secondary transform based on the selected transform kernels, and may obtain modified (secondary) transform coefficients. As described above, the modified transform coefficients may be derived as transform coefficients quantized through the quantizer, and may be encoded and signaled to the decoding apparatus and transferred to the dequantizer/inverse transformer in the encoding apparatus.

Meanwhile, as described above, if the secondary transform is omitted, (primary) transform coefficients, which are an output of the primary (separable) transform, may be derived as transform coefficients quantized through the quantizer as described above, and may be encoded and signaled to the decoding apparatus and transferred to the dequantizer/inverse transformer in the encoding apparatus.

The inverse transformer may perform a series of procedures in the inverse order to that in which they have been performed in the above-described transformer. The inverse transformer may receive (dequantized) transformer coefficients, and derive (primary) transform coefficients by performing a secondary (inverse) transform (S450), and may obtain a residual block (residual samples) by performing a primary (inverse) transform on the (primary) transform coefficients (S460). In this connection, the primary transform coefficients may be called modified transform coefficients from the viewpoint of the inverse transformer. As described above, the encoding apparatus and the decoding apparatus may generate the reconstructed block based on the residual block and the predicted block, and may generate the reconstructed picture based on the reconstructed block.

The decoding apparatus may further include a secondary inverse transform application determinator (or an element to determine whether to apply a secondary inverse transform) and a secondary inverse transform determinator (or an element to determine a secondary inverse transform). The secondary inverse transform application determinator may determine whether to apply a secondary inverse transform. For example, the secondary inverse transform may be an NSST or an RST, and the secondary inverse transform application determinator may determine whether to apply the secondary inverse transform based on a secondary transform flag obtained by parsing the bitstream. In another example, the secondary inverse transform application determinator may determine whether to apply the secondary inverse transform based on a transform coefficient of a residual block.

The secondary inverse transform determinator may determine a secondary inverse transform. In this case, the secondary inverse transform determinator may determine the secondary inverse transform applied to the current block based on an NSST (or RST) transform set specified according to an intra prediction mode. In an embodiment, a secondary transform determination method may be determined depending on a primary transform determination method. Various combinations of primary transforms and secondary transforms may be determined according to the intra prediction mode. Further, in an example, the secondary inverse transform determinator may determine a region to which a secondary inverse transform is applied based on the size of the current block.

Meanwhile, as described above, if the secondary (inverse) transform is omitted, (dequantized) transform coefficients may be received, the primary (separable) inverse transform may be performed, and the residual block (residual samples) may be obtained. As described above, the encoding apparatus and the decoding apparatus may generate the reconstructed block based on the residual block and the predicted block, and may generate the reconstructed picture based on the reconstructed block.

Meanwhile, in the present disclosure, a reduced secondary transform (RST) in which the size of a transform matrix (kernel) is reduced may be applied in the concept of NSST in order to reduce the amount of computation and memory required for the non-separable secondary transform.

Meanwhile, the transform kernel, the transform matrix, and the coefficient constituting the transform kernel matrix, that is, the kernel coefficient or the matrix coefficient, described in the present disclosure may be expressed in 8 bits. This may be a condition for implementation in the decoding apparatus and the encoding apparatus, and may reduce the amount of memory required to store the transform kernel with a performance degradation that can be reasonably accommodated compared to the existing 9 bits or 10 bits. In addition, the expressing of the kernel matrix in 8 bits may allow a small multiplier to be used, and may be more suitable for single instruction multiple data (SIMD) instructions used for optimal software implementation.

In the present specification, the term "RST" may mean a transform which is performed on residual samples for a target block based on a transform matrix whose size is reduced according to a reduced factor. In the case of performing the reduced transform, the amount of computation required for transform may be reduced due to a reduction in the size of the transform matrix. That is, the RST may be used to address the computational complexity issue occurring at the non-separable transform or the transform of a block of a great size.

RST may be referred to as various terms, such as reduced transform, reduced secondary transform, reduction transform, simplified transform, simple transform, and the like, and the name which RST may be referred to as is not limited to the listed examples. Alternatively, since the RST is mainly performed in a low frequency region including a non-zero coefficient in a transform block, it may be referred to as a Low-Frequency Non-Separable Transform (LFNST).

Meanwhile, when the secondary inverse transform is performed based on RST, the inverse transformer 235 of the encoding apparatus 200 and the inverse transformer 322 of the decoding apparatus 300 may include an inverse reduced secondary transformer which derives modified transform coefficients based on the inverse RST of the transform coefficients, and an inverse primary transformer which derives residual samples for the target block based on the inverse primary transform of the modified transform coefficients. The inverse primary transform refers to the inverse transform of the primary transform applied to the residual. In the present disclosure, deriving a transform coefficient based on a transform may refer to deriving a transform coefficient by applying the transform.

FIG. 6 is a diagram illustrating an RST according to an embodiment of the present disclosure.

In the present specification, the term "target block" may mean a current block or a residual block on which coding is performed.

In the RST according to an example, an N-dimensional vector may be mapped to an R-dimensional vector located in another space, so that the reduced transform matrix may be determined, where R is less than N. N may mean the square of the length of a side of a block to which the transform is applied, or the total number of transform coefficients corresponding to a block to which the transform is applied, and the reduced factor may mean an R/N value. The reduced factor may be referred to as a reduced factor, reduction factor, simplified factor, simple factor or other various terms. Meanwhile, R may be referred to as a reduced coefficient, but according to circumstances, the reduced factor may mean R. Further, according to circumstances, the reduced factor may mean the N/R value.

In an example, the reduced factor or the reduced coefficient may be signaled through a bitstream, but the example is not limited to this. For example, a predefined value for the reduced factor or the reduced coefficient may be stored in each of the encoding apparatus 200 and the decoding apparatus 300, and in this case, the reduced factor or the reduced coefficient may not be signaled separately.

The size of the reduced transform matrix according to an example may be R×N less than N×N, the size of a conventional transform matrix, and may be defined as in Equation 4 below.

$$T_{R \times N} = \begin{bmatrix} t_{11} & t_{12} & t_{13} & \cdots & t_{1N} \\ t_{21} & t_{22} & t_{14} & & t_{2N} \\ \vdots & & \ddots & & \vdots \\ t_{R1} & t_{R2} & t_{R3} & \cdots & t_{RN} \end{bmatrix}$$ [Equation 4]

The matrix T in the Reduced Transform block shown in FIG. 6A may mean the matrix $T_{R \times N}$ of Equation 4. As shown in FIG. 6A, when the reduced transform matrix $T_{R \times N}$ is multiplied to residual samples for the target block, transform coefficients for the target block may be derived.

In an example, if the size of the block to which the transform is applied is 8×8 and R=16 (i. E., R/N=16/64=¼), then the RST according to FIG. 6A may be expressed as a matrix operation as shown in Equation 5 below. In this case, memory and multiplication calculation can be reduced to approximately ¼ by the reduced factor.

In this document, matrix operation can be understood as an operation to obtain a column vector by multiplying the matrix and the column vector by placing the matrix on the left side of the column vector.

$$\begin{bmatrix} t_{1,1} & t_{1,2} & t_{1,3} & \cdots & t_{1,64} \\ t_{2,1} & t_{2,2} & t_{2,3} & & t_{2,64} \\ & \vdots & & \ddots & \vdots \\ t_{16,1} & t_{16,2} & t_{16,3} & \cdots & t_{16,64} \end{bmatrix} \times \begin{bmatrix} r_1 \\ r_2 \\ \vdots \\ r_{64} \end{bmatrix}$$ [Equation 5]

In Equation 5, $r_1$ to $r_{64}$ may represent residual samples for the target block and may be specifically transform coefficients generated by applying a primary transform. As a result of the calculation of Equation 5, transform coefficients $c_i$ for the target block may be derived, and a process of deriving $c_i$ may be as in Equation 6.

for $i$ from to $R$: [Equation 6]

$ci = 0$ for $j$ from 1 to $N$ $ci += tij * rj$

As a result of the calculation of Equation 6, transform coefficients $c_1$ to $c_R$ for the target block may be derived. That is, when R=16, transform coefficients $c_1$ to $c_{16}$ for the target block may be derived. If, instead of RST, a regular transform is applied and a transform matrix of 64×64 (N×N) size is multiplied to residual samples of 64×1 (N×1) size, then only 16 (R) transform coefficients are derived for the target block because RST was applied, although 64 (N) transform coefficients are derived for the target block. Since the total number of transform coefficients for the target block is reduced from N to R, the amount of data transmitted by the encoding apparatus 200 to the decoding apparatus 300 decreases, so efficiency of transmission between the encoding apparatus 200 and the decoding apparatus 300 can be improved.

When considered from the viewpoint of the size of the transform matrix, the size of the regular transform matrix is 64×64 (N×N), but the size of the reduced transform matrix is reduced to 16×64 (R×N), so memory usage in a case of performing the RST can be reduced by an R/N ratio when compared with a case of performing the regular transform. In addition, when compared to the number of multiplication calculations N×N in a case of using the regular transform matrix, the use of the reduced transform matrix can reduce the number of multiplication calculations by the R/N ratio (R×N).

In an example, the transformer 232 of the encoding apparatus 200 may derive transform coefficients for the target block by performing the primary transform and the RST-based secondary transform on residual samples for the target block. These transform coefficients may be transferred to the inverse transformer of the decoding apparatus 300, and the inverse transformer 322 of the decoding apparatus 300 may derive the modified transform coefficients based on the inverse reduced secondary transform (RST) for the transform coefficients, and may derive residual samples for the target block based on the inverse primary transform for the modified transform coefficients.

The size of the inverse RST matrix $T_{N \times R}$ according to an example is N×R less than the size N×N of the regular inverse transform matrix, and is in a transpose relationship with the reduced transform matrix $T_{R \times N}$ shown in Equation 4.

The matrix Tt in the Reduced Inv. Transform block shown in FIG. 6B may mean the inverse RST matrix $T_{R \times N}{}^T$ (the superscript T means transpose). When the inverse RST matrix $T_{R \times N}{}^T$ is multiplied to the transform coefficients for the target block as shown in FIG. 6B, the modified transform coefficients for the target block or the residual samples for the target block may be derived. The inverse RST matrix $T_{R \times N}{}^T$ may be expressed as $(T_{R \times N}{}^T)_{N \times R}$.

More specifically, when the inverse RST is applied as the secondary inverse transform, the modified transform coefficients for the target block may be derived when the inverse RST matrix $T_{R \times N}{}^T$ is multiplied to the transform coefficients for the target block. Meanwhile, the inverse RST may be applied as the inverse primary transform, and in this case, the residual samples for the target block may be derived when the inverse RST matrix $T_{R \times N}{}^T$ is multiplied to the transform coefficients for the target block.

In an example, if the size of the block to which the inverse transform is applied is 8×8 and R=16 (i. E., R/N=16/64=¼), then the RST according to FIG. 6B may be expressed as a matrix operation as shown in Equation 7 below.

$$\begin{bmatrix} t_{1,1} & t_{2,1} & \cdots & t_{16,1} \\ t_{1,2} & t_{2,2} & \cdots & t_{16,2} \\ t_{1,3} & t_{2,3} & & t_{16,3} \\ \vdots & \vdots & & \vdots \\ \vdots & \vdots & \ddots & \vdots \\ t_{1,64} & t_{2,64} & \cdots & t_{16,64} \end{bmatrix} \times \begin{bmatrix} c_1 \\ c_2 \\ \vdots \\ c_{16} \end{bmatrix}$$ [Equation 7]

In Equation 7, $c_1$ to $c_{16}$ may represent the transform coefficients for the target block. As a result of the calculation of Equation 7, $r_j$ representing the modified transform coefficients for the target block or the residual samples for the target block may be derived, and the process of deriving $r_j$ may be as in Equation 8.

For $i$ from 1 to $N$      [Equation 8]

$r_j = 0$ for $j$ from 1 to $R$ $r_j += t_{ji} * c_j$

As a result of the calculation of Equation 8, $r_1$ to $r_N$ representing the modified transform coefficients for the target block or the residual samples for the target block may be derived. When considered from the viewpoint of the size of the inverse transform matrix, the size of the regular inverse transform matrix is 64×64 (N×N), but the size of the reduced inverse transform matrix is reduced to 64×16 (RxN), so memory usage in a case of performing the inverse RST can be reduced by an R/N ratio when compared with a case of performing the regular inverse transform. In addition, when compared to the number of multiplication calculations N×N in a case of using the regular inverse transform matrix, the use of the reduced inverse transform matrix can reduce the number of multiplication calculations by the R/N ratio (N×R).

A transform set configuration shown in Table 2 may also be applied to an 8×8 RST. That is, the 8×8 RST may be applied according to a transform set in Table 2. Since one transform set includes two or three transforms (kernels) according to an intra prediction mode, it may be configured to select one of up to four transforms including that in a case where no secondary transform is applied. In a transform where no secondary transform is applied, it may be considered to apply an identity matrix. Assuming that indexes 0, 1, 2, and 3 are respectively assigned to the four transforms (e.g., index 0 may be allocated to a case where an identity matrix is applied, that is, a case where no secondary transform is applied), an NSST index as a syntax element may be signaled for each transform coefficient block, thereby designating a transform to be applied. That is, through the NSST index, it is possible to designate an 8×8 NSST for atop-left 8×8 block and to designate an 8×8 RST in an RST configuration. The 8×8 NSST and the 8×8 RST refer to transforms applicable to an 8×8 region included in the transform coefficient block when both W and H of the target block to be transformed are equal to or greater than 8, and the 8×8 region may be a top-left 8×8 region in the transform coefficient block. Similarly, a 4×4 NSST and a 4×4 RST refer to transforms applicable to a 4×4 region included in the transform coefficient block when both W and H of the target block to are equal to or greater than 4, and the 4×4 region may be a top-left 4×4 region in the transform coefficient block.

If the (forward) 8×8 RST illustrated in Equation 4 is applied, 16 significant transform coefficients are generated. Thus, it is considered that 64 pieces of input data forming the 8×8 region is reduced to 16 pieces of output data, and only ¼ of the region is filled with significant transform coefficients from the perspective of a two-dimensional region. Accordingly, the 16 pieces of output data obtained by applying the forward 8×8 RST, may fill exemplary the top-left region (transform coefficients 1 to 16, i. E., c1, c2, . . . , c16 obtained through Equation 6) of the block as shown in FIG. 7 in the diagonal direction scanning order from 1 to 16.

Figure 7:
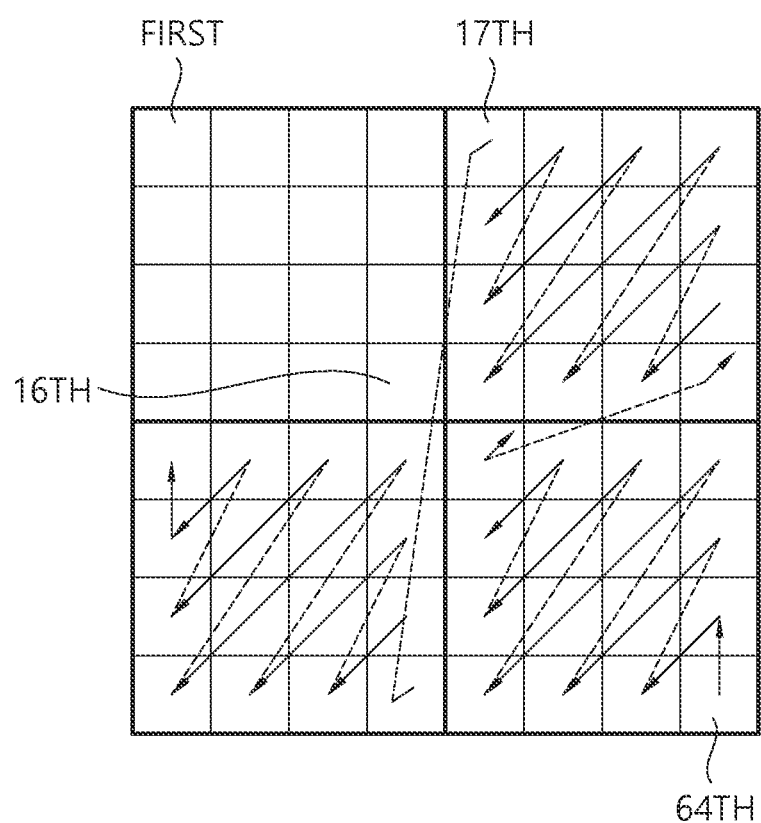
FIG. 7 is a diagram illustrating a transform coefficient scanning order according to an embodiment of the present disclosure.

FIG. 7 is a diagram illustrating a transform coefficient scanning order according to an embodiment of the present disclosure. As described above, when the forward scanning order starts from a first transform coefficient, reverse scanning may be performed in directions and orders indicated by arrows shown in FIG. 7 from 64th to 17th transform coefficients in the forward scanning order.

In FIG. 7, atop-left 4×4 region is a region of interest (ROI) filled with significant transform coefficients, and the remaining region is empty. The empty region may be filled with 0s by default.

That is, when an 8×8 RST with a 16×64 forward transform matrix is applied to the 8×8 region, output transform coefficients may be arranged in the top-left 4×4 region, and the region where no output transform coefficient exists may be filled with 0s (from the 64th to 17th transform coefficients) according to the scanning order of FIG. 7.

If a non-zero significant transform coefficient is found outside the ROI of FIG. 7, it is certain that the 8×8 RST has not been applied, and thus NSST index coding may be omitted. On the contrary, if a non-zero transform coefficient is not found outside the ROI of FIG. 7 (e.g., if a transform coefficient is set to 0 in a region other than the ROI in a case where the 8×8 RST is applied), the 8×8 RST is likely to have been applied, and thus NSST index coding may be performed. This conditional NSST index coding may be performed after a residual coding process because it is necessary to check the presence or absence of a non-zero transform coefficient.

The present disclosure discloses methods for optimizing a design and an association of an RST that can be applied to a 4×4 block from an RST structure described in this embodiment. Some concepts can be applied not only to a 4×4 RST but also to an 8×8 RST or other types of transforms.

Figure 8:
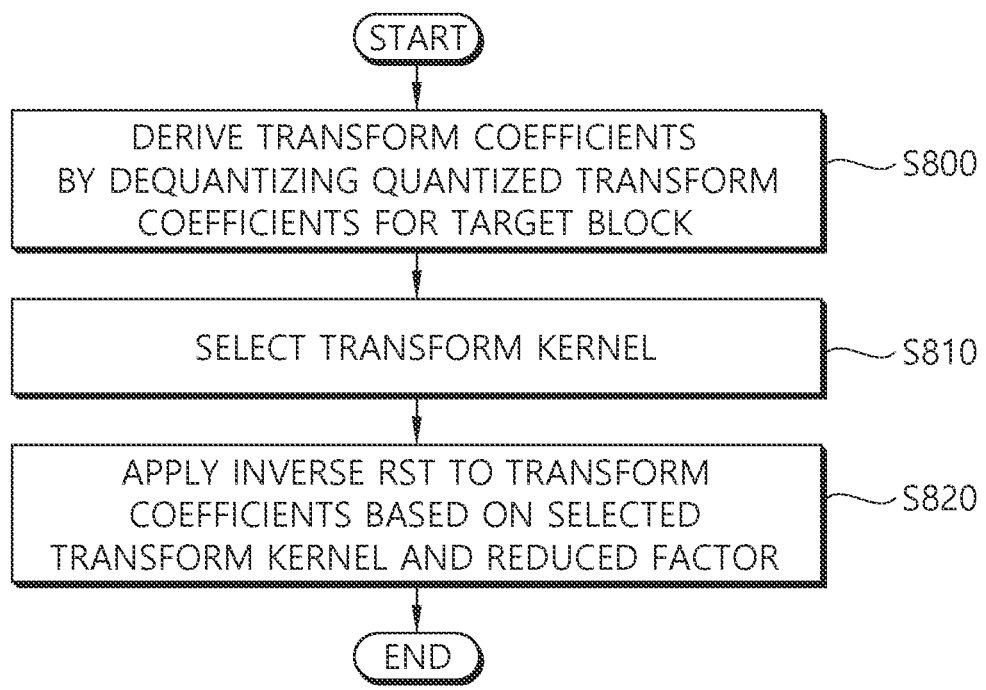
FIG. 8 is a flowchart illustrating an inverse RST process according to an embodiment of the present disclosure.

FIG. 8 is a flowchart illustrating an inverse RST process according to an embodiment of the present disclosure.

Each operation disclosed in FIG. 8 may be performed by the decoding apparatus 300 illustrated in FIG. 3. Specifically, S800 may be performed by the dequantizer 321 illustrated in FIG. 3, and S810 and S820 may be performed by the inverse transformer 322 illustrated in FIG. 3. Therefore, a description of specific details overlapping with those explained above with reference to FIG. 3 will be omitted or will be made briefly. In the present disclosure, an RST may be applied to a transform in a forward direction, and an inverse RST may mean a transform applied to an inverse direction.

In an embodiment, the specific operations according to the inverse RST may be different from the specific operations according to the RST only in that their operation orders are opposite to each other, and the specific operations according to the inverse RST may be substantially similar to the specific operations according to the RST. Accordingly, a person skilled in the art will readily understand that the descriptions of S800 to S820 for the inverse RST described below may be applied to the RST in the same or similar manner.

The decoding apparatus 300 according to an embodiment may derive the transform coefficients by performing dequantization on the quantized transform coefficients for the target block (S800).

The decoding apparatus 300 may determine whether to apply an inverse secondary transform after an inverse primary transform and before the inverse secondary transform. For example, the inverse secondary transform may be an NSST or an RST. For example, the decoding apparatus may determine whether to apply the inverse secondary transform based on a secondary transform flag parsed from a bitstream. In another example, the decoding apparatus may determine whether to apply the inverse secondary transform based on a transform coefficient of a residual block.

The decoding apparatus 300 may determine an inverse secondary transform. In this case, the decoding apparatus 300 may determine the secondary inverse transform applied to the current block based on an NSST (or RST) transform set specified according to an intra prediction mode. In an embodiment, a secondary transform determination method may be determined depending on a primary transform determination method. For example, it may be determined to apply an RST or LFNST only when DCT-2 is applied as a transform kernel in the primary transform. Alternatively, various combinations of primary transforms and secondary transforms may be determined according to the intra prediction mode.

Further, in an example, the decoding apparatus 300 may determine a region to which the inverse secondary transform is applied based on the size of the current block before determining the inverse secondary transform.

The decoding apparatus 300 according to an embodiment may select a transform kernel (S810). More specifically, the decoding apparatus 300 may select the transform kernel based on at least one of information on a transform index, a width and height of a region to which the transform is applied, an intra prediction mode used in image decoding, and a color component of the target block. However, the example is not limited to this, and for example, the transform kernel may be predefined, and separate information for selecting the transform kernel may not be signaled.

In one example, information on the color component of the target block may be indicated through CIdx. If the target block is a luma block, CIdx may indicate 0, and if the target block is a chroma block, for example, a Cb block or a Cr block, then CIdx may indicate a non-zero value (for example, 1).

The decoding apparatus 300 according to an embodiment may apply the inverse RST to transform coefficients based on the selected transform kernel and the reduced factor (S820).

Hereinafter, a method for determining a secondary NSST set, that is, a secondary transform set or a transform set, in view of an intra prediction mode and the size of a block according to an embodiment of the present disclosure is proposed.

In an embodiment, a set for a current transform block may be configured based on the intra prediction mode described above, thereby applying a transform set including transform kernels having various sizes to the transform block. Transform sets in Table 3 are expressed using 0 to 3 as in Table 4.

TABLE 3

| Intra mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| NSST Set | 0 | 0 | 2 | 2 | 2 | 2 | 2 | 2 | 2 | 2 | 2 | 2 | 2 | 18 | 18 | 18 | 18 | 18 |
| Intra mode | 34 | 35 | 36 | 37 | 38 | 39 | 40 | 41 | 42 | 43 | 44 | 45 | 46 | 47 | 48 | 49 | 50 | 51 |
| NSST Set | 34 | 34 | 34 | 34 | 34 | 34 | 34 | 34 | 34 | 34 | 34 | 18 | 18 | 18 | 18 | 18 | 18 | 18 |
| Intra mode | 18 | 19 | 20 | 21 | 22 | 23 | 24 | 25 | 26 | 27 | 28 | 29 | 30 | 31 | 32 | 33 | | |
| NSST Set | 18 | 18 | 18 | 18 | 18 | 18 | 34 | 34 | 34 | 34 | 34 | 34 | 34 | 34 | 34 | 34 | | |
| Intra mode | 52 | 53 | 54 | 55 | 56 | 57 | 58 | 59 | 60 | 61 | 62 | 63 | 64 | 65 | 66 | | | |
| NSST Set | 18 | 18 | 18 | 18 | 2 | 2 | 2 | 2 | 2 | 2 | 2 | 2 | 2 | 2 | 2 | | | |

TABLE 4

| Intra mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| NSST Set | 0 | 0 | 1 | 1 | 1 | 1 | 1 | 1 | 1 | 1 | 1 | 1 | 1 | 2 | 2 | 2 | 2 | 2 |
| Intra mode | 34 | 35 | 36 | 37 | 38 | 39 | 40 | 41 | 42 | 43 | 44 | 45 | 46 | 47 | 48 | 49 | 50 | 51 |
| NSST Set | 3 | 3 | 3 | 3 | 3 | 3 | 3 | 3 | 3 | 3 | 3 | 2 | 2 | 2 | 2 | 2 | 2 | 2 |
| Intra mode | 18 | 19 | 20 | 21 | 22 | 23 | 24 | 25 | 26 | 27 | 28 | 29 | 30 | 31 | 32 | 33 | | |
| NSST Set | 2 | 2 | 2 | 2 | 2 | 2 | 3 | 3 | 3 | 3 | 3 | 3 | 3 | 3 | 3 | 3 | | |
| Intra mode | 52 | 53 | 54 | 55 | 56 | 57 | 58 | 59 | 60 | 61 | 62 | 63 | 64 | 65 | 66 | | | |
| NSST Set | 2 | 2 | 2 | 2 | 1 | 1 | 1 | 1 | 1 | 1 | 1 | 1 | 1 | 1 | 1 | | | |

Indexes 0, 2, 18, and 34 illustrated in Table 3 correspond to 0, 1, 2, and 3 in Table 4, respectively. In Table 3 and Table 4, only four transform sets are used instead of 35 transform sets, thereby significantly reducing memory space.

Various numbers of transform kernel matrices that may be included in each transform set may be set as shown in the following tables.

TABLE 5

| NSST Set | 0 (DC, Planar) | 1 | 2 | 3 |
|---|---|---|---|---|
| # of transform kernels | 2 | 2 | 2 | 2 |

TABLE 6

| NSST Set | 0 (DC, Planar) | 1 | 2 | 3 |
|---|---|---|---|---|
| # of transform kernels | 2 | 1 | 1 | 1 |

TABLE 7

| NSST Set | 0 (DC, Planar) | 1 | 2 | 3 |
|---|---|---|---|---|
| # of transform kernels | 1 | 1 | 1 | 1 |

According to Table 5, two available transform kernels are used for each transform set, and accordingly a transform index ranges from 0 to 2.

According to Table 6, two available transform kernels are used for transform set 0, that is, a transform set according to a DC mode and a planar mode among intra prediction modes, and one transform kernel is used for each of the remaining transform sets. Here, an available transform index for transform set 1 ranges from 0 to 2, and a transform index for the remaining transform sets 1 to 3 ranges from 0 to 1.

According to Table 7, one available transform kernel is used for each transform set, and accordingly a transform index ranges from 0 to 1.

In transform set mapping of Table 3, a total of four transform sets may be used, and the four transform sets may be rearranged to be distinguished by indexes 0, 1, 2, and 3 as shown in Table 4. Table 8 and Table 9 illustrate four transform sets available for secondary transform, wherein Table 8 presents transform kernel matrices applicable to an 8×8 block, and Table 9 presents transform kernel matrices applicable to a 4×4 block. Table 8 and Table 9 include two transform kernel matrices per transform set, and two transform kernel matrices may be applied to all intra prediction modes as shown in Table 5.

All of the illustrative transform kernel matrices shown in Table 8 are transform kernel matrices multiplied by 128 as a scaling value. In a g_aiNsst8x8[N1] [N2] [16][64] array present in matrix arrays of Table 8, N1 denotes the number of transform sets (N1 is 4 or 35, distinguished by index 0, 1, . . . , and N1-1), N2 denotes the number (1 or 2) of transform kernel matrices included in each transform set, and [16][64] denotes a 16×64 reduced secondary transform (RST).

As shown in Table 3 and Table 4, when a transform set includes one transform kernel matrix, either a first transform kernel matrix or a second transform kernel matrix may be used for the transform set in Table 8.

While 16 transform coefficients are output when the RST is applied, only m transform coefficients may be output when only an m×64 portion of a 16×64 matrix is applied. For example, when only eight transform coefficients are output by setting m=8 and multiplying only an 8×64 matrix from the top, it is possible to reduce computational amount by half. To reduce computational amount in a worst case, an 8×64 matrix may be applied to an 8×8 transform unit (TU).

An m×64 transform matrix applicable to an 8×8 region (m≤16, e.g., the transform kernel matrices in Table 8) receives 64 pieces of data and generates m coefficients. That is, as shown in Equation 5, when the 64 pieces of data form a 64×1 vector, an m×1 vector is generated by sequentially multiplying an m×64 matrix and a 64×1 vector. Here, the 64 pieces of data forming the 8×8 region may be properly arranged to form a 64×1 vector. For example, as shown in Table 10, the data may be arranged in the order of indexes indicated at respective positions in the 8×8 region.

TABLE 10

| 1 | 2 | 3 | 4 | 5 | 6 | 7 | 8 |
|---|---|---|---|---|---|---|---|
| 9 | 10 | 11 | 12 | 13 | 14 | 15 | 16 |
| 17 | 18 | 19 | 20 | 21 | 22 | 23 | 24 |
| 25 | 26 | 27 | 28 | 29 | 30 | 31 | 32 |
| 33 | 34 | 35 | 36 | 37 | 38 | 39 | 40 |
| 41 | 42 | 43 | 44 | 45 | 46 | 47 | 48 |
| 49 | 50 | 51 | 52 | 53 | 54 | 55 | 56 |
| 57 | 58 | 59 | 60 | 61 | 62 | 63 | 64 |

As shown in Table 10, the data is arranged in the row-first direction in the 8×8 region for a secondary transform. This order refers to an order in which two-dimensional data is one-dimensionally arranged for a secondary transform, specifically an RST or an LFNST, and may be applied to a forward secondary transform performed in an encoding apparatus. Accordingly, in an inverse secondary transform performed by the inverse transformer of the encoding apparatus or the inverse transformer of the decoding apparatus, transform coefficients generated as a result of the transform, that is, primary transform coefficients, may be two-dimensionally arranged as shown in Table 10.

When there are 67 intra prediction modes as shown in FIG. 5, all directional modes (mode 2 to mode 66) are symmetrically configured about mode 34. That is, mode (2+n) is symmetric to mode (66−n) (0≤n≤31) about mode 34 in terms of prediction direction. Therefore, if a data arrangement order for configuring a 64×1 input vector for mode (2+n), that is, modes 2 to 33, corresponds to the row-first direction as shown in Table 10, a 64×1 input vector for mode (66−n) may be configured in an order shown in Table 11.

TABLE 11

| 1 | 9 | 17 | 25 | 33 | 41 | 49 | 57 |
|---|---|---|---|---|---|---|---|
| 2 | 10 | 18 | 26 | 34 | 42 | 50 | 58 |
| 3 | 11 | 19 | 27 | 35 | 43 | 51 | 59 |
| 4 | 12 | 20 | 28 | 36 | 44 | 52 | 60 |
| 5 | 13 | 21 | 29 | 37 | 45 | 53 | 61 |
| 6 | 14 | 22 | 30 | 38 | 46 | 54 | 62 |
| 7 | 15 | 23 | 31 | 39 | 47 | 55 | 63 |
| 8 | 16 | 24 | 32 | 40 | 48 | 56 | 64 |

As shown in Table 11, the data is arranged in the column-first direction in the 8×8 region for a secondary transform. This order refers to an order in which two-dimensional data is one-dimensionally arranged for a secondary transform, specifically an RST or an LFNST, and may be applied to a forward secondary transform performed in an encoding apparatus. Accordingly, in an inverse secondary transform performed by the inverse transformer of the encoding apparatus or the inverse transformer of the decoding apparatus, transform coefficients generated as a result of the transform, that is, primary transform coefficients, may be two-dimensionally arranged as shown in Table 11.

Table 11 shows that, for intra prediction mode (66−n), that is, for modes 35 to 66, a 64×1 input vector may be configured for according to the column-first direction.

In summary, the same transform kernel matrix shown in Table 8 may be applied while symmetrically arranging input data for mode (2+n) according to the row-first direction and input data for mode (66−n) (0≤n≤31) according to the column-first direction. A transform kernel matrix to be applied in each mode is shown in Table 5 to Table 7. Here, either the arrangement order shown in Table 10 or the arrangement order shown in Table 11 may be applied for the planar mode of intra prediction mode 0, the DC mode of intra prediction mode 1, and intra prediction mode 34. For example, for intra prediction mode 34, input data may be arranged according to the row-first direction as shown in Table 10.

According to another example, all of the illustrative transform kernel matrices shown in Table 9 applicable to a 4×4 region are transform kernel matrices multiplied by 128 as a scaling value. In a g_aiNsst4x4[N1] [N2] array present in matrix arrays of Table 9, N1 denotes the number of transform sets (N1 is 4 or 35, distinguished by index 0, 1, . . . , and N1-1), N2 denotes the number (1 or 2) of transform kernel matrices included in each transform set, and [16][16] denotes a 16×16 transform.

As shown in Table 3 and Table 4, when a transform set includes one transform kernel matrix, either a first transform kernel matrix or a second transform kernel matrix may be used for the transform set in Table 9.

As in the 8×8 RST, only m transform coefficients may be output when only an m×16 portion of a 16×16 matrix is applied. For example, when only eight transform coefficients are output by setting m=8 and multiplying only an 8×16 matrix from the top, it is possible to reduce computational amount by half. To reduce computational amount in a worst case, an 8×16 matrix may be applied to a 4×4 transform unit (TU).

Basically, the transform kernel matrices applicable to a 4×4 region, presented in Table 9, may be applied to a 4×4 TU, a 4×M TU, and an M×4 TU (M>4, the 4×M TU and the M×4 TU may be divided into 4×4 regions, to which each designated transform kernel matrix may be applied, or the transform kernel matrices may be applied only to a maximum top-left 4×8 or 8×4 region) or may be applied only to a top-left 4×4 region. If the secondary transform is configured to be applied only to the top-left 4×4 region, the transform kernel matrices applicable to an 8×8 region, shown in Table 8, may be unnecessary.

An m×16 transform matrix applicable to a 4×4 region (m≤16, e.g., the transform kernel matrices in Table 9) receives 16 pieces of data and generates m coefficients. That is, when the 16 pieces of data form a 16×1 vector, an m×1 vector is generated by sequentially multiplying an m×16 matrix and a 16×1 vector. Here, the 16 pieces of data forming the 4×4 region may be properly arranged to form a 16×1 vector. For example, as shown in Table 12, the data may be arranged in the order of indexes indicated at respective positions in the 4×4 region.

TABLE 12

| 1  | 2  | 3  | 4  |
|----|----|----|----|
| 5  | 6  | 7  | 8  |
| 9  | 10 | 11 | 12 |
| 13 | 14 | 15 | 16 |

As shown in Table 12, the data is arranged in the row-first direction in the 4×4 region for a secondary transform. This order refers to an order in which two-dimensional data is one-dimensionally arranged for a secondary transform, specifically an RST or an LFNST, and may be applied to a forward secondary transform performed in an encoding apparatus. Accordingly, in an inverse secondary transform performed by the inverse transformer of the encoding apparatus or the inverse transformer of the decoding apparatus, transform coefficients generated as a result of the transform, that is, primary transform coefficients, may be two-dimensionally arranged as shown in Table 12.

When there are 67 intra prediction modes as shown in FIG. 5, all directional modes (mode 2 to mode 66) are symmetrically configured about mode 34. That is, mode (2+n) is symmetric to mode (66−n) (0≤n≤31) about mode 34 in terms of prediction direction. Therefore, if a data arrangement order for configuring a 16×1 input vector for mode (2+n), that is, modes 2 to 33, corresponds to the row-first direction as shown in Table 12, a 64×1 input vector for mode (66−n) may be configured in an order shown in Table 13.

TABLE 13

| 1 | 5 | 9  | 13 |
|---|---|----|----|
| 2 | 6 | 10 | 14 |
| 3 | 7 | 11 | 15 |
| 4 | 8 | 12 | 16 |

As shown in Table 13, the data is arranged in the column-first direction in the 4×4 region for a secondary transform. This order refers to an order in which two-dimensional data is one-dimensionally arranged for a secondary transform, specifically an RST or an LFNST, and may be applied to a forward secondary transform performed in an encoding apparatus. Accordingly, in an inverse secondary transform performed by the inverse transformer of the encoding apparatus or the inverse transformer of the decoding apparatus, transform coefficients generated as a result of the transform, that is, primary transform coefficients, may be two-dimensionally arranged as shown in Table 13.

Table 13 shows that, for intra prediction mode (66−n), that is, for modes 35 to 66, a 16×1 input vector may be configured for according to the column-first direction.

In summary, the same transform kernel matrices shown in Table 9 may be applied while symmetrically arranging input data for mode (2+n) according to the row-first direction and input data for mode (66−n) (0≤n≤31) according to the column-first direction. A transform kernel matrix to be applied in each mode is shown in Table 5 to Table 7. Here, either the arrangement order shown in Table 12 or the arrangement order shown in Table 13 may be applied for the planar mode of intra prediction mode 0, the DC mode of intra prediction mode 1, and intra prediction mode 34. For example, for intra prediction mode 34, input data may be arranged according to the row-first direction as shown in Table 12.

On the other hand, according to another embodiment of this document, for 64 pieces of data forming an 8×8 region, not the maximum 16×64 transform kernel matrix in Tables 8 and 9, but a maximum of 16×48 kernel matrix can be applied by selecting only 48 pieces of data. Here, "maximum" means that the maximum value of m is 16 for an m×48 transform kernel matrix capable of generating m coefficients.

A 16×48 transform kernel matrix according to the present embodiment may be represented as shown in Table 14.

TABLE 14

```
const int g_aiNsst8x8[4][2][16][48] = {
  { //0
    {
      { -117,28,18,2,4,1,2,1,32,-18,-2,0,-1,0,0,0,14,-1,-3,0,-1,0,0,0,2,0,0,0,0,0,0,0,3,0,-1,0,1,0,0,0,1,0,0,0,1,0,0,0 },
      { -29,-91,47,1,9,0,3,0,-54,26,-8,3,0,1,0,0,33,5,-9,-1,-2,0,-1,0,-3,3,0,0,0,0,0,0,7,2,-2,0,-1,1,0,0,2,1,-1,0,0,0,0,0 },
      { -10,52,-11,-8,-2,-2,-1,-1,-95,3,32,0,4,0,2,0,32,-30,-4,4,-1,1,0,0,6,2,-5,0,0,0,0,0,6,-3,0,0,2,0,-1,0,2,-1,0,0,1,0,0,0 },
      { -15,15,-10,-2,1,0,1,0,10,112,-20,-17,-4,-4,-1,-2,-20,-26,31,1,0,0,0,0,2,-16,-1,6,0,1,0,0,1,-4,0,0,0,-3,0,1,0,-1,0,0,0,-2,0,0 },
      { 32,39,92,-44,4,-10,1,-4,26,12,-15,13,-5,2,-2,0,29,-16,-22,8,0,1,0,1,-20,6,4,-3,1,0,0,0,1,-4,-3,2,-4,1,0,0,1,-1,-2,1,-2,0,0,0 },
      { -10,1,50,-15,2,-3,1,-1,-28,-15,14,6,1,1,1,0,-99,-4,9,5,5,2,2,1,44,-10,-11,1,-2,0,-1,0,-5,4,-3,0,8,-1,-2,0,-2,1,-1,0,4,0,-1,0 },
      { 1,-33,-11,-14,7,-2,2,0,29,-12,37,-7,-4,0,-1,0,6,-99,3,26,-1,5,0,2,14,30,-27,-2,1,-1,0,-1,-6,6,6,-3,1,3,-3,0,-1,1,1,0,0,1,-1,0 },
      { 0,6,-6,21,-4,2,0,0,-20,-24,-104,30,5,5,1,2,-7,-46,10,-14,7,0,1,0,9,21,7,-6,-2,-1,0,-1,-2,2,5,-2,0,3,4,-1,0,0,1,0,0,1,2,-1 },
      { -13,-13,-37,-101,29,-11,8,-3,-12,-15,-20,2,-11,5,-2,1,-12,10,26,12,-6,0,-1,0,-32,-2,11,3,3,-1,1,0,11,-5,-1,6,-4,2,1,0,3,-1,1,2,-1,0,0,0 },
      { 6,1,-14,-36,9,-3,2,0,10,9,-18,-1,-3,1,0,0,38,26,-13,-1,-5,-1,-1,0,102,3,-14,-1,-5,-1,-2,0,-29,10,10,0,10,-4,-1,-1,-7,1,2,1,2,-1,0,0 },
      { -12,-2,-26,-12,-9,2,-1,-1,-3,30,4,34,-4,0,-1,0,-30,3,-92,14,19,0,3,0,-11,34,21,-33,1,-2,0,-1,-9,-4,18,3,2,0,0,0,-2,-1,-1,3,0,0,0,0,-1 },
      { 0,-3,0,-4,-15,6,-3,1,-7,-15,-28,-86,19,-5,4,-1,-5,-17,-41,42,-6,2,-1,1,-1,-40,37,13,-4,2,-1,1,-10,13,-1,-4,4,-4,3,4,-2,-2,-1,1,-1,1,1,2 },
      { -1,9,13,5,14,-2,2,-1,-8,3,-4,-62,4,1,1,0,-12,23,16,-11,-17,0,-1,0,-11,97,-3,-3,0,-6,0,-2,-21,-5,23,0,2,-2,-1,6,-3,-3,1,0,0,0,0,2 },
      { 6,2,-3,2,10,-1,2,0,8,3,-1,-20,0,1,0,0,-4,-4,-16,0,-2,0,1,0,34,23,6,-7,-4,-2,-1,0,108,-5,-30,6,-27,10,7,-2,11,-3,-1,1,-4,1,0,1 },
      { 6,9,-2,35,110,-22,11,-4,-2,0,-3,1,-18,12,-3,-2,-5,-4,-22,8,-25,3,0,0,-3,-21,2,-3,9,-2,1,0,-7,1,3,-5,-3,0,-1,0,0,1,0,-1,1,0,0,0 },
      { -1,7,-2,9,-11,5,-1,-1,-7,-2,-22,4,-13,0,-1,0,0,28,0,76,4,-6,0,-2,-13,5,-76,-4,33,-1,3,0,9,18,-3,-35,-4,-1,6,1,1,2,0,-3,-1,0,2,0 },
    },
    {
      { -108,48,9,1,1,1,0,0,44,-6,-9,-1,-1,0,-1,0,9,-9,-1,-1,0,0,0,0,3,-1,-1,0,0,0,0,0,1,-1,0,0,1,0,0,0,0,0,-1,0,0,0,0,0 },
      { 55,66,-37,-5,-6,-1,-2,0,67,-30,-20,4,-2,0,-1,0,-31,-19,14,4,1,1,1,0,-6,3,5,-2,0,0,0,0,-7,-1,1,1,0,-1,1,1,1,0,-2,-1,1,0,0,0,0,0 },
      { 2,86,-21,-13,-4,-2,-1,-1,-88,5,6,4,5,1,1,0,14,-5,0,3,0,0,0,0,0,10,-5,-2,0,-1,0,0,0,6,-5,0,1,2,-1,0,0,1,-1,0,0,1,0,0,0 },
      { -24,-21,-38,19,0,4,-1,-2,-23,-89,31,20,2,3,1,1,-30,26,35,-8,-2,-2,0,-1,-14,18,-7,-9,-1,-1,0,0,0,1,3,-2,-1,3,2,-2,-1,0,1,0,0,1,1,-1,0 },
      { 9,20,98,-26,-3,-5,0,-2,-9,-26,15,-16,2,0,1,0,-61,-3,-2,3,7,1,1,0,12,16,-6,-1,0,-1,0,0,0,2,0,-8,1,3,1,-1,-1,0,-1,-2,0,1,0,-1,0 },
      { -21,-7,-37,10,2,2,-1,-1,-10,69,-5,-7,-2,-2,0,-1,-93,2,19,0,3,0,2,0,17,4,0,0,-1,0,0,0,5,-4,-2,0,4,-2,0,1,0,0,0,0,0,2,-1,0,0 },
      { -10,-25,4,-17,8,-2,2,-1,-27,-17,-71,25,8,2,1,1,-4,-66,28,36,-5,3,0,1,-10,20,33,-13,-8,0,0,-1,3,6,-3,-7,-1,3,3,-1,1,0,- 1,0,0,1,1,-1 },
      { 2,5,10,64,-9,4,-3,-1,-4,8,62,3,-17,1,-2,0,-3,-75,5,-14,1,4,0,1,-36,3,18,-4,4,0,1,0,1,14,-2,-8,-2,1,-3,0,2,2,-1,-2,0,1,-1,0 },
      { -11,-15,-28,-97,6,-1,4,-1,7,3,57,-15,10,-2,0,-1,-1,-27,13,6,1,-1,0,0,-34,-6,0,3,4,1,2,0,-2,8,1,5,-2,0,-3,1,1,1,0,2,-1,0,-1,0 },
      { 9,13,24,-6,7,-2,1,-1,16,39,20,47,-2,-2,-2,0,0,28,23,76,-5,-25,-3,-3,-1,6,36,-7,-39,-4,-1,0,-1,2,-4,-18,-3,-1,-1,-2,-2,1,-2,-2,0,0,0,-1,-1 },
      { -7,11,12,7,2,-1,0,-1,-14,-1,-24,11,2,0,0,0,-20,48,11,-13,-5,-2,0,-1,-105,-19,17,0,6,2,3,0,-14,8,8,2,1,2,-1,-2,3,0,-1,0,0,0,0,0 },
      { 0,0,7,-6,23,-3,3,-1,5,1,18,96,13,-9,-1,-1,-21,-7,-42,14,-24,-3,0,0,11,-47,-7,3,-5,9,1,2,0,-1,19,-1,-1,0,-1,-6,-1,1,2,0,1,0,0,-2 },
      { -2,-6,-1,-10,0,1,1,0,-7,-2,-28,20,-15,4,-3,1,-2,-32,-2,-66,3,7,1,2,-11,13,-70,5,43,-2,3,0,8,-14,-3,43,-1,2,7,-1,-1,-2,1,3,-1,1,1,0 },
      { -1,6,-16,0,24,-3,1,-1,2,6,6,16,18,-7,1,-1,-3,11,-63,9,4,-5,2,-1,-1,22,94,-4,-6,-4,-4,1,-2,10,23,-19,-5,0,-6,-4,6,3,-2,1,1,0,-1,0,0 },
      { -5,-6,-3,-19,-104,18,-4,3,0,6,0,35,-41,20,-2,-2,-2,-10,-18,16,21,3,-2,0,-2,11,6,-10,6,-3,-1,0,-1,5,-1,-6,-1,-1,-1,-1,-1,0,0,0,0,0,0,-1 },
      { -1,-2,0,23,-9,0,-2,0,1,1,8,-1,29,1,1,0,3,-6,13,76,30,-11,-1,-2,-26,-8,-69,7,-9,-7,3,-1,-10,-34,-25,13,-1,0,11,5,1,-1,-2,0,0,2,0 },
    }
  },
  { //1
    {
      { 110,-49,-3,-4,-1,-1,0,-1,-38,-1,-10,0,2,0,1,0,-9,13,1,-2,0,0,0,0,-4,2,-3,0,0,0,0,0,-2,2,0,0,1,-1,1,0,0,-1,0,0,0,-1,0,0,0 },
      { -43,-19,17,-1,3,0,1,0,-98,46,14,-1,2,0,1,0,26,26,-15,-3,-2,-1,-1,0,11,-7,-9,2,0,0,0,0,9,-3,-1,2,3,-3,0,0,0,4,-1,0,0,2,-1,0,0 },
      { -19,17,-7,3,-2,1,-1,0,-32,-59,29,3,4,0,2,0,-72,43,34,-9,3,-2,-1,-1,13,36,-18,-10,0,-2,0,-1,3,0,-12,3,6,1,-3,2,1,-1,-1,-2,0,3,1,-1,1,1 },
      { -35,-103,39,1,7,0,2,0,38,-13,25,-6,1,-1,0,0,-1,7,6,-7,1,-1,0,0,-13,14,2,-4,2,-1,0,0,-2,11,-6,-2,-2,4,-3,0,0,3,-2,0,0,-1,1,-1,1,-1,0 },
      { 9,5,-6,-1,-1,0,-1,0,42,4,21,-11,1,-3,1,-1,-21,70,-32,-21,0,-4,-1,-1,-34,-26,-67,11,4,2,0,1,-4,-32,5,24,1,-6,12,4,-3,-2,-4,-2,0,-1,0,0 },
      { -5,-5,-28,9,-3,2,-1,1,-20,-78,22,16,1,3,0,0,1,80,-6,-25,-5,-4,-1,-1,0,6,-24,7,-9,0,0,0,0,0,-7,3,13,-4,-3,5,1,-5,-2,3,1,-2,-1,2,-1,-2 },
      { 14,17,27,-12,1,-3,1,-1,-1,8,19,-13,4,-2,1,-1,0,48,-1,-48,-15,-4,-2,-1,-1,1,1,60,-28,-42,5,-6,1,-2,11,-11,-51,11,-2,-10,-2,13,2,-6,-4,4,-2,-3,2,2 },
      { 7,35,17,-4,-1,0,0,0,3,8,54,-17,1,-2,1,-1,-1,10,14,-11,-34,4,-4,1,-1,-80,-7,-6,2,15,0,3,0,-16,46,1,3,2,7,-24,0,2,-2,-5,8,1,-1,-2,2 },
      { -13,-27,-101,24,-8,6,-3,2,11,43,6,28,-6,-3,-1,-1,-3,14,21,-12,-7,-2,-1,-1,-1,23,10,-4,-12,3,0,1,0,2,9,-10,0,1,-5,-4,4,2,-2,2,2,0,-2,-1,0 },
      { -11,-13,-3,-10,3,-1,1,0,-19,19,-37,8,4,2,0,1,0,-12,-30,3,-9,5,0,1,0,-56,-9,-47,8,21,1,4,1,-11,-30,10,59,-2,8,41,8,2,5,6,-7,-1,3,5,-2 },
      { -4,-10,-24,-11,3,-2,0,-1,-6,-37,-45,-17,8,-2,2,-1,17,14,-58,14,15,0,2,0,-10,34,-7,28,4,-1,1,0,23,34,-31,4,10,-22,-30,22,4,-15,9,20,2,-5,9,4 },
      { -2,1,13,-17,3,-5,1,-2,3,0,-55,22,6,1,1,0,8,74,21,40,-14,0,-2,0,-36,-8,11,-13,-23,1,-3,0,-36,6,16,-14,2,19,-4,-12,-1,0,-7,-3,0,2,-2,-1 },
      { 3,1,5,-15,1,-2,1,-1,7,4,-7,29,-1,2,-1,1,8,3,12,-14,-9,-1,-1,0,4,29,-15,31,10,4,1,1,61,22,55,14,13,3,-9,-65,1,-11,-21,-7,0,0,-1,3 },
      { -4,-8,-1,-50,6,-4,2,-2,-1,5,-22,20,6,1,0,0,-16,-15,18,-29,-11,2,-2,1,40,-45,-19,-22,31,2,4,1,-25,41,0,12,97,-42,12,-3,-14,2,28,5,1,6,2 },
```

TABLE 14-continued

{ 5,-1,26,102,-13,12,-4,4,-4,-2,-40,-7,-23,3,-5,1,-1,5,8,-23,7,2,1,1,10,-11,-13,-3,12,-3,2,0,-9,23,4,9,14,9,-14,-4,0,-12,-7,6,3,0,6,3 },

{ -5,-6,-27,-22,-12,0,-3,0,-5,8,-20,-83,0,0,0,0,9,7,24,-20,41,3,6,1,15,20,12,11,17,-9,1,-2,-26,-1,18,-1,-12,32,3,-18,-5,10,-25,-5,-2,1,-8,10 },
},
{
{ 80,-49,6,-4,1,-1,1,-1,-72,36,4,0,1,0,0,0,26,0,-12,2,-2,1,-1,0,-7,-9,6,1,0,0,0,0,3,5,-1,-2,-2,-2,-1,1,1,1,0,0,-1,-1,0,0 },
{ -72,-6,17,0,3,0,1,0,-23,58,-21,2,-3,1,-1,0,55,-46,-1,6,-2,1,-1,0,-22,7,17,-7,2,-1,1,0,9,5,-12,1,-3,-4,4,2,4,1,-2,-1,-1,-1,1,0 },
{ -50,19,-15,4,-1,1,-1,1,-58,-2,30,-3,4,-1,2,0,6,57,-34,0,-2,0,-1,0,34,-48,-2,14,-4,3,-1,1,-10,7,21,-16,6,1,-11,0,-1,-1,4,2,3,0,-2,-1 },
{ -33,-43,28,-7,4,-2,2,-1,-38,11,-8,4,1,1,0,0,-55,24,26,-5,2,-1,1,0,15,46,-40,-1,-1,0,-1,0,17,-38,1,17,-3,11,15,-11,3,-1,-10,1,0,1,3,2 },
{ 10,66,-21,-3,-3,0,-1,0,-53,-41,-2,16,-1,4,-1,1,36,-5,41,-20,3,-3,1,-1,-30,25,-32,-3,7,-2,2,-1,2,-1,13,-8,1,17,-1,-2,4,-8,2,0,-1,3,0,0,0,-1 },
{ 18,14,13,-9,2,-2,1,-1,-34,32,-31,12,-5,2,-2,1,40,4,-4,-9,-3,-2,-1,-1,27,-31,-43,19,-2,3,-1,1,7,-49,52,10,-11,22,7,-26,-1,-6,-9,6,-2,2,4,-2 },
{ 21,66,-1,9,-4,2,-1,-1,-21,41,-30,-10,0,-2,0,-1,-35,-17,-3,26,-6,5,-2,2,56,3,18,-25,-1,-2,-1,-1,-15,-13,-27,9,9,-6,20,5,-3,2,-6,9,3,-3,1,5 },
{ 1,-6,-24,17,-5,3,-2,1,24,10,39,-21,5,-4,2,-1,33,32,-30,4,-3,-1,-1,0,-4,19,-16,-10,0,-1,0,0,24,-26,-37,33,5,-32,55,-5,-7,22,-14,-22,1,-9,-3,13 },
{ 9,33,-24,1,4,0,1,0,6,50,26,1,-10,0,-2,0,-27,1,-28,-21,16,-5,3,-2,-23,36,-2,40,-17,4,-3,1,43,-13,4,-41,-19,-2,-24,17,11,-4,8,4,-3,-3,-3,-3 },
{ -7,-9,-32,14,-3,3,-1,1,-23,-28,0,-5,-1,0,0,0,-36,-59,-24,14,4,2,1,1,-23,-26,23,26,-,3,5,0,2,10,-26,38,7,-12,11,42,-22,-5,20,-14,-15,-1,-2,1,6, },
{ 6,30,69,-18,5,-4,3,-1,-3,-11,-34,-16,9,-4,2,-1,-16,35,-35,30,-9,3,-2,1,-57,-13,6,4,-5,5,-1,1,28,10,4,7,0,-15,7,-10,-1,7,-2,2,1,-3,0,0 },
{ 1,-8,24,-3,7,-2,2,-1,-6,-51,-6,-4,-5,0,-1,0,38,-1,0,25,6,2,1,1,47,20,35,1,-27,1,-5,0,37,-37,-9,-47,-28,5,0,18,8,6,0,-8,-4,-2,-3,1 },
{ 4,10,4,17,-9,4,-2,1,5,14,32,-15,9,-3,2,-1,7,13,19,15,-8,1,-1,0,3,25,30,-18,1,-2,0,-1,11,24,22,-11,-3,37,-13,-58,-5,12,-63,26,9,-15,11,8 },
{ -3,-9,-23,10,-10,3,-3,1,-5,-14,-16,-27,13,-6,2,-1,-1,-13,-30,11,-5,2,-1,0,-5,-8,-22,-16,10,0,1,0,0,-29,-27,6,-27,-10,-30,9,-3,-10,-7,77,9,-13,45,-8 },
{ 2,11,22,2,9,-2,2,0,-6,-7,20,-32,-3,-4,0,-1,13,-5,28,6,18,-4,3,-1,-26,27,-14,6,-20,0,-2,0,-76,25,-4,-7,12,51,5,24,7,-17,-16,-12,-5,4,2,13 },
{ 2,-3,8,14,-5,3,-1,1,-2,-11,5,-18,8,-3,2,-1,-12,-23,-19,22,2,0,1,0,23,41,-7,35,-10,4,-1,1,5,7,23,5,69,-38,-8,-32,-15,-31,24,11,2,18,11,15 },
}
},
{ //2
{
{ -121,33,4,4,1,2,0,1,-1,-1,1,0,0,0,0,0,24,-5,-1,-1,0,0,0,0,3,-1,0,0,2,-1,0,0,2,-1,0,0,0,1,0,0,0 },
{ 0,-2,0,0,0,0,0,0,121,-23,-7,-3,-2,-1,-1,0,17,1,-2,0,0,0,0,0,-27,4,2,0,0,0,0,0,-12,2,1,0,-5,1,0,0,-1,0,0,0,-2,0,0,0 },
{ -20,19,-5,2,-1,1,0,0,16,3,-2,0,0,0,0,0,-120,14,8,1,3,1,1,0,-18,-2,3,0,1,0,0,0,17,-3,-1,0,6,-1,-1,0,2,0,0,0,2,0,0,0 },
{ 32,108,-43,10,-9,3,-3,1,4,19,-7,1,-1,0,0,0,11,-30,9,-2,1,-1,0,0,0,-8,2,0,0,0,0,0,-7,-1,2,0,-3,-1,1,0,-2,-2,1,0,0,0,0,0 },
{ -3,0,-1,0,0,0,0,0,-29,11,-2,1,0,0,0,0,12,7,-1,0,0,0,0,0,-117,12,9,1,3,0,1,0,-32,-3,-3,0,12,-2,-1,0,7,0,0,0,1,0,0,0 },
{ -4,-12,-3,1,-1,0,0,0,0,19,105,-31,7,-6,1,-2,0,9,46,-6,0,0,0,0,0,8,-29,9,-3,1,0,0,0,-3,-19,3,0,-4,-6,1,0,0,0,0,0,-1,0,0 },
{ 7,1,2,0,0,0,0,0,4,3,-2,0,0,0,0,0,22,-8,1,-1,0,0,0,0,-28,-9,4,0,1,0,0,0,0,117,-10,-8,0,32,1,-4,0,3,1,-1,0,-3,1,0,0 },
{ -8,-31,14,-4,3,-1,1,0,9,43,0,1,-1,0,0,0,-13,-105,17,-2,2,0,0,0,0,-8,-25,-3,0,0,0,0,0,0,-7,32,-5,1,-1,4,0,0,2,-1,0,0,1,0,-1,0 },
{ -15,-43,-100,23,-12,6,-4,2,-6,-17,-48,10,-5,2,-1,1,1,-5,19,-6,3,-1,1,0,2,7,15,-3,1,-1,0,0,4,10,5,-1,0,3,1,0,-2,1,2,0-1,1,1,0 },
{ -3,1,2,0,0,0,0,0,-6,3,1,0,0,0,0,0,0,3,-2,0,0,0,0,0,-20,8,-2,0,0,0,0,0,0,30,13,-3,0,-116,6,10,0,-35,-5,4,0,-3,-1,0,0 },
{ -1,-6,-3,2,-1,0,0,0,0,-6,-35,9,0,2,0,0,0,1,-6,11,-2,2,0,1,0-9,-100,17,-1,1,0,0,0,-10,-63,1,2,-17,3,-4,0,-1,9,-1,0,3,4,-1,0 },
{ -5,-14,-48,2,-5,1,-2,0,10,24,99,-17,10,-4,3,-1,4,14,32,0,2,0,1,0,-4,0,-39,6,-4,1,-1,0,2,-3,-4,0,2,-2,-2,0,0,0,0,-1,0,0,-1,-1,0 },
{ -2,0,2,0,0,0,0,0,-2,0,1,0,0,0,0,0,-1,-1,1,-1,0,0,0,0,-1,-4,2,0,0,0,0,0,-8,-2,-1,1,30,4,-4,1,-1,69,-2,6,-1 },
{ -2,-10,-4,0,0,0,0,0,0,3,11,-1,-1,0,0,0,0,0,-6,-40,-15,6,-2,1,0,0,5,57,-6,2,0,0,0,0,0,1,-95,18,-6,-10,-34,-2,0,-4,17,-2,0,0,0,2,1,0 },
{ -2,-3,-25,-2,-3,0,-1,0,-1,3,-1,4,-2,2,0,1,-7,-8,-97,17,-9,3,-3,1,-8,-26,-61,-1,-3,-1,-41,-1,2,10,24,-7,5,9,19,-1,0,1,4,0,-2,0,1,0 },
{ 4,-4,28,103,-42,24,-9,7,1,2,4,0,3,-1,0,0,-1,0,-9,-42,17,-9,3,-2,-1,1,-14,6,-4,2,-1,0,-1,-2,-4,4,0,3,1,-1,0,2,0,-2,2,0,0,0 },
},
{
{ 87,-41,3,-4,1,-1,0,-1,-73,28,2,1,1,1,0,0,30,-5,-6,1,-1,0,0,0,-8,-3,-3,0,0,0,0,0,3,2,-1,0,-2,-1,0,0,1,1,0,0,-1,0,0,0 },
{ -75,4,7,0,2,0,1,0,-41,36,-7,3,-1,1,0,0,72,-29,-2,0,-1,0,-1,0,-37,6,7,-2,1,0,0,0,0,12,3,-4,0,-3,-2,1,0,4,0,0,0,-1,0,0,0 },
{ 26,-44,22,-6,4,-2,1,-1,77,24,-22,2,-4,0,-1,0,7,-38,10,0,1,0,0,0,-51,27,4,-3,2,-1,1,0,31,-5,-8,3,-14,0,5,-1,6,1,-3,0,-4,-1,1,0 },
{ -39,-68,37,-7,6,-2,2,0,-9,56,-21,1,-2,0,-1,0,-45,4,-3,6,-1,2,0,1,49,-13,3,-3,-1,0,0,0,-19,2,0,0,5,1,1,0,-2,0,-1,0,1,0,0,0 },
{ 10,-20,2,0,1,0,0,0,50,-1,8,-5,1,-1,0,0,55,17,-24,4,-3,1,-1,0,13,-49,15,1,0,0,0,0,-53,34,6,-5,30,-7,-11,3,-11,-2,5,1,4,2,-1,-1 },
{ -21,-45,8,-2,3,-1,1,0,-7,-30,26,-8,3,-1,1,-1,-9,69,-33,5,-2,0,-1,0,-44,-31,10,7,-2,2,0,1,49,7,2,-6,-23,-3,-2,2,9,4,0,0,-2,-1,-1,0 },
{ -4,-2,-55,28,-8,5,-3,2,-2,37,43,-19,1,-2,1,-1,-47,-34,-27,5,4,-1,1,0,-39,-2,27,4,-2,1,0,0,-11,32,-8,-7,27,-12,-6,6,-13,0,4,-3,3,-1,-2,1 },
{ 2,19,47,-23,6,-4,2,-1,-23,-22,-44,17,-2,2,-1,0,-33,3,22,-2,-4,1,-1,0,-58,-17,6,-6,7,-1,1,0,-23,40,-2,5,43,-11,-8,-1,-18,-4,5,2,4,3,0,-1 },
{ -19,-62,-9,3,0,0,0,0,-12,-56,27,-7,3,-1,1,0,7,-8,16,-6,4,-2,1,-1,-15,54,-23,2,-1,0,0,0,-42,-25,4,6,34,8,2,-2,-15,-1,0,-1,3,2,0,1 },
{ 1,9,-5,0,-1,0,0,0,0,0,22,-1,2,0,1,0,0,0,-13,17,0,-2,0,-1,0,0,-46,-10,-10,4,-1,1,0,0,-80,-27,20,-4,-66,23,-2,-2,20,-3,-2,3,-14,2,3,-1 },
{ 5,17,-9,0,-2,1,0,0,13,54,-2,7,-1,1,0,0,4,51,-3,-6,-1,-1,0,0,-20,6,-34,9,-2,2,-1,0,16,-52,28,1,59,15,-8,-5,-28,-7,2,2,10,3,0,-1 },

TABLE 14-continued

```
        { 7,27,56,-2,10,-3,3,-1,-2,-6,8,-28,3,-4,1,-1,-1,-4,-68,35,-5,5,-2,1,0,35,43,-4,-6,1,-1,0,-14,-38,-12,-10,9,5,7,6,-9,7,-4,-3,4,-4,0,3 },
        { 0,0,19,-4,3,-2,2,-1,-3,-13,10,-4,1,0,0,0,-6,-37,-18,-5,2,-2,1,-1,6,-6,-7,25,-6,4,-1,1,16,10,55,-24,15,45,-52,1,35,-43,10,12,-23,13,5,-8 },
        { -3,0,-27,-80,40,-15,6,-4,4,3,3,1,61,-22,7,-1,1,-4,-7,-25,-6,-10,6,-4,1,3,8,14,-18,15,-5,2,-1,-2,-4,-1,13,0,2,-4,-3,3,-1,2,1,-2,0,-2,-1 },
        { 1,2,-8,6,-1,1,0,0,2,8,-5,1,0,0,0,0,1,24,3,5,-1,1,0,0,-3,12,6,-10,1,-1,0,0,-9,-1,-25,10,45,-11,18,2,86,1,-13,-4,-65,-6,7,2 },
        { -4,-18,57,8,-8,1,-3,0,-5,-20,-69,7,-6,2,-2,1,1,4,0,33,-7,5,-2,1,0,-9,53,-22,3,-1,0,0,4,-27,2,-9,5,36,-13,5,-7,-17,1,2,4,6,4,-1 },
    }
  },
  { //3
    {
        { -115,37,9,2,2,1,0,10,-29,8,0,1,0,1,0,23,-8,-8,1,-1,0,0,0,3,3,-2,-1,0,0,0,0,4,0,0,-1,1,1,0,0,2,0,0,0,0,0,0,0 },
        { 15,51,-18,0,-3,0,-1,0,-95,7,34,-3,5,-1,2,0,23,-47,1,6,0,14,0,1,8,5,-12,0,-1,0,0,0,3,-3,1,-1,2,1,-2,0,1,-1,0,0,1,1,-1,0 },
        { 29,-22,16,-6,3,-2,1,-1,-4,-80,12,15,0,3,0,1,45,7,-59,7,-2,1,-1,0,-15,41,-3,-16,2,-3,0,-1,1,0,7,-2,-3,6,1,-2,0,0,1,0,-1,2,0,-1 },
        { -36,-98,25,5,41,2,1,-59,11,-17,1,1,1,0,0,6,-13,7,-3,0,0,0,0,14,-4,-14,3,-1,0,0,0,2,8,-3,-5,2,0,0,0,0,3,0,-1,1,0,0,0 },
        { -6,18,3,-3,-1,0,0,0,-50,-5,-38,12,0,2,0,1,3,67,-7,-40,3,-6,1,-3,-12,-13,65,-3,-10,0,-1,0,9,-20,-5,22,-20,0,-1,2,-3,-2,3,-1,0,1,0 },
        { 4,15,52,-13,5,-3,2,-1,-17,-45,16,24,-2,4,-1,2,-87,-8,-14,7,8,1,2,0,23,-35,-6,-3,1,1,0,0,2,5,-17,0,3,-1,-1,-5,0,1,-4,0,1,0,0,-2 },
        { -20,-7,-43,4,0,1,-1,1,-7,35,0,12,-4,1,-1,0,-51,-2,-57,5,15,0,4,0,7,39,5,-55,1,-7,1,-3,1,-10,41,2,4,-3,-2,3,-1,-27,1,1,-1,-1,0 },
        { 4,29,1,26,-5,4,-2,1,-17,-7,-73,6,6,2,1,1,-5,21,-3,5,-1,-3,0,-1,-11,2,-52,-3,27,-2,5,0,0,27,8,-58,2,-5,25,3,0,3,0,-5,0,-2,7,0 },
        { 12,13,10,2,-1,3,-1,1,17,-2,-46,12,7,0,2,0,16,-45,-9,-53,6,1,1,0,70,16,8,-4,-37,1,-7,0,-12,29,3,21,4,0,5,-1,-3,4,1,4,2,0,1,0 },
        { 5,20,90,-17,4,-3,2,-1,6,56,8,28,-7,3,-1,1,29,5,-19,12,9,-1,1,0,-10,14,-1,-13,7,0,1,0,0,-6,13,-4,0,-4,1,5,0,-1,-1,1,0,-1,0,0 },
        { -3,-4,-34,-12,2,-1,-1,0,5,25,11,43,-10,4,-2,1,23,20,-40,12,21,-3,4,-1,25,-28,-10,5,8,6,0,2,-4,21,-64,-8,-5,19,10,-48,3,-1,10,-3,0,4,3,-6 },
        { -1,-3,2,19,-2,4,-1,2,9,3,-35,22,11,1,2,0,-7,-65,-19,22,11,4,2,1,-75,-18,3,-1,-10,2,0,1,2,-35,27,4,1,8,-17,-19,3,0,3,-6,0,2,-1,-2 },
        { 10,-4,-6,12,5,1,1,0,11,-9,-12,-2,-7,0,-1,0,33,-10,-4,18,18,-4,4,-1,28,-72,1,-49,15,2,2,1,56,-23,2,2,-1,4,-1,-15,26,6,4,-10,0,0,2,-3,2 },
        { 4,6,14,53,-4,4,0,2,0,-1,-20,-13,3,2,-1,1,-3,1,-5,35,-16,-6,-1,-2,46,29,13,21,37,-5,4,-1,-10,-53,-18,8,9,12,-41,-25,-2,2,13,-16,4,1,-5,1 },
        { 2,9,13,37,19,6,2,2,-9,-3,-9,-28,-20,-4,-3,-1,1,18,9,28,24,6,2,2,-20,-5,-25,-33,-36,9,-2,2,-13,42,1,57,-22,-2,-25,-28,5,6,19,-12,-5,-3,-2,4 },
        { 3,-3,12,84,-12,8,-2,3,6,13,50,-1,45,1,7,0,-2,18,-22,-37,-13,14,0,3,1,-12,-3,-2,-15,-8,1,-1,19,14,-4,-12,-4,5,17,8,2,-4,-4,4,-2,2,1,0 },
    },
    {
        { 109,-26,-8,-3,-2,-1,-1,0,-50,28,2,1,0,0,0,0,-18,-6,6,0,1,0,1,0,6,-2,-3,0,0,0,0,0,-3,2,1,-1,0,0,0,0,-2,0,0,0,0,0,0,0 },
        { -39,31,-5,2,-1,1,0,0,-95,6,18,0,4,0,1,0,32,-49,5,1,1,0,0,0,27,-1,-14,2,-2,1,-1,0,3,5,-3,-2,4,1,-1,-1,-1,2,0,0,0,2,0,0,0 },
        { 29,-3,-2,-2,0,0,0,0,0,-41,9,0,2,0,1,0,86,4,-33,2,-6,1,-2,0,-32,58,1,-7,0,-2,0,-1,-14,-8,20,0,-2,-3,0,4,-1,-1,0,0,-1,1,0,0 },
        { 18,96,-23,2,-5,1,-2,0,-10,6,10,-2,1,-1,1,0,-14,26,2,-4,1,-1,0,0,-43,-9,35,-2,4,-1,1,0,14,-40,1,10,2,1,-10,1,2,-4,-1,-1,0,0,-1,0 },
        { -29,-60,16,-2,3,-1,1,0,-52,9,-17,5,-2,1,-1,1,13,56,-2,-9,0,-2,0,-1,-34,-18,41,0,3,0,1,0,19,-36,-10,13,3,6,-14,-1,3,1,-1,-3,1,1,-1,-1 },
        { -23,-5,-15,5,-2,1,-1,1,2,79,-13,-4,-2,-1,-1,0,-9,1,5,-1,1,0,0,0,-4,49,2,-14,1,-3,0,-1,-31,-14,56,-1,13,-37,-4,20,-2,2,-10,0,2,-4,0,-1 },
        { -7,-3,12,-3,3,-1,1,0,-31,-62,8,7,0,2,0,1,-75,9,-45,5,-1,1,-1,0,14,35,0,-23,2,-5,1,-2,1,-8,32,-1,7,-12,-4,10,0,2,-6,-1,2,0,0,-2 },
        { 1,-26,5,0,1,0,1,0,24,-3,43,-6,4,-2,1,-1,-7,-64,9,14,0,3,0,1,-12,-4,5,3,-1,1,0,0,8,-59,-3,26,14,6,-58,6,-5,17,-7,-18,3,3,-1,-5 },
        { 11,14,6,-3,1,-1,1,0,10,-7,-9,3,-2,1,-1,0,22,21,1,-21,2,-4,1,-2,92,1,53,0,-9,1,-2,0,-21,-11,1,40,-5,-4,-24,5,-4,5,-6,-5,0,0,0,-3 },
        { -10,-11,-47,3,-4,1,-1,0,5,28,11,-2,-1,0,0,0,-12,-2,-38,2,0,1,0,0,16,38,11,-16,-1,-3,0,-2,12,-9,-22,7,-8,60,4,-36,-6,-15,54,7,3,-7,-8,14 },
        { -8,-24,-99,11,-10,3,-4,1,-5,-36,19,-26,4,-5,1,-2,0,25,41,5,-3,1,0,0,10,-5,-7,12,2,1,0,0,-1,1,9,-3,-3,-14,-3,12,2,4,-13,-2,-1,3,2,-4 },
        { -5,1,-1,0,1,0,0,0,-10,-14,-6,8,0,1,0,0,-17,-2,7,-5,3,-1,0,0,-16,13,3,31,-1,6,0,2,-93,-15,-46,-3,23,-19,0,-47,8,4,8,3,2,3,0,0 },
        { 1,12,-20,21,-4,5,-2,2,-5,-2,-75,9,-1,2,-1,1,-1,-2,-16,-4,0,-1,0,0,-7,7,-31,0,3,0,0,0,0,4,11,-12,4,-12,14,-50,-1,-8,32,-4,-54,2,0,30,-15 },
        { 2,-9,-18,8,-3,3,-1,1,3,-25,-62,-6,0,-2,0,-1,-6,-61,14,-51,2,-6,0,-2,-19,0,40,-7,-17,0,-3,0,13,-4,11,9,17,0,24,5,1,-12,4,28,0,0,-15,8 },
        { 4,9,39,18,0,2,0,1,-6,-16,-22,37,5,-5,1,-2,-5,15,63,9,-16,0,-3,0,18,42,-18,27,15,1,3,1,12,-34,9,-24,4,28,-2,4,-11,-4,30,2,5,-13,4,18 },
        { -7,-2,15,-6,1,-1,1,-1,-11,-3,22,-14,0,-2,1,-1,-18,-7,30,-9,-4,0,-1,0,-35,23,23,10,-17,1,-3,0,-19,53,6,48,-65,12,-12,11,-8,-16,10,-21,-2,-12,6,2 },
    }
  }
};
```

When the RST is performed by applying an m×48 transform matrix (m≤16) to an 8×8 region, 64 pieces of data are inputted and m coefficients may be generated. Table 14 shows an example of a transform kernel matrix when m is 16, and 48 pieces of data is inputted and 16 coefficients are generated. That is, assuming that 48 pieces of data form a 48×1 vector, a 16×1 vector may be generated by sequentially multiplying a 16×48 matrix and a 48×1 vector. At this time, 48 pieces of data forming an 8×8 region may be properly arranged to form a 48×1 vector, and the input data can be arranged in the following order.

TABLE 15

| 1  | 2  | 3  | 4  | 5  | 6  | 7  | 8  |
|----|----|----|----|----|----|----|----|
| 9  | 10 | 11 | 12 | 13 | 14 | 15 | 16 |
| 17 | 18 | 19 | 20 | 21 | 22 | 23 | 24 |
| 25 | 26 | 27 | 28 | 29 | 30 | 31 | 32 |
| 33 | 34 | 35 | 36 |    |    |    |    |
| 37 | 38 | 39 | 40 |    |    |    |    |
| 41 | 42 | 43 | 44 |    |    |    |    |
| 45 | 46 | 47 | 48 |    |    |    |    |

When the RST is performed, as shown in Table 14, when a matrix operation is performed by applying a maximum 16×48 transform kernel matrix, 16 modified transform coefficients are generate, the 16 modified transform coefficients can be arranged in the top-left 4×4 region according to the scanning order, and the top-right 4×4 region and the bottom-left 4×4 region can be filled with zeros. Table 16 shows an example of the arrangement order of 16 modified transform coefficients generated through the matrix operation.

TABLE 16

| 1 | 3  | 6  | 10 |
|---|----|----|----|
| 2 | 5  | 9  | 13 |
| 4 | 8  | 12 | 15 |
| 7 | 11 | 14 | 16 |

As shown in Table 16, the modified transform coefficient generated when the maximum 16×48 transform kernel matrix is applied can be filled in the top-left 4×4 region according to the scanning order. In this case, the number of each position in the top-left 4×4 region indicates the scanning order. Typically, the coefficient generated from an inner product operation of the topmost row of the 16×48 transform kernel matrix and the 48×1 input column vector is the first in the scanning order. In this case, the direction of going down to the bottom row and the scanning order may match. For example, a coefficient generated from the inner product operation between a 48×1 input column vector and an n-th row from the top becomes the n-th in the scanning order.

In the case of the maximum 16×48 transform kernel matrix, the 4×4 region in the top-right of Table 16 is the area to which the secondary transformation is not applied, so the original input data (primary transform coefficient) is preserved as it is, and the 4×4 region in the top-right 4×4 region and the bottom-left 4×4 region will be filled with zeros.

In addition, according to another embodiment, a scanning order other than the scanning order shown in Table 16 may also be applied. For example, a row-first direction or a column first direction may be applied as a scanning order.

In addition, even if the 16×64 transform kernel matrix shown in Table 8 is applied, 16 transform coefficients are equally generated, so the 16 transform coefficients can be arranged in the scanning order shown in Table 16 and in the case of applying the 16×64 transform kernel matrix since the matrix operation is performed using all 64 input data instead of 48, zeros are filled in all 4×4 regions except for the top-right 4×4 region. Also in this case, the scanning order in the diagonal direction as shown in Table 16 may be applied, and other scanning order such as the row first direction or the column first direction may be applied.

On the other hand, when inverse RST or LFNST is performed as an inverse transformation process performed by the decoding apparatus, the input coefficient data to which the inverse RST is applied are composed of a 1-D vector according to the arrangement order of Table 16, and the modified coefficient vector obtained by multiplying the 1D vector and the corresponding inverse RST matrix from the left can be arranged in a 2D block according to the arrangement order in Table 15.

In order to derive the transform coefficient, the decoding apparatus may first arrange information on the received transform coefficient according to the reverse scanning order, that is, the diagonal scanning order from 64 in FIG. 7.

Then, the inverse transform unit 322 of the decoding apparatus may apply the transform kernel matrix to transform coefficients arranged in one dimension according to the scanning order in Table 16. That is, 48 modified transform coefficients can be derived through the matrix operation between the one dimensional transform coefficients arranged according to the scanning order in Table 16 and the transform kernel matrix based on the transform kernel matrix in Table 14. That is, the one-dimensional transform coefficients can be derived into the 48 modified transform coefficients through the matrix operation with a matrix in which the transform kernel matrix in Table 14 is transposed.

The 48 modified transform coefficients derived in this way can be arranged in two dimensions as shown in Table 15 for the inverse primary transform.

In summary, in the transformation process, when RST or LFNST is applied to the 8×8 region, the transform operation is performed between 48 transform coefficients among the transform coefficients of the 8×8 region in the top-left, the top-right and the bottom-left regions of the 8×8 region excluding the bottom-right region of the 8×8 region and the 16×48 transform matrix kernel. For the matrix operation, 48 transform coefficients are inputted in a one-dimensional array in the order shown in Table 15. When such a matrix operation is performed, 16 modified transform coefficients are derived, and the modified transform coefficients may be arranged in the form shown in Table 16 in the top-left region of the 8×8 region.

Conversely, in the inverse conversion process, when inverse RST or LFNST is applied to the 8×8 region, 16 transform coefficients corresponding to the top-left of the 8×8 region among the transform coefficients of the 8×8 region are input in a one-dimensional array form according to the scanning order shown in Table 16, so that the transform operation is performed between the 48×16 transform kernel matrix and the 16 transform coefficients. That is, the matrix operation in this case can be expressed as (48×16 matrix)*(16×1 transform coefficient vector)=(48×1 modified transform coefficient vector). Here, since the n×1 vector can be interpreted in the same meaning as the n×1 matrix, it may be expressed as an n×1 column vector. Also, * means matrix multiplication operation. When such a matrix operation is performed, the 48 modified transform coefficients can be derived, and the 48 modified transform coefficients may be arranged in the top-left, the top-right, and the bottom-left region excluding the bottom-right region of the 8×8 region as shown in Table 15.

Meanwhile, according to an embodiment, as shown in Table 15, data arrangement in an 8×8 region for the secondary transformation is in row-first order. When there are 67 intra prediction modes as shown in FIG. 5, all directional modes (mode 2 to mode 66) are symmetrically configured about mode 34. That is, mode (2+n) is symmetric to mode (66−n) (0≤n≤31) about mode 34 in terms of prediction direction. Therefore, if a data arrangement order for configuring a 48×1 input vector for mode (2+n), that is, modes 2 to 33, corresponds to the row-first direction as shown in Table 15, a 48×1 input vector for mode (66−n) may be configured in an order shown in Table 17.

TABLE 17

| 1 | 9  | 17 | 25 | 33 | 37 | 41 | 45 |
|---|----|----|----|----|----|----|----|
| 2 | 10 | 18 | 26 | 34 | 38 | 42 | 46 |
| 3 | 11 | 19 | 27 | 35 | 39 | 43 | 47 |
| 4 | 12 | 20 | 28 | 36 | 40 | 44 | 48 |
| 5 | 13 | 21 | 29 |    |    |    |    |
| 6 | 14 | 22 | 30 |    |    |    |    |
| 7 | 15 | 23 | 31 |    |    |    |    |
| 8 | 16 | 24 | 32 |    |    |    |    |

As shown in Table 11, the data is arranged in the column-first direction in the 8×8 region for a secondary transform. Table 17 shows that, for intra prediction mode (66−n), that is, for modes 35 to 66, a 48×1 input vector may be configured for according to the column-first direction.

In summary, the same transform kernel matrix shown in Table 14 may be applied while symmetrically arranging input data for mode (2+n) according to the row-first direction and input data for mode (66−n) (0≤n≤31) according to the column-first direction. A transform kernel matrix to be applied in each mode is shown in Table 5 to Table 7.

Here, either the arrangement order shown in Table 15 or the arrangement order shown in Table 17 may be applied for the planar mode of intra prediction mode 0, the DC mode of intra prediction mode 1, and the intra prediction mode 34. For example, for the planar mode of intra prediction mode 0, the DC mode of intra prediction mode 1, and the intra prediction mode 34, input data may be arranged according to the row-first direction as shown in Table 15 and the arrangement order shown in Table 16 can be applied to the derived transform coefficients. Alternatively, for the planar mode of intra prediction mode 0, the DC mode of intra prediction mode 1, and the intra prediction mode 34, input data may be arranged according to the column-first direction as shown in Table 17 and the arrangement order shown in Table 16 can be applied to the derived transform coefficients.

As described above, when the 16×48 transform kernel matrix of Table 14 is applied to the secondary transformation, the top-right 4×4 region and the bottom-left 4×4 region of the 8×8 region are filled with zeros as shown in Table 16. When an m×48 transform kernel matrix is applied to the secondary transform (m≤16), not only the top-right 4×4 region and the bottom-left 4×4 region, but also from the (m+1)th to 16th in the scanning order shown in Table 16 can be filled with zeros.

Therefore, if there is any non-zero transform coefficient from the (m+1)th to 16th position in the scanning order or in the top-right 4×4 region or the bottom-left 4×4 region, it can be considered that the m×48 secondary transform is (m≤16) is not applied. In this case, the index for the secondary transformation may not be signaled. The decoding apparatus first parses the transform coefficient and checks whether the corresponding condition (that is, if a non-zero transform coefficient exists in the region where the transform coefficient should be 0) is satisfied and if it is satisfied the decoding apparatus may infer the index for the secondary transformation to zero without parsing the index. For example, in the case of m=16, it may be determined whether to apply the secondary transformation and whether to parse the index for the secondary transformation by checking whether there is a non-zero coefficient in the top-right 4×4 region or the bottom-left 4×4 region.

Meanwhile, Table 18 shows another example of transform kernel matrices that can be applied to a 4×4 region.

TABLE 18

```
const int g_aiNsst4x4[4][2][16][16] = {
{ //0
  {
    { 108,-44,-15,1,-44,19,7,-1,-11,6,2,-1,0,-1,-1,0 },
    { -40,-97,56,12,-11,29,-12,-3,18,18,-15,-3,-1,-3,2,1 },
    { 25,-31,-1,7,100,-16,-29,1,-34,21,14,-4,-7,2,4,0 },
    { -32,-39,-92,51,-6,-16,36,-8,3,22,18,-15,4,1,-5,2 },
    { 8,9,33,-8,-16,-102,35,23,-4,38,-27,-5,5,16,-8,-5 },
    { -25,5,16,-3,-38,14,11,-3,-97,7,26,1,55,-10,-19,3 },
    { 8,9,16,1,37,36,94,-38,-7,3,-47,11,-6,-13,-17,10 },
    { 2,34,-5,1,-7,24,-25,-3,8,99,-28,-29,6,-43,21,11 },
    { -16,-27,-39,-109,6,10,16,24,3,19,10,24,-4,-7,-2,-3 },
    { -9,-10,-34,4,-9,-5,-29,5,-33,-26,-96,33,14,4,39,-14 },
    { -13,1,4,-9,-30,-17,-3,-64,-35,11,17,19,-86,6,36,14 },
    { 8,-7,-5,-15,7,-30,-28,-87,31,4,4,33,61,-5,-17,22 },
    { -2,13,-6,-4,-2,28,-13,-14,-3,37,-15,-3,-2,107,-36,-24 },
    { 4,9,11,31,4,9,16,19,12,33,32,94,12,0,34,-45 },
    { 2,-2,8,-16,8,5,28,-17,6,-7,18,-45,40,36,97,-8 },
    { 0,-2,0,-10,-1,-7,-3,-35,-1,-7,-2,-32,-6,-33,-16,-112 },
  },
  {
    { 119,-30,-22,-3,-23,-2,3,2,-16,3,6,0,-3,2,1,0 },
    { -27,-101,31,17,-47,2,22,3,19,30,-7,-9,5,3,-5,-1 },
    { 0,58,22,-15,-102,2,38,2,10,-13,-5,4,14,-1,-9,0 },
    { 23,4,66,-11,22,89,-2,-26,13,-8,-38,-1,-9,-20,-2,8 },
    { -19,-5,-89,2,-26,76,-11,-17,20,13,18,-4,1,-15,3,5 },
    { -10,-1,-1,6,23,25,87,-7,-74,4,39,-5,0,-1,-20,-1 },
    { -17,-28,12,-8,-32,14,-53,-6,-68,-67,17,29,2,6,25,4 },
    { 1,-24,-23,1,17,-7,52,9,50,-92,-15,27,-15,-10,-6,3 },
    { -6,-17,-2,-111,7,-17,8,-42,9,18,16,25,-4,2,-1,11 },
    { 9,5,35,0,6,21,-9,34,44,-3,102,11,-7,13,11,-20 },
    { 4,-5,-5,-10,15,19,-2,6,6,-12,-13,6,95,69,-29,-24 },
    { -6,-4,-9,-39,1,22,0,102,-19,19,-32,30,-16,-14,-8,-23 },
    { 4,-4,7,8,4,-13,-18,5,0,0,21,22,58,-38,-54,28 },
    { -4,-7,0,-24,-7,0,-25,3,-3,-30,8,-76,-34,4,-80,26 },
    { 0,6,0,30,-6,1,-13,-23,1,20,-2,80,-44,37,-68,1 },
    { 0,0,-1,5,-1,-7,1,-34,-2,3,-6,19,5,-38,11,-115 },
  }
},
{ //1
  {
    { -111,39,4,3,44,11,-12,-1,7,-16,-5,2,3,-1,4,2 },
    { -47,-27,15,-1,-92,43,20,-2,20,39,-16,-5,10,-5,-13,2 },
    { -35,-23,4,4,-17,-72,32,6,-59,18,50,-6,0,40,0,-13 },
    { 13,93,-27,-4,-48,13,-34,4,-52,11,1,10,3,15,-3,1 },
    { -11,-27,1,2,-47,-4,-36,10,-2,-85,14,29,-20,-2,57,4 },
    { 0,-35,32,-2,26,60,-3,-17,-82,1,-30,0,-37,21,3,12 },
    { -17,-46,-92,14,7,-10,-39,29,-17,27,-28,17,1,-15,-13,17 },
    { 4,-10,-23,4,16,58,-17,26,30,21,67,2,-13,59,13,-40 },
    { 5,-20,32,-5,8,-3,-46,-7,-4,2,-15,24,100,44,0,5 },
    { -4,1,38,-18,-7,-42,-63,-6,33,34,-23,15,-65,33,-20,2 },
    { -2,-10,35,-19,5,8,-44,14,-25,25,58,17,7,-84,-16,-18 },
    { 5,13,18,34,11,-4,18,18,5,58,-3,42,-52,-10,35,38 },
    { -5,-7,-34,-83,2,-1,-4,-73,4,20,15,-12,4,-3,44,12 },
    { 0,4,-2,60,5,9,42,34,5,-14,9,80,-5,13,-38,37 },
    { -1,2,7,57,3,-7,9,68,-9,6,-49,-20,6,-4,36,-64 },
    { -1,0,-12,23,1,-4,17,-53,-3,4,-12,72,-4,-8,-3,-83 },
  },
  {
    { 88,-55,6,-3,-66,27,9,-2,11,11,-13,1,-2,-7,1,2 },
    { -58,-20,27,-2,-27,75,-29,0,47,-42,-11,11,-9,-3,19,-4 },
    { -51,23,-22,5,-63,3,37,-5,1,64,-35,-4,29,-31,-11,13 },
    { -27,-76,49,-2,40,14,9,-17,-56,36,-25,6,14,3,-6,8 },
    { 19,-4,-36,22,52,7,36,-23,28,-17,-64,15,-5,-44,48,9 },
    { 29,50,13,-10,1,34,-59,1,-51,4,-16,30,52,-33,24,-5 },
    { -12,-21,-74,43,-13,39,18,-5,-58,-35,27,-5,19,26,6,-5 },
    { 19,38,-10,-5,28,66,0,-5,-4,19,-30,-26,-40,28,-60,37 },
    { -6,27,18,-5,-37,-18,12,-25,-44,-10,-38,37,-66,45,40,-7 },
    { -13,-28,-45,-39,0,-5,39,69,-23,16,-12,-18,-50,-31,24,13 },
```

TABLE 18-continued

```
    { -1,8,24,-51,-15,-9,44,10,-28,-70,-12,-39,24,-18,-4,51 },
    { -8,-22,-17,33,-18,-45,-57,-27,0,-31,-30,29,-2,-13,-53,49 },
    { 1,12,32,51,-8,-8,-2,-31,-22,4,46,-39,-49,-67,14,17 },
    { 4,5,24,60,-5,-14,-23,38,9,8,-34,-59,24,47,42,28 },
    { -1,-5,-20,-34,4,4,-15,-46,18,31,42,10,10,27,49,78 },
    { -3,-7,-22,-34,-5,-11,-36,-69,-1,-3,-25,-73,5,4,4,-49 },
  }
},
{ //2
  {
    { -112,47,-2,2,-34,13,2,0,15,-7,1,08,-3,-1,0 },
    { 29,-7,1,-1,-108,40,2,0,-45,13,4,-1,8,-5,1,0 },
    { -36,-87,69,-10,-17,-33,26,-2,7,14,-11,2,6,8,-7,0 },
    { 28,-5,2,-2,-29,13,-2,0,103,-36,4,1,48,-16,-4,1 },
    { -12,-24,15,-3,26,80,-61,9,15,54,-36,2,0,-4,6,-2 },
    { 18,53,69,-74,14,24,28,-30,-6,-7,-11,12,-5,-7,-6,8 },
    { 5,-1,2,0,-26,6,0,1,45,-9,-1,0,-113,28,8,-1 },
    { -13,-32,18,-2,15,34,-27,7,-25,-80,47,-1,-16,-50,28,2 },
    { -4,-13,-10,19,18,46,60,-48,16,33,60,-48,1,0,5,-2 },
    { 15,33,63,89,8,15,25,40,-4,-8,-15,-8,-2,-6,-9,-7 },
    { -8,-24,-27,15,12,41,26,-29,-17,-50,-39,27,0,35,-67,25 },
    { -2,-6,-24,13,-1,-8,37,-22,3,18,-51,22,-23,-95,17,17 },
    { -3,-7,-16,-21,10,24,46,75,8,20,38,72,1,2,1,7 },
    { 2,6,10,-3,-5,-16,-31,12,7,24,41,-16,-16,-41,-89,49 },
    { 4,8,21,40,-4,-11,-26,57,5,14,31,70,7,18,32,52 },
    { 0,1,4,11,-2,-4,-13,-34,3,7,20,47,-6,-19,-42,-101 },
  },
  {
    { -99,39,-1,2,65,-20,-5,0,-15,-2,5,-1,0,3,-1,0 },
    { 58,42,-33,3,33,-63,23,-1,-55,32,3,-5,21,-2,-8,3 },
    { -15,71,-44,5,-58,-29,25,3,62,-7,-4,-4,-19,4,0,1 },
    { 46,5,4,-6,71,-12,-15,5,52,-38,13,-2,-63,23,3,-3 },
    { -14,-54,-29,29,-9,61,-29,27,44,-48,5,-27,-21,12,7 },
    { -3,3,69,-42,-11,-50,-26,26,24,63,-19,-5,-18,-22,12,0 },
    { 17,16,-2,1,38,18,-12,0,62,1,-14,5,89,-42,8,-2 },
    { 15,54,-8,6,6,60,-26,-8,-30,17,-38,22,-45,-45,42,-7 },
    { -6,-17,-55,-28,9,30,-5,58,4,36,41,-52,-16,-36,-20,16 },
    { -2,-1,-9,-79,7,11,48,44,-13,-34,55,6,12,23,20,-11 },
    { 7,29,14,-6,12,53,10,-11,14,5,9,-15,-3,5,71,-54,13 },
    { -5,-24,-53,15,-3,-15,-61,26,6,30,-16,23,13,56,44,-35 },
    { 4,8,21,52,-1,-1,-5,29,-7,-17,-44,-84,8,20,31,39 },
    { -2,-11,-25,-4,-4,-21,-53,2,-5,-26,-84,19,-8,-19,-73,99 },
    { -3,-5,-23,-57,-2,-4,-24,-75,1,3,9,-25,6,15,41,61 },
    { 1,1,7,18,1,2,16,47,2,5,24,67,3,9,25,88 },
  }
},
{ //3
  {
    { -114,37,3,2,-22,-23,14,0,21,-17,-5,2,5,2,-4,-1 },
    { -19,-41,19,-2,85,-60,-11,7,17,31,-34,2,-11,19,2,-8 },
    { 36,-25,18,-2,-42,-53,35,5,46,-60,-25,19,8,21,-33,-1 },
    { -27,-80,44,-3,-58,1,-29,19,-41,18,-12,-7,12,-17,7,-6 },
    { -11,-21,37,-1,44,-4,47,-12,-37,-41,58,18,10,-46,-16,31 },
    { 15,47,10,-6,-16,-44,42,40,-80,25,-40,21,-23,-2,3,-14 },
    { 13,25,79,-39,-13,10,31,-4,49,45,12,8,3,-1,43,7 },
    { 16,11,-26,13,-13,-74,-20,-1,5,-6,29,-47,26,-49,54,2 },
    { -8,-34,-26,7,-26,-19,29,-37,1,22,46,-9,-81,37,14,20 },
    { -6,-30,-42,-12,-3,5,57,-52,-2,37,-12,6,74,10,6,-15 },
    { 5,9,-6,42,-15,-18,-9,26,15,58,14,43,23,-10,-37,75 },
    { -5,-23,-23,36,3,22,36,40,27,-4,-16,56,-25,-46,56,-27 },
    { 1,3,23,73,8,5,34,46,-12,2,35,-38,26,5,2,2,-31 },
    { -3,-2,-21,-52,1,-10,-17,44,-19,-20,30,45,27,61,49,21 },
    { -2,-7,-33,-56,-4,-6,21,63,15,31,32,-22,-10,-26,-52,-38 },
    { -5,-12,-18,-12,8,22,38,36,-5,-15,-51,-63,-5,0,15,73 },
  },
  {
    { -102,22,7,2,66,-25,-6,-1,-15,14,1,-1,2,-2,1,0 },
    { 12,93,-27,-6,-27,-64,36,6,13,5,-23,0,-2,6,5,-3 },
    { -59,-24,17,1,-62,-2,-3,2,83,-12,-17,-2,-24,14,7,-2 },
    { -33,23,-36,11,-21,50,35,-16,-23,-78,16,19,22,15,-30,-5 },
    { 0,-38,-81,30,27,5,51,-32,24,36,-16,12,-24,-8,9,1 },
    { 28,38,8,-9,62,32,-13,2,51,-32,15,5,-66,28,0,-1 },
    { 11,-35,21,-17,30,-18,31,18,-11,-36,-80,12,16,49,13,-32 },
    { -13,23,22,-36,-12,64,39,25,-19,23,-36,9,-30,-58,33,-7 },
    { -9,-20,-55,-83,3,-2,1,62,8,2,27,-28,7,15,-11,5 },
    { -6,24,-38,23,-8,40,-49,0,-7,9,-25,-44,23,39,70,-3 },
    { 12,17,17,0,32,27,21,2,67,11,-6,-10,89,-22,-12,16 },
    { 2,-9,8,45,7,-8,27,35,-9,31,-17,-87,-23,-22,-19,44 },
    { -1,-9,28,-24,-1,-10,49,-30,-8,-7,40,1,4,33,65,67 },
    { 5,-12,-24,17,13,-34,-32,-16,14,-67,-7,9,7,-74,49,1 },
```

TABLE 18-continued

```
    { 2,-6,11,45,3,-10,33,55,8,-5,59,4,7,-4,44,-66 },
    { -1,1,-14,36,-1,2,-20,69,0,0,-15,72,3,4,5,65 },
  }
 }
};
```

The following embodiments may be proposed in order to reduce computational amount in a worst case. In this document, a matrix including M rows and N columns is expressed as an M×N matrix, and the M×N matrix refers to a transform matrix applied in a forward transform, that is, when the encoding apparatus performs a transform (RST). Accordingly, in the inverse transform (inverse RST) performed by the decoding apparatus, an N×M matrix obtained by transposing the M×N matrix may be used. In addition, the following describes a case where an m×64 transform kernel matrix (m≤16) is applied as a transformation matrix for an 8×8 region, but the same may be applied to a case where input vector is 48×1 and the m×48 transform kernel matrix is (m≤16). That is, 16×64 (or m×64) may be replaced with 16×48 (or m×48).

1) In a case of a block (e.g., a transform unit) having a width of W and a height of H where W≥8 and H≥8, a transform kernel matrix applicable to an 8×8 region is applied to a top-left 8×8 region of the block. In a case where W=8 and H=8, only an 8×64 portion of a 16×64 matrix may be applied. That is, eight transform coefficients may be generated. Alternatively, only 8×48 parts of the 16×48 matrix can be applied. That is, 8 transform coefficients can be generated.

2) In a case of a block (e.g., a transform unit) having a width of W and a height of H where one of W and H is less than 8, that is, one of W and H is 4, a transform kernel matrix applicable to a 4×4 region is applied to a top-left region of the block. In a case where W=4 and H=4, only an 8×16 portion of a 16×16 matrix may be applied, in which case eight transform coefficients are generated.

If (W, H)=(4, 8) or (8, 4), a secondary transform is applied only to the top-left 4×4 region. If W or H is greater than 8, that is, if one of W and H is equal to or greater than 16 and the other is 4, the secondary transform is applied only to two top-left 4×4 blocks. That is, only atop-left 4×8 or 8×4 region may be divided into two 4×4 blocks, and a designated transform kernel matrix may be applied thereto.

3) In a case of a block (e.g., a transform unit) having a width of W and a height of H where both W and H are 4, a secondary transform may not be applied.

4) In a case of a block (e.g., a transform unit) having a width of W and a height of H, the number of coefficients generated by applying a secondary transform may be maintained to be ¼ or less of the area of the transform unit (i. E., the total number of pixels included in the transform unit=W×H). For example, when both W and H are 4, atop 4×16 matrix of a 16×16 matrix may be applied so that four transform coefficients are generated.

Assuming that a secondary transform is applied only to a top-left 8×8 region of the entire transform unit (TU), eight or less coefficients need to be generated for a 4×8 transform unit or a 8×4 transform unit, and thus a top 8×16 matrix of a 16×16 matrix may be applied to a top left 4×4 region. Up to a 16×64 matrix (or 16×48 matrix) may be applied to an 8×8 transform unit (up to 16 coefficients can be generated). In a 4×N or N×4 (N≥16) transform unit, a 16×16 matrix may be applied to a top-left 4×4 block, or a top 8×16 matrix of the 16×16 matrix may be applied to two top-left 4×4 blocks.

Similarly, in a 4×8 transform unit or 8×4 transform unit, eight transform coefficients may be generated by applying a top 4×16 matrix of the 16×16 matrix to two top-left 4×4 blocks.

5) The maximum size of a secondary transform applied to a 4×4 region may be limited to 8×16. In this case, the amount of a memory required to store transform kernel matrices applied to the 4×4 region can be reduced by half compared to that in a 16×16 matrix.

For example, in all transform kernel matrices shown in Table 9 or Table 18, the maximum size may be limited to 8×16 by extracting only a top 8×16 matrix of each 16×16 matrix, and an actual image coding system may be implemented to store only 8×16 matrices of the transform kernel matrices.

If the maximum applicable transform size is 8×16 and the maximum number of multiplications required to generate one coefficient is limited to 8, an up to 8×16 matrix may be applied to a 4×4 block, and an up to 8×16 matrix may be applied to each of up to two top-left two 4×4 blocks included in a 4×N block or an N×4 block (N≥8, N=2n, n≥3). For example, an 8×16 matrix may be applied to one top-left 4×4 block in a 4×N block or an N×4 block (N≥8, N=2n, n≥3).

According to an embodiment, when coding an index specifying a secondary transform to be applied to a luma component, specifically, when one transform set includes two transform kernel matrices, it is necessary to specify whether to apply the secondary transform and which transform kernel matrix to apply in the secondary transform. For example, when no secondary transform is applied, a transform index may be coded as 0, and when the secondary transform is applied, transform indexes for two transform sets may be coded as 1 and 2, respectively.

In this case, when coding the transform index, truncated unary coding may be used. For example, binary codes of 0, 10, and 11 may be respectively allocated to transform indexes 0, 1, and 2, thereby coding the transform indexes.

In addition, when coding the transform index by truncated unary coding, different CABAC context may be assigned to each bin. When coding the transform indexes 0, 10, and 11 in the above example, two CABAC contexts may be used.

When coding a transform index specifying a secondary transform to be applied to a chroma component, specifically, when one transform set includes two transform kernel matrices, it is necessary to specify whether to apply the secondary transform and which transform kernel matrix to apply in the secondary transform similarly to when coding the transform index of the secondary transform for the luma component. For example, when no secondary transform is applied, a transform index may be coded as 0, and when the secondary transform is applied, transform indexes for two transform sets may be coded as 1 and 2, respectively.

In this case, when coding the transform index, truncated unary coding may be used. For example, binary codes of 0, 10, and 11 may be respectively allocated to transform indexes 0, 1, and 2, thereby coding the transform indexes.

In addition, when coding the transform index by truncated unary coding, different CABAC context may be assigned to each bin. When coding the transform indexes 0, 10, and 11 in the above example, two CABAC contexts may be used.

According to an embodiment, a different CABAC context set may be allocated according to a chroma intra prediction mode. For example, when chroma intra prediction modes are divided into non-directional modes, such as a planar mode or a DC mode, and other directional modes (i. E., divided into two groups), a corresponding CABAC context set (including two contexts) may be allocated for each group when coding 0, 10, and 11 in the above example.

When the chroma intra prediction modes are divided into a plurality of groups and a corresponding CABAC context set is allocated, it is necessary to find out a chroma intra prediction mode value before coding the transform index of a secondary transform. However, in a chroma direct mode (DM), since a luma intra prediction mode value is used as it is, it is also necessary to find out an intra prediction mode value for a luma component. Therefore, when coding information on a chroma component, data dependency on luma component information may occur. Thus, in the chroma DM, when coding the transform index of the secondary transform without having information on the intra prediction mode, the data dependency can be removed by mapping to a specific group. For example, if the chroma intra prediction mode is the chroma DM, the transform index may be coded using a corresponding CABAC context set assuming the planner mode or the DC mode, or a corresponding CABAC context set may be applied assuming that other directional modes.

Hereinafter, a secondary transform set mapping suitable for a wide angle intra prediction (WAIP) and a secondary transformation using the same will be described.

As described above, the prediction modes used for the intra prediction are composed of a planar mode, a DC mode, and prediction modes having various prediction directions. As known in the HEVC standard, 35 intra prediction modes are used, among them 33 intra prediction modes re directional modes. In the current VVC (Versatile Video Coding) standard, 67 intra prediction modes are considered, and 67 intra prediction modes are composed of the planar mode, the DC mode, and 65 directional modes. The configuration for the 67 modes is shown in FIG. 9.

Figure 9:
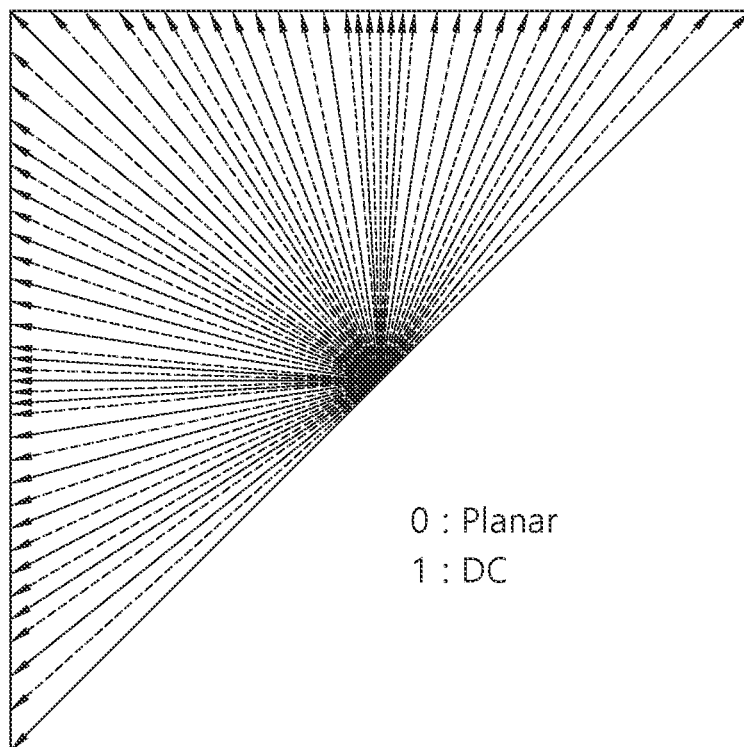
FIG. 9 is a diagram illustrating an intra directional mode of 65 prediction directions according to an embodiment of the present disclosure.

In FIG. 9, a solid line indicates the existing 33 directional modes, and a portion indicated by a dotted line indicates the added directional mode. The existing 35 intra prediction modes are included in the 67 intra prediction modes, and the relationship in which the existing 35 modes are mapped to 67 modes is shown in Table 19.

TABLE 19

| 35 mode index | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| 67 mode index | 0 | 1 | 2 | 4 | 6 | 8 | 10 | 12 | 14 | 16 | 18 | 20 | 22 | 24 | 26 | 27 | 30 | 32 |
| 35 mode index | 18 | 19 | 20 | 21 | 22 | 23 | 24 | 25 | 26 | 27 | 28 | 29 | 30 | 31 | 32 | 33 | 34 | |
| 67 mode index | 34 | 36 | 38 | 40 | 42 | 44 | 46 | 48 | 50 | 52 | 54 | 56 | 58 | 60 | 62 | 64 | 66 | |

As shown in FIG. 9, even in a configuration of 67 modes, index 0 and index 1 correspond to the planar mode and the DC mode, respectively. In addition, in this disclosure, a case of the 35 prediction modes may be referred to as "35 modes" or "35 modes configuration", and a case of the 67 prediction modes may be referred to as "67 modes" or "67 modes configuration".

Figure 10:
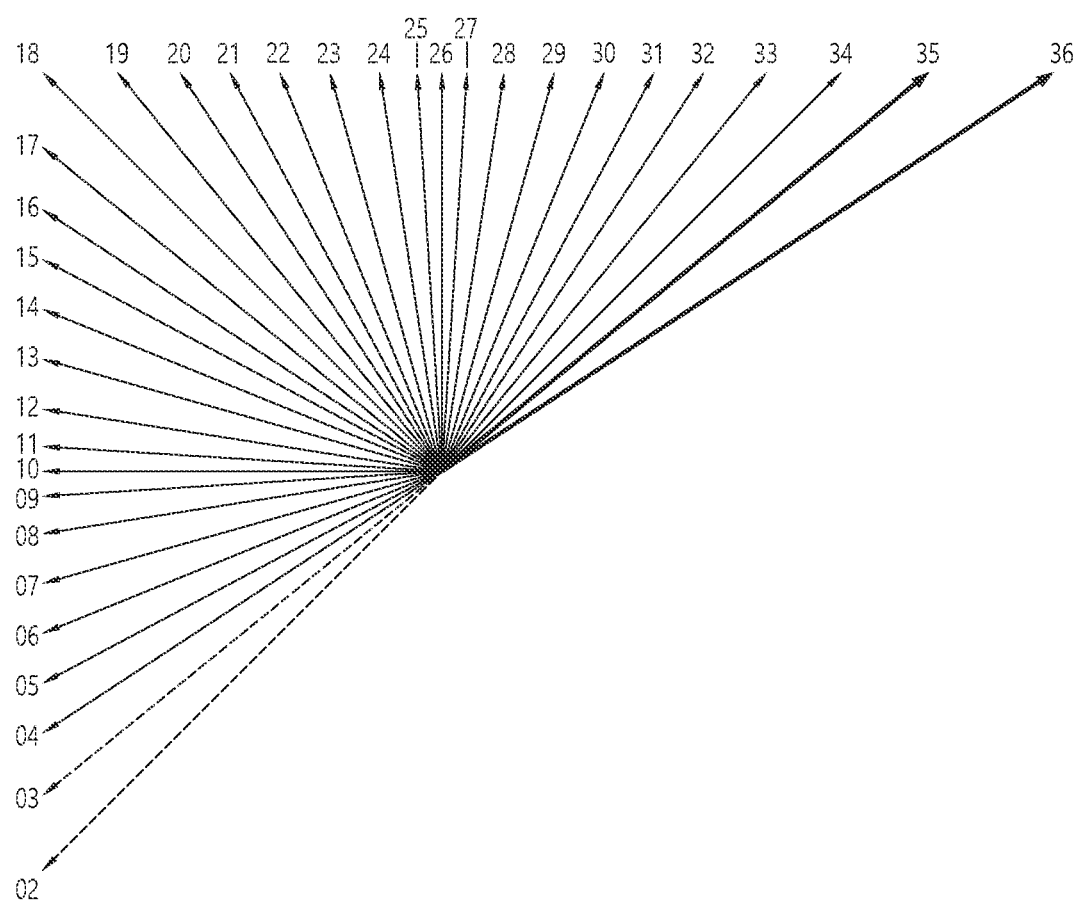
FIG. 10 is a diagram illustrating a wide-angle mode according to an embodiment of the present disclosure.

FIG. 10 is a diagram illustrating a wide-angle mode according to an embodiment of the present disclosure.

As shown in FIG. 10, in the 35 modes configuration, two wide-angle modes may be added to the right of the mode 34. The added mode becomes the mode 35 and mode 36.

Figure 11:
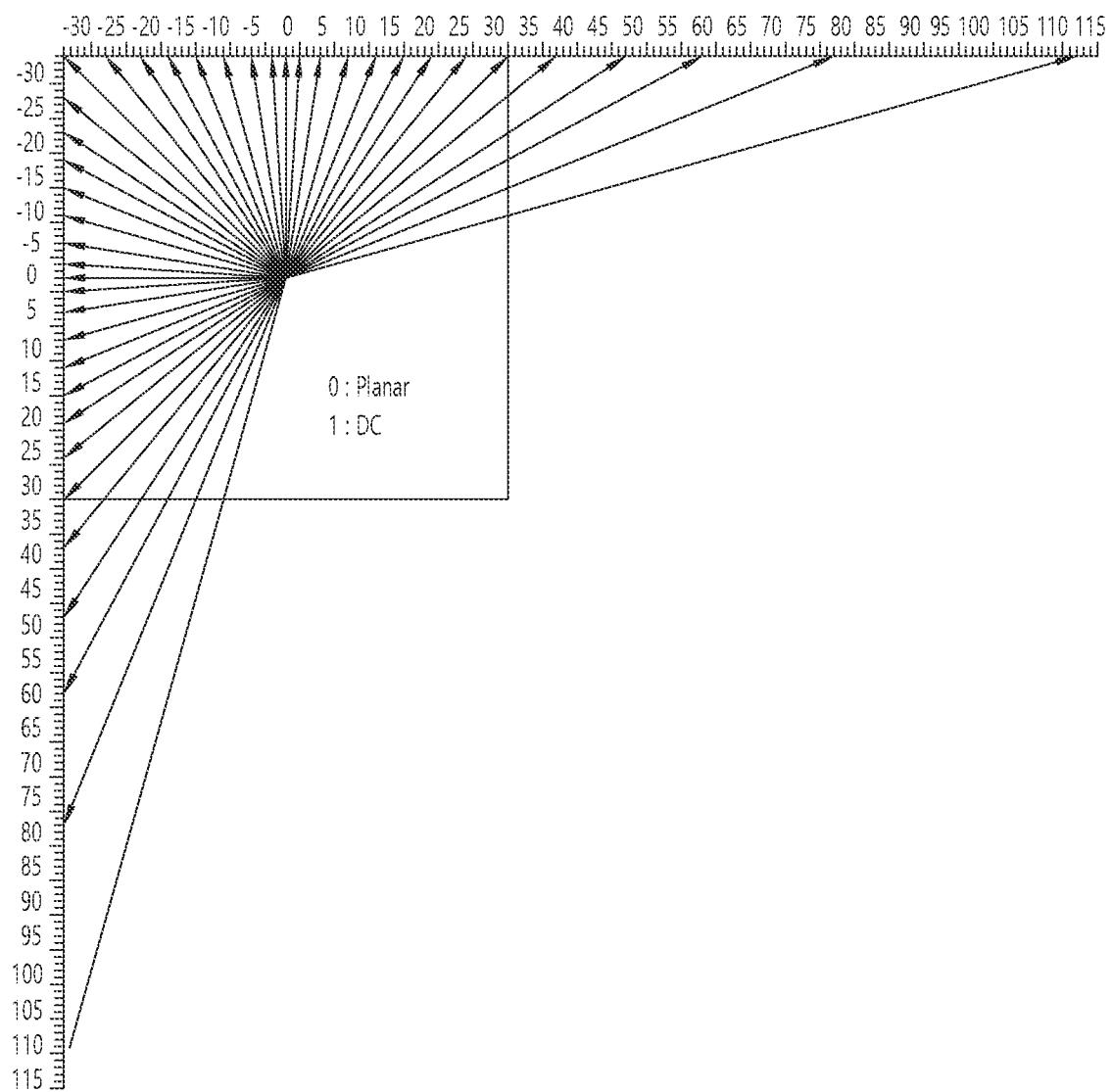
FIG. 11 is a diagram illustrating a wide-angle mode according to another embodiment of the present disclosure.

FIG. 11 shows that in the 35 modes configuration, 5 modes are added in the downward direction and 5 modes are added in the upward direction. Modes added in the downward direction are indexed as −1, −2, −3, −4, −5 from the top, and modes added in the upward direction are indexed as 35, 36, 37, 38, 39 from the left.

For the 67 modes configuration, there are modes added between the 35 modes configuration and modes which are added in the upward directions and in the downward directions in the 35 modes configuration as shown in FIG. 11, one mode can be added between each of the modes added in the upward directions and in the downward directions. That is, 10 modes may be added in the downward direction and in the upward direction, respectively. The modes added in the downward direction are indexed −1, −2, . . . , −10, from the top and the mode added in the upward direction are indexed 67, 68, . . . 76 from the left. Table 20 shows the index mapping between 35 modes and 67 modes for the added modes.

TABLE 20

| 35 mode index | −5 | −4 | −3 | −2 | −1 | 35 | 36 | 37 | 38 | 39 |
|---|---|---|---|---|---|---|---|---|---|---|
| 67 mode index | −10 | −8 | −6 | −4 | −2 | 68 | 70 | 72 | 74 | 76 |

The mode index for the wide-angle direction mode in the 67 modes not shown in Table 20 are −1, −3, −5, −7, −9, 67, 69, 71, 73, 75 and they may be based on the 67 modes between 2 and −2, −2 and −4, −4 and −6, −6 and −8, −8 and −10 between 66 and 68, between 68 and 70, between 70 and 72, between 72 and 74 and between 74 and 76, respectively.

Based on the 35 modes configuration, in the wide-angle intra prediction, when a specific condition is satisfied, prediction for mode 35 instead of mode 2 may be performed. When a width length of the target block to be predicted is expressed as nWidth and a height length is expressed as nHeight, the prediction mode index predModeIntra may be changed according to Table 21 below.

TABLE 21

When nWidth is not equal to nHeight, predModeIntra is mapped as follows:
- (a) if nWidth/nHeight <= 2 and 2 <= predModeIntra <= 4, predModeIntra = predModeIntra + 33
- (b) if nWidth/nHeight > 2 and 2 <= predModeIntra <= 6, predModeIntra = predModeIntra + 33
- (c) if nHeight/nWidth <= 2 and 32 <= predModeIntra <= 34, predModeIntra = predModeIntra − 35
- (d) if nHeight/nWidth > 2 and 30 <= predModeIntra <= 34, predModeIntra = predModeIntra − 35

In Table 21, a negative value may be derived as the predModeIntra values of (c) and (d). Based on FIG. 11, the direction immediately below the mode 2 becomes −1, and the index value decreases one by one as the direction goes down one by one. Based on 67 modes, the above conditional expression can be changed as shown in Table 22.

TABLE 22

When nWidth is not equal to nHeight, predModeIntra is mapped as follows:
- (a) if nWidth/nHeight <= 2 and 2 <= predModeIntra <= 7, predModeIntra = predModeIntra + 65
- (b) if nWidth/nHeight > 2 and 2 <= predModeIntra <= 11, predModeIntra = predModeIntra + 65
- (c) if nHeight/nWidth <= 2 and 61 <= predModeIntra <= 66, predModeIntra = predModeIntra − 67
- (d) if nHeight/nWidth > 2 and 57 <= predModeIntra <= 66, predModeIntra = predModeIntra − 67

The reason why the above-described the wide-angle intra prediction method increases the coding efficiency of an image in a specific case will be described with reference to FIG. 12 as follows. FIG. 12 is a diagram for explaining an intra prediction for a non-square block according to an embodiment of the present disclosure.

As shown in (a) of FIG. 12, when a width of a prediction target block is greater than a height, top reference pixels are generally closer to the positions inside the target block to be predicted. Therefore, it may be more accurate to predict in the bottom-left direction than in the top-right direction. On the contrary, when the height of the target block is greater than the width as shown in (b) of FIG. 12, the left reference pixels are substantially close to the positions inside the target block to be predicted. Therefore, it may be more accurate to predict in the top-right direction than in the bottom-left direction. Therefore, it may be advantageous to apply the mode index modification as shown in Tables 21 and Tables 22. The modes subject to mode index modification are summarized in Table 23 and Table 24, respectively, for 35 modes and 67 modes.

TABLE 23

| Condition | Replaced intra prediction modes |
| --- | --- |
| W/H == 2 | Modes 2, 3, 4 |
| W/H > 2 | Modes 2, 3, 4, 5, 6 |
| W/H == 1 | None |
| H/W == 1/2 | Modes 32, 33, 34 |
| H/W < 1/2 | Modes 30, 31, 32, 33, 34 |

TABLE 24

| Condition | Replaced intra prediction modes |
| --- | --- |
| W/H == 2 | Modes 2, 3, 4, 5, 6, 7 |
| W/H > 2 | Modes 2, 3, 4, 5, 6, 7, 8, 9, 10, 11 |
| W/H == 1 | None |
| H/W == 1/2 | Modes 61, 62, 63, 64, 65, 66 |
| H/W < 1/2 | Mode 57, 58, 59, 60, 61, 62, 63, 64, 65, 66 |

Meanwhile, the mode index for the wide-angle intra prediction may be coded with the mode index before transformation. For example, even when mode 2 is converted to mode 67 in the 67 modes configuration, the previous mode index value 2 may be coded.

Figure 13:
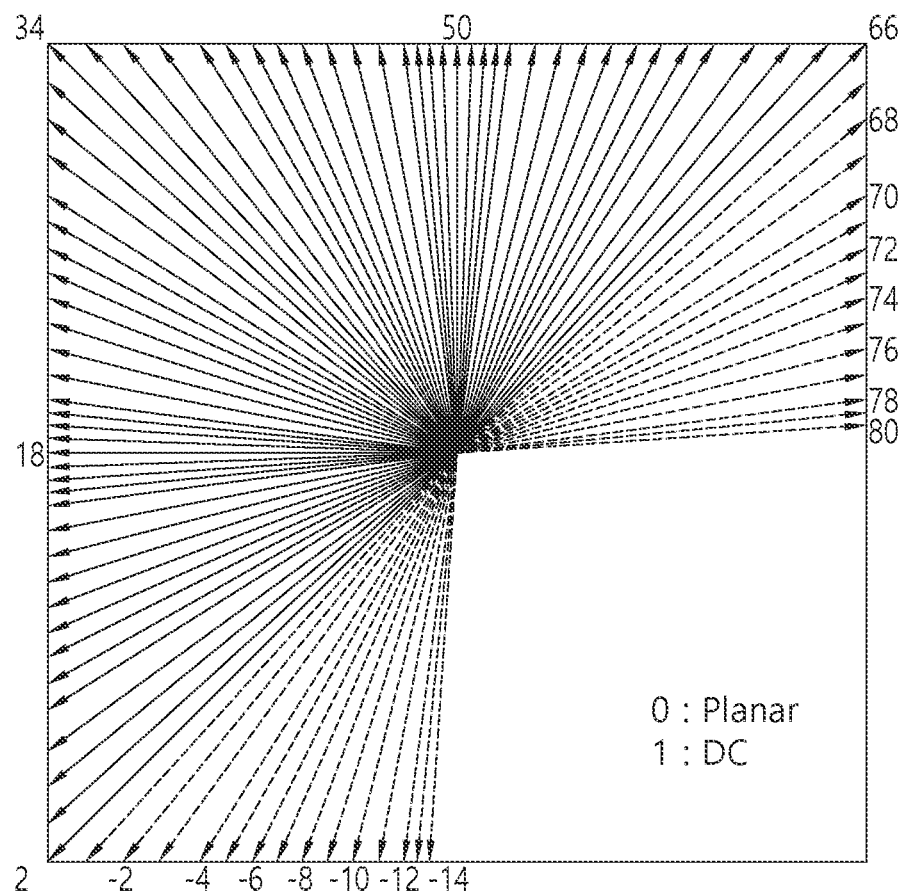
FIG. 13 is a diagram illustrating another wide-angle mode according to another embodiment of the present disclosure.

As described above, in the wide-angle intra prediction, the wide-angle prediction directions are added to the existing intra prediction method as shown in FIG. 11. The prediction modes added at the bottom can be defined as $ML_1 \sim ML_N$, and the prediction modes added at the top can be defined as $MT_1 \sim MT_M$. At this time, the mode closest to the mode 2 is indicated by $ML_1$, and the index is increased in the downward direction, and the lowest mode is indicated by $ML_N$ and the mode adjacent to mode 34 and mode 66 for the 35 modes and the 67 modes are $MT_1$, and the index increases to the right, so that the rightmost mode can be indicated as $MT_M$. In the present embodiment, it is described that the number of added prediction modes is 10 in the downward direction (N=10) and 10 in the upward direction (M=10), but it may be further extended as shown in FIG. 13. FIG. 13 is a diagram illustrating a wide-angle intra prediction mode according to another embodiment of the present disclosure. FIG. 13 shows the wide-angle intra prediction mode in the case of N=M=14.

The method of mapping from the existing intra prediction mode to the wide-angle mode is not limited to the example presented in this disclosure, and a pseudo code for the mapping method according to other embodiments different from the above-described method is shown in Table 25.

TABLE 25 if (Planar mode or DC mode) {
  no Wide angle mode modification
}
else {
  width = prediction unit width
  height = prediction unit height
  modeShift[ ] = { 0, 6, 10, 12, 14, 15 }
  deltaSize = abs(log2(width) − log2(height))
  predMode = current mode value (one of 2 ~ 66 modes)
  if (width > height and predMode < 2 + modeShift[deltaSize])
  {
    predMode = predMode + 65
  }
  else if (height > width and predMode > 66 − modeShift[deltaSize])
  {
    predMode = predMode − 67
  }
}

In the peudo code, modeShift is a C language type array, modeShift[0], modeShift[1], . . . , It is accessed like modeShift[5], log 2 returns the base 2 logarithm (e.g. log 2(4)=2) and abs returns the absolute value of the input argument. M and N values can be greater than 10 from the peudo code.

Meanwhile, the wide-angle intra prediction modes $MT_1 \sim MT_M$ and $MT_1 \sim MT_M$ may also be mapped with a secondary transform set, respectively, as shown in Table 2. In Table 2, the same secondary transform set is applied to the two directional modes that are symmetrical around the diagonal mode (mode 34 in the 67 modes configuration, mode 18 in the 35 modes configuration) e.g., the 32 transform set is applied to 32 intra mode and 36 intra mode, the same method can be applied to the wide-angle prediction modes $MT_1 \sim MT_M$ and $MT_1 \sim MT_M$.

For example, if M=N and $ML_a$ and $MT_a$ (a is 1 to N) are symmetric around the diagonal direction, the same transform set can be applied for $ML_a$ and $MT_a$.

Figure 14:
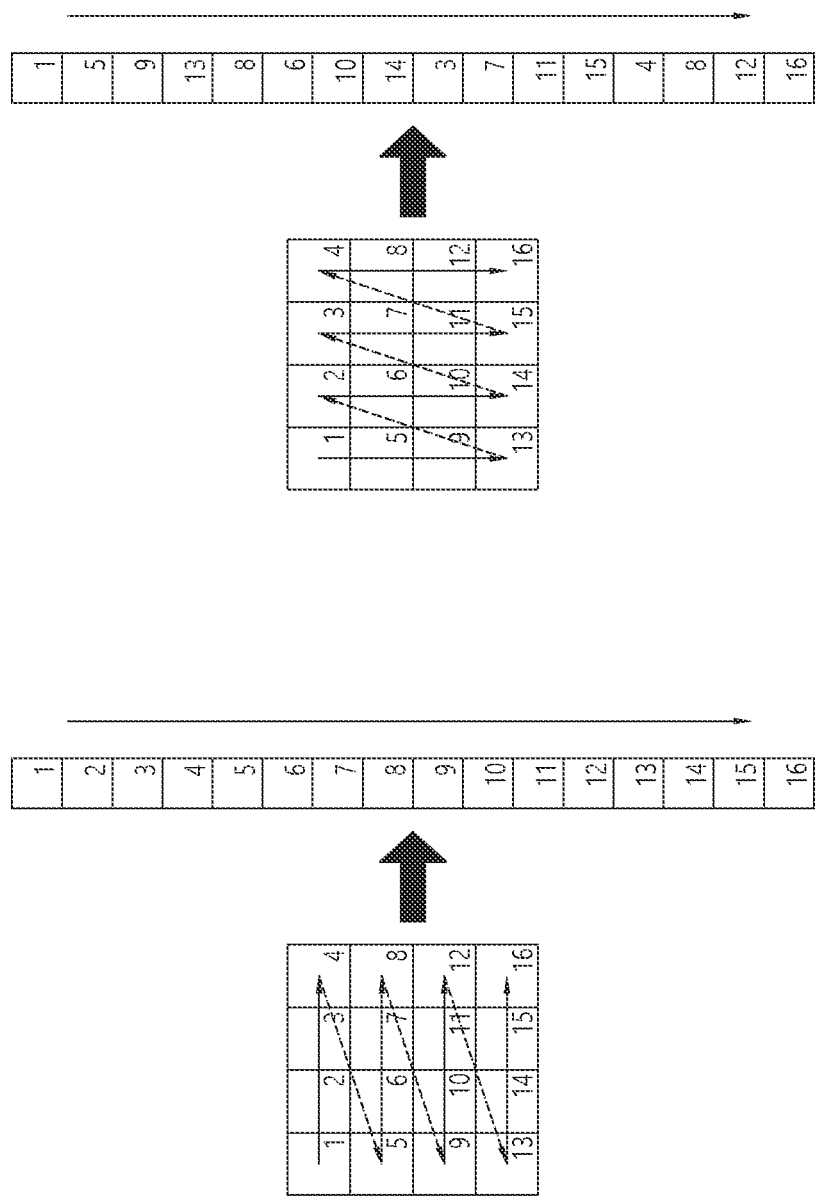
FIG. 14 is a diagram for explaining conversion from a 2D block to a 1D block according to an embodiment of the present disclosure.

However, in the $MT_a$ mode, 2 dimensional input data is transposed first and then the secondary transformation for $ML_a$ must be applied. That is, the two-dimensional input data is read in the row-first direction as in (a) of FIG. 14 or in the column-first direction as in (b) and arranged into 1-dimensional input data, and then when the transformation for $ML_a$ is applied to, the two-dimensional input data for $MT_a$ is read in the opposite direction, the column-first direction or the row-first direction, and arranged into 1-dimensional data, and then the same transformation as for $ML_a$ should be applied to $MT_a$. The number indicated in each pixel in FIG. 14 is an index for indicating the pixel position, and does not mean a value of pixel.

Examples of mapping a transform set to the wide-angle intra prediction mode in multiple transform set mapping are as follows.

1) 35 transform sets

TABLE 26

| Intrra mode | −10 | −9 | −8 | −7 | −6 | −5 | −4 | −3 | −2 | −1 | 0 | 1 | 2 | 3 | 4 | 5 | 6 |
| --- | --- | --- | --- | --- | --- | --- | --- | --- | --- | --- | --- | --- | --- | --- | --- | --- | --- |
| NSST Set | 41 | 43 | 42 | 41 | 40 | 29 | 38 | 37 | 36 | 35 | 0 | 1 | 2 | 3 | 4 | 5 | 6 |

TABLE 26-continued

| Intrra mode | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|
| NSST Set | 7 | 8 | 9 | 10 | 11 | 12 | 13 | 14 | 15 | 16 | 17 | 18 | 19 | 20 | 21 | 22 | 23 |
| Intrra mode | 24 | 25 | 26 | 27 | 28 | 29 | 30 | 31 | 32 | 33 | 34 | 35 | 36 | 37 | 38 | 39 | 40 |
| NSST Set | 24 | 25 | 26 | 27 | 28 | 29 | 30 | 31 | 32 | 33 | 34 | 33 | 32 | 31 | 30 | 29 | 28 |
| Intrra mode | 41 | 42 | 43 | 44 | 45 | 46 | 47 | 48 | 49 | 50 | 51 | 52 | 53 | 54 | 55 | 56 | 57 |
| NSST Set | 27 | 26 | 25 | 24 | 23 | 22 | 21 | 20 | 19 | 18 | 17 | 16 | 15 | 14 | 13 | 12 | 11 |
| Intrra mode | 58 | 59 | 60 | 61 | 62 | 63 | 64 | 65 | 66 | 67 | 68 | 69 | 70 | 71 | 72 | 73 | 74 |
| NSST Set | 10 | 9 | 8 | 7 | 6 | 5 | 4 | 3 | 2 | 35 | 36 | 37 | 38 | 39 | 40 | 41 | 42 |
| Intrra mode | 75 | 76 | | | | | | | | | | | | | | | |
| NSST Set | 43 | 44 | | | | | | | | | | | | | | | |

TABLE 27

| Intrra mode | −10 | −9 | −8 | −7 | −6 | −5 | −4 | −3 | −2 | −1 | 0 | 1 | 2 | 3 | 4 | 5 | 6 |
|---|---|---|---|---|---|---|---|---|---|---|---|---|---|---|---|---|---|
| NSST Set | 2 | 2 | 2 | 2 | 2 | 2 | 2 | 2 | 2 | 2 | 0 | 1 | 2 | 3 | 4 | 5 | 6 |
| Intrra mode | 7 | 8 | 9 | 10 | 11 | 12 | 13 | 14 | 15 | 16 | 17 | 18 | 19 | 20 | 21 | 22 | 23 |
| NSST Set | 7 | 8 | 9 | 10 | 11 | 12 | 13 | 14 | 15 | 16 | 17 | 18 | 19 | 20 | 21 | 22 | 23 |
| Intrra mode | 24 | 25 | 26 | 27 | 28 | 29 | 30 | 31 | 32 | 33 | 34 | 35 | 36 | 37 | 38 | 39 | 40 |
| NSST Set | 24 | 25 | 26 | 27 | 28 | 29 | 30 | 31 | 32 | 33 | 34 | 33 | 32 | 31 | 30 | 29 | 28 |
| Intrra mode | 41 | 42 | 43 | 44 | 45 | 46 | 47 | 48 | 49 | 50 | 51 | 52 | 53 | 54 | 55 | 56 | 57 |
| NSST Set | 27 | 26 | 25 | 24 | 23 | 22 | 21 | 20 | 19 | 18 | 17 | 16 | 15 | 14 | 13 | 12 | 11 |
| Intrra mode | 58 | 59 | 60 | 61 | 62 | 63 | 64 | 65 | 66 | 67 | 68 | 69 | 70 | 71 | 72 | 73 | 74 |
| NSST Set | 10 | 9 | 8 | 7 | 6 | 5 | 4 | 3 | 2 | 2 | 2 | 2 | 2 | 2 | 2 | 2 | 2 |
| Intrra mode | 75 | 76 | | | | | | | | | | | | | | | |
| NSST Set | 2 | 2 | | | | | | | | | | | | | | | |

TABLE 28

| Intrra mode | −10 | −9 | −8 | −7 | −6 | −5 | −4 | −3 | −2 | −1 | 0 | 1 | 2 | 3 | 4 | 5 | 6 |
|---|---|---|---|---|---|---|---|---|---|---|---|---|---|---|---|---|---|
| NSST Set | 35 | 35 | 35 | 35 | 35 | 35 | 35 | 35 | 35 | 35 | 0 | 1 | 2 | 3 | 4 | 5 | 6 |
| Intrra mode | 7 | 8 | 9 | 10 | 11 | 12 | 13 | 14 | 15 | 16 | 17 | 18 | 19 | 20 | 21 | 22 | 23 |
| NSST Set | 7 | 8 | 9 | 10 | 11 | 12 | 13 | 14 | 15 | 16 | 17 | 18 | 19 | 20 | 21 | 22 | 23 |
| Intrra mode | 24 | 25 | 26 | 27 | 28 | 29 | 30 | 31 | 32 | 33 | 34 | 35 | 36 | 37 | 38 | 39 | 40 |
| NSST Set | 24 | 25 | 26 | 27 | 28 | 29 | 30 | 31 | 32 | 33 | 34 | 33 | 32 | 31 | 30 | 29 | 28 |
| Intrra mode | 41 | 42 | 43 | 44 | 45 | 46 | 47 | 48 | 49 | 50 | 51 | 52 | 53 | 54 | 55 | 56 | 57 |
| NSST Set | 27 | 26 | 25 | 24 | 23 | 22 | 21 | 20 | 19 | 18 | 17 | 16 | 15 | 14 | 13 | 12 | 11 |
| Intrra mode | 58 | 59 | 60 | 61 | 62 | 63 | 64 | 65 | 66 | 67 | 68 | 69 | 70 | 71 | 72 | 73 | 74 |

TABLE 28-continued

| | | | | | | | | | | | | | | | | |
|---|---|---|---|---|---|---|---|---|---|---|---|---|---|---|---|---|
| NSST Set | 10 | 9 | 8 | 7 | 6 | 5 | 4 | 3 | 2 | 35 | 35 | 35 | 35 | 35 | 35 | 35 | 35 |
| Intrra mode | 75 | 76 | | | | | | | | | | | | | | | |
| NSST Set | 35 | 35 | | | | | | | | | | | | | | | |

Table 26 is the same as Table 2 for modes 0 to 66, and each mode pair (here, the mode pair means ($ML_a$, $MT_a$), a=1, 2, . . . , 10) for the wide-angle mode is applied an additional transformation set.

Alternatively, according to another example, as shown in Table 27, the second transform set may be reused for the additional wide-angle mode, or as shown in Table 28, the 35 transform set may be separately allocated.

When the number of the wide-angle modes is greater than 10 for the upward direction or the downward direction (that is, if N>10 or M>10 for modes $ML_1$~$ML_N$ and $MT_1$~$MT_M$), the mappings proposed in Table 26 to Table 28 can be extended. For example, in Table 26, when the intra prediction mode value is (76+n), transform set (44+n) is mapped (n≥1), and when the intra prediction mode value is (−10−m), transform set (44+m) can be mapped (m≥1). In addition, if the intra prediction mode value in Table 27 is (76+n) or (−10−m) (m, n≥1), transform set 2 can be mapped, and in Table 28, the intra prediction mode value is (76+n) or (−10−m) (m, n≥1), transform set 35 can be mapped.

2) 10 transform sets

TABLE 29

| Intrra mode | −10 | −9 | −8 | −7 | −6 | −5 | −4 | −3 | −2 | −1 | 0 | 1 | 2 | 3 | 4 | 5 | 6 |
|---|---|---|---|---|---|---|---|---|---|---|---|---|---|---|---|---|---|
| NSST Set | 2 | 2 | 2 | 2 | 2 | 2 | 2 | 2 | 2 | 2 | 0 | 0 | 2 | 2 | 2 | 6 | 6 |
| Intrra mode | 7 | 8 | 9 | 10 | 11 | 12 | 13 | 14 | 15 | 16 | 17 | 18 | 19 | 20 | 21 | 22 | 23 |
| NSST Set | 6 | 10 | 10 | 10 | 10 | 10 | 14 | 14 | 14 | 18 | 18 | 18 | 18 | 18 | 22 | 22 | 22 |
| Intrra mode | 24 | 25 | 26 | 27 | 28 | 29 | 30 | 31 | 32 | 33 | 34 | 35 | 36 | 37 | 38 | 39 | 40 |
| NSST Set | 26 | 26 | 26 | 26 | 26 | 26 | 30 | 30 | 34 | 34 | 34 | 34 | 34 | 30 | 30 | 30 | 26 |
| Intrra mode | 41 | 42 | 43 | 44 | 45 | 46 | 47 | 48 | 49 | 50 | 51 | 52 | 53 | 54 | 55 | 56 | 57 |
| NSST Set | 26 | 26 | 26 | 26 | 22 | 22 | 22 | 18 | 18 | 18 | 18 | 18 | 14 | 14 | 14 | 10 | 10 |
| Intrra mode | 58 | 59 | 60 | 61 | 62 | 63 | 64 | 65 | 66 | 67 | 68 | 69 | 70 | 71 | 72 | 73 | 74 |
| NSST Set | 10 | 10 | 10 | 6 | 6 | 6 | 2 | 2 | 2 | 2 | 2 | 2 | 2 | 2 | 2 | 2 | 2 |
| Intrra mode | 75 | 76 | | | | | | | | | | | | | | | |
| NSST Set | 2 | 2 | | | | | | | | | | | | | | | |

TABLE 30

| Intrra mode | −10 | −9 | −8 | −7 | −6 | −5 | −4 | −3 | −2 | −1 | 0 | 1 | 2 | 3 | 4 | 5 | 6 |
|---|---|---|---|---|---|---|---|---|---|---|---|---|---|---|---|---|---|
| NSST Set | 35 | 35 | 35 | 35 | 35 | 35 | 35 | 35 | 35 | 35 | 0 | 0 | 2 | 2 | 2 | 6 | 6 |
| Intrra mode | 7 | 8 | 9 | 10 | 11 | 12 | 13 | 14 | 15 | 16 | 17 | 18 | 19 | 20 | 21 | 22 | 23 |
| NSST Set | 6 | 10 | 10 | 10 | 10 | 10 | 14 | 14 | 14 | 18 | 18 | 18 | 18 | 18 | 22 | 22 | 22 |
| Intrra mode | 24 | 25 | 26 | 27 | 28 | 29 | 30 | 31 | 32 | 33 | 34 | 35 | 36 | 37 | 38 | 39 | 40 |
| NSST Set | 26 | 26 | 26 | 26 | 26 | 30 | 30 | 30 | 34 | 34 | 34 | 34 | 34 | 30 | 30 | 30 | 26 |
| Intrra mode | 41 | 42 | 43 | 44 | 45 | 46 | 47 | 48 | 49 | 50 | 51 | 52 | 53 | 54 | 55 | 56 | 57 |
| NSST Set | 26 | 26 | 26 | 26 | 22 | 22 | 22 | 18 | 18 | 18 | 18 | 18 | 14 | 14 | 14 | 10 | 10 |
| Intrra mode | 58 | 59 | 60 | 61 | 62 | 63 | 64 | 65 | 66 | 67 | 68 | 69 | 70 | 71 | 72 | 73 | 74 |

TABLE 30-continued

| NSST Set | 10 | 10 | 10 | 6 | 6 | 6 | 2 | 2 | 2 | 35 | 35 | 35 | 35 | 35 | 35 | 35 | 35 |
|---|---|---|---|---|---|---|---|---|---|---|---|---|---|---|---|---|---|
| Intrra mode | 75 | 76 | | | | | | | | | | | | | | | |
| NSST Set | 35 | 35 | | | | | | | | | | | | | | | |

For 0 to 66 modes, 10 transform sets can be mapped as shown in Table 29 and Table 30. The indexes shown in Table 29 and Table 30 are for distinguishing the transform set, and may be the same as or different from the transform set having the same index as the index shown in Table 26. Alternatively, as shown in Table 29, for the additional wide-angle mode, transform set 2 may be reused, or transform set 35 as shown in Table 30 may be separately allocated.

When the number of the wide-angle modes is greater than 10 for the upward direction or the downward direction (that is, if N>10 or M>10 for modes $ML_1$~$ML_N$ and $MT_1$~$MT_M$), the mappings proposed in Table 29 to Table 30 can be extended. For example, if the intra prediction mode value in Table 29 is (76+n) or (−10−m) (m, n≥1), transform set 2 can be mapped, and in Table 30, the intra prediction mode value is (76+n) or (−10−m) (m, n≥1), transform set 35 can be mapped.

3) 6 transform sets

TABLE 31

| Intrra mode | −10 | −9 | −8 | −7 | −6 | −5 | −4 | −3 | −2 | −1 | 0 | 1 | 2 | 3 | 4 | 5 | 6 |
|---|---|---|---|---|---|---|---|---|---|---|---|---|---|---|---|---|---|
| NSST Set | 2 | 2 | 2 | 2 | 2 | 2 | 2 | 2 | 2 | 2 | 0 | 0 | 2 | 2 | 2 | 2 | 2 |
| Intrra mode | 7 | 8 | 9 | 10 | 11 | 12 | 13 | 14 | 15 | 16 | 17 | 18 | 19 | 20 | 21 | 22 | 23 |
| NSST Set | 10 | 10 | 10 | 10 | 10 | 10 | 10 | 18 | 18 | 18 | 18 | 18 | 18 | 18 | 18 | 18 | 26 |
| Intrra mode | 24 | 25 | 26 | 27 | 28 | 29 | 30 | 31 | 32 | 33 | 34 | 35 | 36 | 37 | 38 | 39 | 40 |
| NSST Set | 26 | 26 | 26 | 26 | 26 | 26 | 34 | 34 | 34 | 34 | 34 | 34 | 34 | 34 | 34 | 26 | 26 |
| Intrra mode | 41 | 42 | 43 | 44 | 45 | 46 | 47 | 48 | 49 | 50 | 51 | 52 | 53 | 54 | 55 | 56 | 57 |
| NSST Set | 26 | 26 | 26 | 26 | 26 | 18 | 18 | 18 | 18 | 18 | 18 | 18 | 18 | 18 | 10 | 10 | 10 |
| Intrra mode | 58 | 59 | 60 | 61 | 62 | 63 | 64 | 65 | 66 | 67 | 68 | 69 | 70 | 71 | 72 | 73 | 74 |
| NSST Set | 10 | 10 | 10 | 10 | 2 | 2 | 2 | 2 | 2 | 2 | 2 | 2 | 2 | 2 | 2 | 2 | 2 |
| Intrra mode | 75 | 76 | | | | | | | | | | | | | | | |
| NSST Set | 2 | 2 | | | | | | | | | | | | | | | |

TABLE 32

| Intrra mode | −10 | −9 | −8 | −7 | −6 | −5 | −4 | −3 | −2 | −1 | 0 | 1 | 2 | 3 | 4 | 5 | 6 |
|---|---|---|---|---|---|---|---|---|---|---|---|---|---|---|---|---|---|
| NSST Set | 35 | 35 | 35 | 35 | 35 | 35 | 35 | 35 | 35 | 35 | 0 | 0 | 2 | 2 | 2 | 2 | 2 |
| Intrra mode | 7 | 8 | 9 | 10 | 11 | 12 | 13 | 14 | 15 | 16 | 17 | 18 | 19 | 20 | 21 | 22 | 23 |
| NSST Set | 10 | 10 | 10 | 10 | 10 | 10 | 10 | 18 | 18 | 18 | 18 | 18 | 18 | 18 | 18 | 18 | 26 |
| Intrra mode | 24 | 25 | 26 | 27 | 28 | 29 | 30 | 31 | 32 | 33 | 34 | 35 | 36 | 37 | 38 | 39 | 40 |
| NSST Set | 26 | 26 | 26 | 26 | 26 | 26 | 34 | 34 | 34 | 34 | 34 | 34 | 34 | 34 | 34 | 26 | 26 |
| Intrra mode | 41 | 42 | 43 | 44 | 45 | 46 | 47 | 48 | 49 | 50 | 51 | 52 | 53 | 54 | 55 | 56 | 57 |
| NSST Set | 26 | 26 | 26 | 26 | 26 | 18 | 18 | 18 | 18 | 18 | 18 | 18 | 18 | 18 | 10 | 10 | 10 |
| Intrra mode | 58 | 59 | 60 | 61 | 62 | 63 | 64 | 65 | 66 | 67 | 68 | 69 | 70 | 71 | 72 | 73 | 74 |

TABLE 32-continued

| NSST Set | 10 | 10 | 10 | 10 | 2 | 2 | 2 | 2 | 2 | 35 | 35 | 35 | 35 | 35 | 35 | 35 | 35 |
| --- | --- | --- | --- | --- | --- | --- | --- | --- | --- | --- | --- | --- | --- | --- | --- | --- | --- |
| Intrra mode | 75 | 76 | | | | | | | | | | | | | | | |
| NSST Set | 35 | 35 | | | | | | | | | | | | | | | |

For 0 to 66 modes, 6 transform sets can be mapped as shown in Table 31 and Table 32. The indexes shown in Table 31 and Table 32 are for distinguishing the transform set, and may be the same as or different from the transform set having the same index as the index shown in Table 26. Alternatively, as shown in Table 31, for the additional wide-angle mode, transform set 2 may be reused, or transform set 35 as shown in Table 32 may be separately allocated.

When the number of the wide-angle modes is greater than 10 for the upward direction or the downward direction (that is, if N>10 or M>10 for modes $ML_1 \sim ML_N$ and $MT_1 \sim MT_M$), the mappings proposed in Table 31 and Table 32 can be extended. For example, if the intra prediction mode value in Table 31 is (76+n) or (−10−m) (m, n≥1), transform set 2 can be mapped, and in Table 32, the intra prediction mode value is (76+n) or (−10−m) (m, n≥1), transform set 35 can be mapped.

4) 4 transform sets

TABLE 33

| Intrra mode | −10 | −9 | −8 | −7 | −6 | −5 | −4 | −3 | −2 | −1 | 0 | 1 | 2 | 3 | 4 | 5 | 6 |
| --- | --- | --- | --- | --- | --- | --- | --- | --- | --- | --- | --- | --- | --- | --- | --- | --- | --- |
| NSST Set | 44 | 43 | 42 | 41 | 40 | 39 | 38 | 37 | 36 | 35 | 0 | 1 | 2 | 3 | 4 | 5 | 6 |
| Intrra mode | 7 | 8 | 9 | 10 | 11 | 12 | 13 | 14 | 15 | 16 | 17 | 18 | 19 | 20 | 21 | 22 | 23 |
| NSST Set | 7 | 8 | 9 | 10 | 11 | 12 | 13 | 14 | 15 | 16 | 17 | 18 | 19 | 20 | 21 | 22 | 23 |
| Intrra mode | 24 | 25 | 26 | 27 | 28 | 29 | 30 | 31 | 32 | 33 | 34 | 35 | 36 | 37 | 38 | 39 | 40 |
| NSST Set | 24 | 25 | 26 | 27 | 28 | 29 | 30 | 31 | 32 | 33 | 34 | 33 | 32 | 31 | 30 | 29 | 28 |
| Intrra mode | 41 | 42 | 43 | 44 | 45 | 46 | 47 | 48 | 49 | 50 | 51 | 52 | 53 | 54 | 55 | 56 | 57 |
| NSST Set | 27 | 26 | 25 | 24 | 23 | 22 | 21 | 20 | 19 | 18 | 17 | 16 | 15 | 14 | 13 | 12 | 11 |
| Intrra mode | 58 | 59 | 60 | 61 | 62 | 63 | 64 | 65 | 66 | 67 | 68 | 69 | 70 | 71 | 72 | 73 | 74 |
| NSST Set | 10 | 9 | 8 | 7 | 6 | 5 | 4 | 3 | 2 | 35 | 36 | 37 | 38 | 39 | 40 | 41 | 42 |
| Intrra mode | 75 | 76 | | | | | | | | | | | | | | | |
| NSST Set | 43 | 44 | | | | | | | | | | | | | | | |

TABLE 34

| Intrra mode | −10 | −9 | −8 | −7 | −6 | −5 | −4 | −3 | −2 | −1 | 0 | 1 | 2 | 3 | 4 | 5 | 6 |
| --- | --- | --- | --- | --- | --- | --- | --- | --- | --- | --- | --- | --- | --- | --- | --- | --- | --- |
| NSST Set | 35 | 35 | 35 | 35 | 35 | 35 | 35 | 35 | 35 | 35 | 0 | 0 | 2 | 2 | 2 | 2 | 2 |
| Intrra mode | 7 | 8 | 9 | 10 | 11 | 12 | 13 | 14 | 15 | 16 | 17 | 18 | 19 | 20 | 21 | 22 | 23 |
| NSST Set | 10 | 10 | 10 | 10 | 10 | 10 | 18 | 18 | 18 | 18 | 18 | 18 | 18 | 18 | 18 | 18 | 18 |
| Intrra mode | 24 | 25 | 26 | 27 | 28 | 29 | 30 | 31 | 32 | 33 | 34 | 35 | 36 | 37 | 38 | 39 | 40 |
| NSST Set | 34 | 34 | 34 | 34 | 34 | 34 | 34 | 34 | 34 | 34 | 34 | 34 | 34 | 34 | 34 | 34 | 34 |
| Intrra mode | 41 | 42 | 43 | 44 | 45 | 46 | 47 | 48 | 49 | 50 | 51 | 52 | 53 | 54 | 55 | 56 | 57 |
| NSST Set | 26 | 26 | 26 | 26 | 18 | 18 | 18 | 18 | 18 | 8 | 18 | 18 | 18 | 18 | 18 | 2 | 2 |
| Intrra mode | 58 | 59 | 60 | 61 | 62 | 63 | 64 | 65 | 66 | 67 | 68 | 69 | 70 | 71 | 72 | 73 | 74 |

TABLE 34-continued

| | | | | | | | | | | | | | | | | | |
|---|---|---|---|---|---|---|---|---|---|---|---|---|---|---|---|---|---|
| NSST Set | 2 | 2 | 2 | 2 | 2 | 2 | 2 | 2 | 2 | 35 | 35 | 35 | 35 | 35 | 35 | 35 | 35 |
| Intrra mode | 75 | 76 | | | | | | | | | | | | | | | |
| NSST Set | 35 | 35 | | | | | | | | | | | | | | | |

For 0 to 66 modes, 4 transform sets can be mapped as shown in Table 33 and Table 34. The indexes shown in Table 33 and Table 34 are for distinguishing the transform set, and may be the same as or different from the transform set having the same index as the index shown in Table 26. Alternatively, as shown in Table 33, for the additional wide-angle mode, transform set 2 may be reused, or transform set 34 as shown in Table 32 may be separately allocated.

When the number of the wide-angle modes is greater than 10 for the upward direction or the downward direction (that is, if N>10 or M>10 for modes $ML_1$~$ML_N$ and $MT_1$~$MT_M$), the mappings proposed in Table 33 and Table 34 can be extended. For example, if the intra prediction mode value in Table 33 is (76+n) or (-10-m) (m, n≥1), transform set 2 can be mapped, and in Table 34, the intra prediction mode value is (76+n) or (-10-m) (m, n≥1), transform set 35 can be mapped.

The secondary transformation described in this disclosure can be applied to any secondary transformation such as RST, NSST, LFNST, etc. That is, the above embodiment is not limited to a specific type of transformation because it relates to a method for mapping the secondary transform set to the wide-angle mode.

In addition, the transform set indexes shown in Tables 26 to 34 are for classifying the transform sets, and the index value itself does not have any meaning. In other words, the same index value for the intra prediction mode values means that the same transform set is used, different index values indicate that different transform sets are used. For example, 0, 2, 18, and 34 transform sets in Table 33 may be represented as 0, 1, 2, and 3 transform sets.

Figure 15:
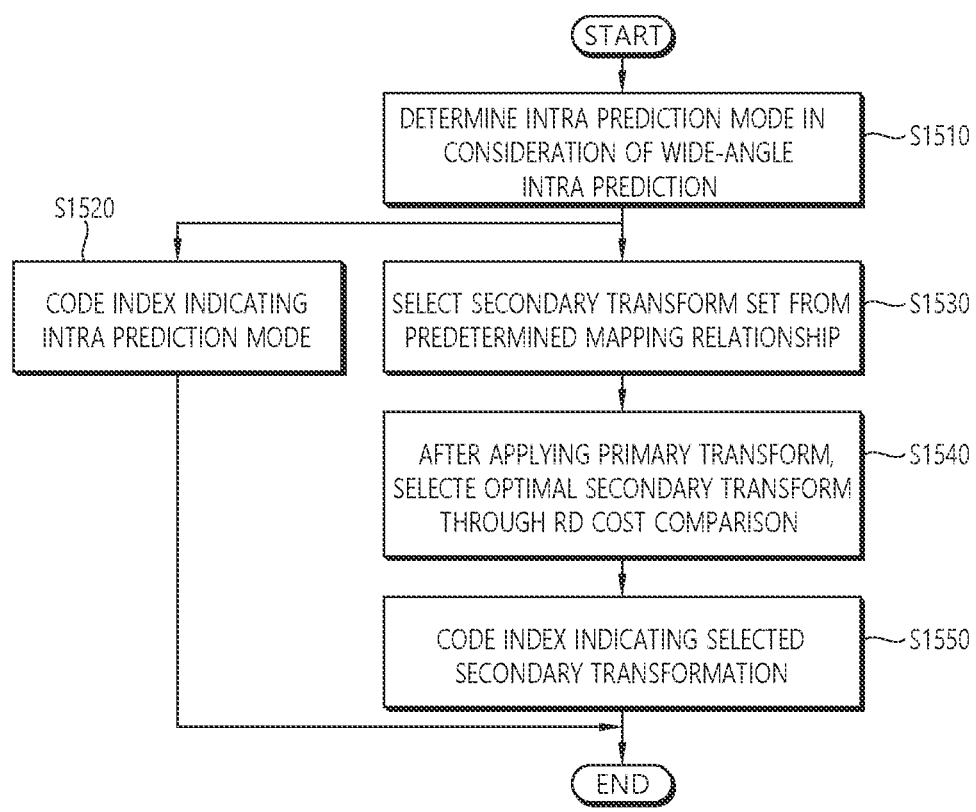
FIG. 15 is a diagram illustrating an encoding method for describing transform set mapping according to a wide-angle prediction mode according to an embodiment of the present disclosure.

FIG. 15 is a diagram illustrating an encoding method for describing transform set mapping according to a wide-angle prediction mode according to an embodiment of the present disclosure.

As illustrated, first, an intra prediction mode may be determined in consideration of a wide-angle intra prediction (S1510).

The encoding apparatus may code an index indicating the determined intra prediction mode (S1520).

Thereafter, the secondary transform set may be selected from a predetermined mapping relationship, that is, a mapping table (S1530).

After applying the primary transform, an optimal secondary transform may be selected through RD cost comparison (S1540). The optimal secondary transform refers to deriving secondary transform coefficients by applying an optimal transform kernel among transform kernels constituting the transform set.

When all the transform are performed in this way, the selected secondary transformation, that is, the index indicating whether to perform the secondary transformation and the secondary transformation kernel matrix is coded (S1550).

Figure 16:
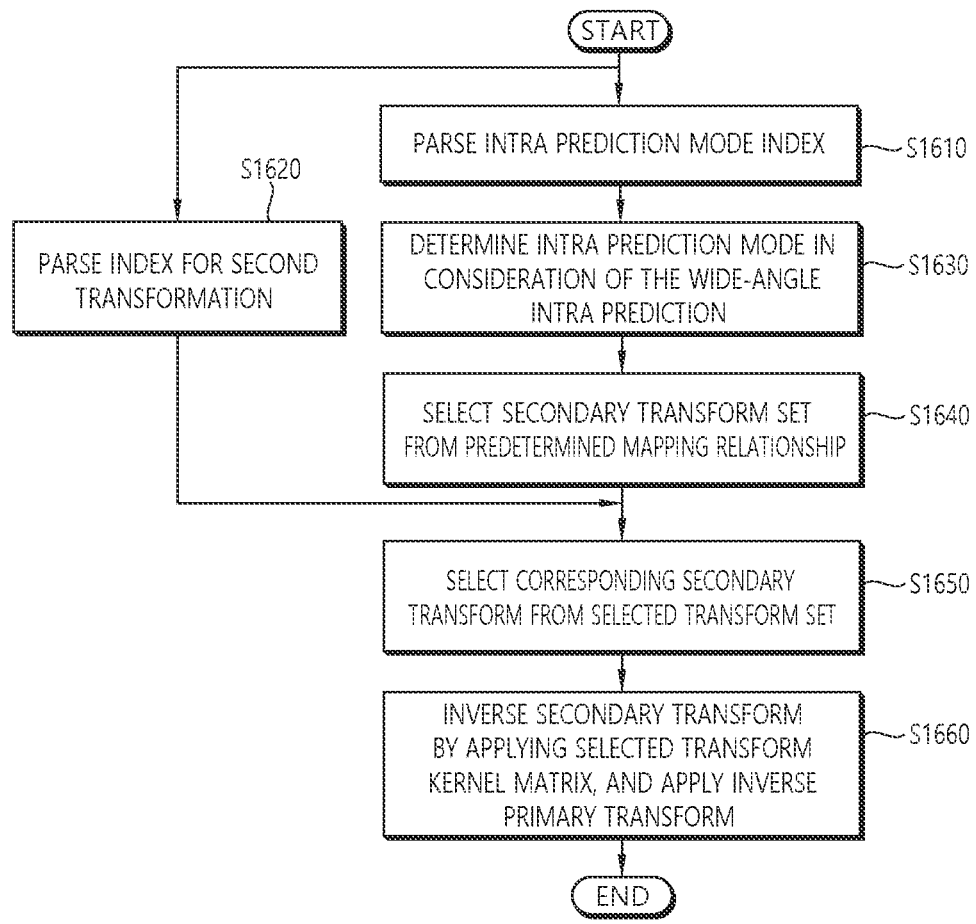
FIG. 16 is a diagram illustrating a decoding method for describing transform set mapping according to a wide-angle prediction mode according to an embodiment of the present disclosure.

FIG. 16 is a diagram illustrating a decoding method for describing transform set mapping according to a wide-angle prediction mode according to an embodiment of the present disclosure.

The decoding apparatus receives and parses the intra prediction mode index (S1610).

Of course, the index for the second transformation is also parsed through receiving of the bitstream (S1620).

The decoding apparatus determines the intra prediction mode in consideration of the wide-angle intra prediction (S1630), the secondary transform set may be selected based on a predetermined map, that is, a mapping table (S1640).

The decoding apparatus may select a corresponding secondary transform, that is, a transform kernel matrix for the secondary transform, from the selected transform set (S1650).

The transformer performs an inverse secondary transform by applying the selected transform kernel matrix, and then applies an inverse primary transform to the modified transform coefficients (S1660).

The maps predetermined in FIGS. 15 and 16 may include Tables 26 to 34. The intra prediction mode index and the secondary transform index of FIG. 15 may be interpreted as being encoded at the same time, or if there is a precedence relationship between the two syntaxes in the index syntax structure, they may be coded according to the corresponding precedence relationship. This is also applied to FIG. 16, and it may be interpreted that the intra prediction mode index and the secondary transform index can be parsed at the same time or if there is a precedence relationship between the two syntaxes in the index syntax structure, they may be coded according to the corresponding precedence relationship.

In addition, although it is described in FIG. 15 that the application of the primary transform is performed immediately after the secondary transform, if a condition to which the primary transform can be applied is satisfied, it may be applied at any time after the second transform is applied. This is also applied to FIG. 16, and it is described that the inverse primary transform is performed immediately after the inverse secondary transform. However, if a condition to which the inverse primary transform can be applied is satisfied, any time after the inverse secondary transform may be applied.

In FIGS. 15 and 16, the intra prediction mode index and actual prediction modes considering the wide-angle intra prediction may be different, and the modification or the mapping relationship between the two has been described with reference to Tables 20 to 25 above.

Hereinafter, various test results to which RST is applied will be described.

According to one embodiment, compared with 4×4 NSST, the following conditions were added to design the RST.

A) Reduce the number of transform kernels from 103 to 4 or 8 (4 transform sets and 1 or 2 transform kernels applied for each transform set)

B) By adjusting RST according to the block size, the number of multiplication operations for the existing worst case is reduced from 16 to 8

The RST according to this embodiment was tested based on the MTS candidate selection simplification method (below, Simplification 1 and Simplification 2), and the test was performed as follows.

1) test 1: (A)+(B)+(C)+(D)+Simplification 1
2) test 2: (A)+(B)+(C)+Simplification 2
3) test 3: (A)+(D)+Simplification 1
4) test 4: (A)+Simplification 2

In the above, (A), (B), (C), (D) are shown in the table below.

TABLE 35

| Feature | Description |
|---|---|
| (A) | The number of RST candidates to be tried is reduced from 3 to 1. |
| (B) | The number of transform sets is reduced from 35 to 4. |
| (C) | Worst case computational complexity is halved. |
| (D) | Each own transform in a transform set is applied for both cases with MTS flag on and off. |

The results of the above tests are summarized as follows.

As a result of test 1, when compared with the conventional case (e.g., VTM anchor) to which the above conditions were not applied, the encoding time was 94% (AI), 101% (RA), and 100% (LD), and BD rate reduction was −1.02% (AI), −0.58% (RA), and −0.28% (LD).

In addition, as a result of test 2, when compared to VTM anchor, the encoding time was 124% (AI), 109% (RA), and 105% (LD), and the BD rate reduction was −1.16% (AI), −0.61%. (RA), and −0.30% (LD).

In addition, as a result of test 3, when compared to VTM anchor, the encoding time was 92% (AI), 101% (RA), and 101% (LD), and the BD rate reduction was −1.60% (AI), −0.91%. (RA), and −0.40% (LD).

In addition, as a result of test 4, when compared to VTM anchor, the encoding time was 121% (AI), 109% (RA), and 104% (LD), and the BD rate reduction was −1.75% (AI), −0.93%. (RA), and −0.43% (LD).

For Test 1 and Test 3, two transforms per transform set were applied, and for Test 2 and Test 4, one transform per transform set was applied. The memory usage of test 1 was measured to be 10 KB, and the memory usage of test 2 was measured to be 5 KB.

In this experiment, four features were proposed for the secondary transformation.

First, to Apply RST

For the secondary transformation, 16×64 and 16×16 transform matrices are applied to 8×8 and 4×4 blocks respectively, for convenience, a 16×64 transform matrix may be specified as RST 8×8, and a 16×16 transform matrix may be specified as RST 4×4.

Second, Simplifying the Selection of MTS Candidates

Simplification 1 is to use one MTS candidate (i. E., flag for whether to apply MTS) for all modes, that is, to use DST7 for a vertical transform and a horizontal transform, and simplification 2 is to use two MTS candidates (2 MTS indexes) for the directional mode and three MTS candidates (three MTS indexes) for the non-directional mode.

Various embodiments of the above-described MTS candidate are as follows.

According to an example, when two MTS candidates are used for the directional mode and four MTS candidates are used for a non-directional mode, the MTS index is as follows.

(A) Non-directional mode (DC mode or planner mode)
If the MTS index is 0, DST7 is applied to the vertical transform and the horizontal transform.
If the MTS index is 1, DST7 is applied to the vertical transform and DST8 is applied to the horizontal transform.
If the MTS index is 2, DST8 is applied to the vertical transform and DST7 is applied to the horizontal transform.
If the MTS index is 3, DST8 is applied to the vertical transform and the horizontal transform.

(B) Mode belonging to the horizontal direction group mode (modes 2 to 34 in 67 intra prediction modes)
If the MTS index is 0, DST7 is applied to the vertical transform and the horizontal transform.
If the MTS index is 1, DST8 is applied to the vertical transform and DST7 is applied to the horizontal transform.

(C) Mode belonging to the vertical direction group mode (modes 35 to 66 in 67 intra prediction modes)
If the MTS index is 0, DST7 is applied to the vertical transform and the horizontal transform.
If the MTS index is 1, DST7 is applied to the vertical transform and DST8 is applied to the horizontal transform.

According to an example, when three MTS candidates are used for all intra prediction modes, the MTS index is as follows.

If the MTS index is 0, DST7 is applied to the vertical transform and the horizontal transform
If the MTS index is 1, DST7 is applied to the vertical transform and DST8 is applied to the horizontal transform.
If the MTS index is 2, DST8 is applied to the vertical transform and DST7 is applied to the horizontal transform.

According to an example, when two MTS candidates are used for the directional mode and three MTS candidates are used for the non-directional mode, the MTS index is as follows.

(A) Non-directional mode (DC mode or planner mode)
If the MTS index is 0, DST7 is applied to the vertical transform and the horizontal transform.
If the MTS index is 1, DST7 is applied to the vertical transform and DST8 is applied to the horizontal transform.
If the MTS index is 2, DST8 is applied to the vertical transform and DST7 is applied to the horizontal transform.

(B) Modes belonging to the horizontal direction group mode (modes 2 to 34 in 67 intra prediction modes)
If the MTS index is 0, DST7 is applied to the vertical transform and the horizontal transform.
If the MTS index is 1, DST8 is applied to the vertical transform and DST7 is applied to the horizontal transform.

(C) Modes belonging to the vertical direction group mode (modes 35 to 66 in 67 intra prediction modes)
If the MTS index is 0, DST7 is applied to the vertical transform and the horizontal transform.
If the MTS index is 1, DST7 is applied to the vertical transform and DST8 is applied to the horizontal transform.

According to an example, various combinations of the primary transform and the secondary transform are possible, and these are shown in Tables 36 to 40.

TABLE 36

| | Primary transform | Secondary Transform |
|---|---|---|
| Case 1 | 2 MTS candidates for angular mode | 2 transform kernels for angular mode |
| | 4 MTS candidates for non-angular | 2 transform kernels for non-angular mode |
| Case 2 | 2 MTS candidates for angular mode | 1 transform kernels for angular mode |
| | 4 MTS candidates for non-angular | 2 transform kernels for non-angular mode |
| Case 3 | 2 MTS candidates for angular mode | 1 transform kernels for angular mode |
| | 4 MTS candidates for non-angular | 1 transform kernels for non-angular mode |

TABLE 37

| | Primary transform | Secondary Transform |
|---|---|---|
| Case 1 | 3 MTS candidates for angular mode | 2 transform kernels for angular mode |
| | 3 MTS candidates for non-angular | 2 transform kernels for non-angular mode |
| Case 2 | 3 MTS candidates for angular mode | 1 transform kernels for angular mode |
| | 3 MTS candidates for non-angular | 2 transform kernels for non-angular mode |
| Case 3 | 3 MTS candidates for angular mode | 1 transform kernels for angular mode |
| | 3 MTS candidates for non-angular | 1 transform kernels for non-angular mode |

TABLE 38

| | Primary transform | Secondary Transform |
|---|---|---|
| Case 1 | 2 MTS candidates for angular mode | 2 transform kernels for angular mode |
| | 3 MTS candidates for non-angular | 2 transform kernels for non-angular mode |
| Case 2 | 2 MTS candidates for angular mode | 1 transform kernels for angular mode |
| | 3 MTS candidates for non-angular | 2 transform kernels for non-angular mode |
| Case 3 | 2 MTS candidates for angular mode | 1 transform kernels for angular mode |
| | 3 MTS candidates for non-angular | 1 transform kernels for non-angular mode |

Unlike the transform kernel combinations of Tables 36 to 38, only a fixed MTS candidate (eg, DST7) can be used in the combination of Table 39 below. That is, DST7 may be applied to the horizontal direction transform and the vertical direction transform mode. At this time, the MTS flag cu_mts_flag may indicate whether DCT2 is applied, and if cu_mts_flag is 1, the fixed MTS candidate may be considered.

TABLE 39

| | Primary transform | Secondary Transform |
|---|---|---|
| Case 1 | 1 fixed MTS candidate | 2 transform kernels for angular mode |
| | (i.E., DST7) for all modes | 2 transform kernels for non-angular mode |
| Case 2 | 1 fixed MTS candidate | 1 transform kernels for angular mode |
| | (i.E., DST7) for all modes | 2 transform kernels for non-angular mode |
| Case 3 | 1 fixed MTS candidate | 1 transform kernels for angular mode |
| | (i.E., DST7) for all modes | 1 transform kernels for non-angular mode |

In Table 39, when MTS is not applied, the secondary transform may be applied. In other words, when cu_mts_flag is 0, the secondary transform as shown in Table 40 can be applied.

TABLE 40

|  | Primary transform (DCT 2 applied) | Secondary Transform |
|---|---|---|
| Case 1 | DCT2 is applied | 2 transform kernels for angular mode |
|  |  | 2 transform kernels for non-angular mode |
| Case 2 | DCT2 is applied | 1 transform kernels for angular mode |
|  |  | 2 transform kernels for non-angular mode |
| Case 3 | DCT2 is applied | 1 transform kernels for angular mode |
|  |  | 1 transform kernels for non-angular mode |

Third, Reduce Complexity for the Worst Case

If RST 8×8 and RST 4×4 are used, the worst case for multiplication operation occurs when all transform units are composed of 4×4 transform unit or 8×8 transform unit. Thus, the upper 8×64 and 8×16 parts of the matrix, i. E., from the top of each transform matrix, 8 transform basic vectors are applied to the 4×4 transform unit or the 8×8 transform unit, respectively.

Fourth, Memory Usage Reduction

The number of transform sets is reduced from 35 to 4, and the memory mapping for 4 transform sets is shown in the following table.

TABLE 41

| Intra mode | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| NSST Set | 0 | 0 | 1 | 1 | 1 | 1 | 1 | 1 | 1 | 1 | 1 | 1 | 2 | 2 | 2 | 2 | 2 |
| Intra mode | 34 | 35 | 36 | 37 | 38 | 39 | 40 | 41 | 42 | 43 | 44 | 45 | 46 | 47 | 48 | 49 | 50 |
| NSST Set | 3 | 3 | 3 | 3 | 3 | 3 | 3 | 3 | 3 | 3 | 3 | 2 | 2 | 2 | 2 | 2 | 2 |

| Intra mode | 17 | 18 | 19 | 20 | 21 | 22 | 23 | 24 | 25 | 26 | 27 | 28 | 29 | 30 | 31 | 32 | 33 |
|---|---|---|---|---|---|---|---|---|---|---|---|---|---|---|---|---|---|
| NSST Set | 2 | 2 | 2 | 2 | 2 | 2 | 2 | 3 | 3 | 3 | 3 | 3 | 3 | 3 | 3 | 3 | 3 |
| Intra mode | 51 | 52 | 53 | 54 | 55 | 56 | 57 | 58 | 59 | 60 | 61 | 62 | 63 | 64 | 65 | 66 |  |
| NSST Set | 2 | 2 | 2 | 2 | 2 | 1 | 1 | 1 | 1 | 1 | 1 | 1 | 1 | 1 | 1 | 1 |  |

Each of the transforms set consists of one or two transforms, and for Test 1 and Test 3, two transforms are required because different transforms are applied when the MTS flag value is 0 or 1, for test 2 and test 4, 1 transform is applied for each of the transforms set. The reduction in encoding time was more evident when one transform was applied.

The following table summarizes the memory usage requirements for the number of times the transform is applied.

TABLE 42

| Config. | RST4 × 4 | RST8 × 8 | Total memory usage |
|---|---|---|---|
| Test 1 | 2 KB (8 × 16 × 16) | 8 KB (8 × 16 × 64) | 10 KB |
| Test 2 | 1 KB (4 × 16 × 16) | 4 KB (4 × 16 × 64) | 5 KB |

Each test result is shown in the table below.

Results for Test 1 are Tables 43 to 45, results for Test 2 are Tables 46 to 48, results for Test 3 are Tables 49 to 51, and results for Test 4 are Tables 52 to 54, respectively. The test was performed under the conditions of All Intra, Random Access, and Low delay B.

TABLE 43

| | All Intra Main 10 Over VTM-2.0.1 | | | | |
|---|---|---|---|---|---|
| | Y | U | V | EncT | DecT |
| Class A1 | −1.46% | −2.15% | −2.09% | 94% | 92% |
| Class A2 | −0.62% | −1.88% | −1.24% | 98% | 96% |
| Class B | −0.77% | −1.87% | −2.62% | 94% | 95% |
| Class C | −1.08% | −1.98% | −2.38% | 91% | 99% |
| Class E | −1.33% | −2.08% | −3.17% | 95% | 96% |
| Overall | −1.02% | −1.98% | −2.34% | 94% | 96% |
| Class D | −0.79% | −1.58% | −2.16% | 92% | 126% |
| Class F (optional) | −1.04% | −1.61% | −1.88% | 94% | 95% |

TABLE 44

| | Random Access Main 10 Over VTM-2.0.1 | | | | |
|---|---|---|---|---|---|
| | Y | U | V | EncT | DecT |
| Class A1 | −0.97% | −1.43% | −1.83% | 103% | 100% |
| Class A2 | −0.50% | −1.30% | −1.12% | 100% | 99% |
| Class B | −0.48% | −1.50% | −2.34% | 100% | 100% |
| Class C | −0.46% | −1.19% | −1.38% | 100% | 99% |
| Class E | | | | | |
| Overall | −0.58% | −1.37% | −1.73% | 101% | 99% |

TABLE 44-continued

| | Random Access Main 10 Over VTM-2.0.1 | | | | |
|---|---|---|---|---|---|
| | Y | U | V | EncT | DecT |
| Class D | −0.32% | −1.10% | −1.47% | 99% | 92% |
| Class F (optional) | −0.39% | −0.95% | −1.35% | 98% | 98% |

TABLE 45

| | Low delay B Main10 Over VTM-2.0.1 | | | | |
|---|---|---|---|---|---|
| | Y | U | V | EncT | DecT |
| Class A1 | | | | | |
| Class A2 | | | | | |
| Class B | −0.21% | −0.72% | −1.04% | 101% | 99% |
| Class C | −0.19% | −0.87% | −0.99% | 100% | 98% |
| Class E | −0.53% | −0.99% | −1.47% | 100% | 100% |
| Overall | −0.28% | −0.84% | −1.13% | 100% | 99% |
| Class D | −0.12% | 0.10% | −0.10% | 100% | 96% |
| Class F (optional) | −0.32% | −0.29% | −1.08% | 99% | 98% |

TABLE 46

All Intra Main10
Over VTM-2.0.1

| | Y | U | V | EncT | DecT |
|---|---|---|---|---|---|
| Class A1 | −1.67% | −2.22% | −2.04% | 125% | 95% |
| Class A2 | −0.86% | −1.76% | −1.15% | 127% | 98% |
| Class B | −0.90% | −1.68% | −2.41% | 125% | 98% |
| Class C | −1.10% | −1.67% | −2.20% | 122% | 100% |
| Class E | −1.49% | −2.10% | −3.11% | 123% | 98% |
| Overall | −1.15% | −1.86% | −2.21% | 124% | 98% |
| Class D | −0.87% | −1.41% | −1.88% | 129% | 96% |
| Class F (optional) | #VALUE! | #VALUE! | #VALUE! | #DIV/0! | #DIV/0! |

TABLE 47

Random Access Main 10
Over VTM-2.0.1

| | Y | U | V | EncT | DecT |
|---|---|---|---|---|---|
| Class A1 | −1.04% | −1.48% | −1.95% | 112% | 100% |
| Class A2 | −0.54% | −1.38% | −1.08% | 107% | 99% |
| Class B | −0.50% | −1.68% | −2.33% | 109% | 100% |
| Class C | −0.47% | −0.93% | −1.24% | 110% | 100% |
| Class E | | | | | |
| Overall | −0.61% | −1.38% | −1.71% | 109% | 100% |
| Class D | −0.36 | −1.24% | −1.23% | 106% | 93% |
| Class F (optional) | #VALUE! | #VALUE! | #VALUE! | #DIV/0! | #DIV/0! |

TABLE 48

Low delay B Main10
Over VTM-2.0.1

| | Y | U | V | EncT | DecT |
|---|---|---|---|---|---|
| Class A1 | | | | | |
| Class A2 | | | | | |
| Class B | −0.22% | −0.68% | −1.26% | 106% | 100% |
| Class C | −0.19% | −0.63% | −0.82% | 105% | 100% |
| Class E | −0.55% | −0.78% | −1.81% | 102% | 101% |
| Overall | −0.30% | −0.69% | −1.25% | 105% | 100% |
| Class D | −0.06% | −0.25% | −0.71% | 104% | 98% |
| Class F (optional) | #VALUE! | #VALUE! | #VALUE! | #DIV/0! | #DIV/0! |

TABLE 49

All Intra Main10
Over VTM-2.0.1

| | Y | U | V | EncT | DecT |
|---|---|---|---|---|---|
| Class A1 | −1.69% | −2.35% | −2.20% | 93% | 92% |
| Class A2 | −0.96% | −2.25% | −1.66% | 97% | 96% |
| Class B | −1.19% | −2.34% | −3.10% | 93% | 94% |
| Class C | −2.24% | −2.69% | −3.17% | 89% | 96% |
| Class E | −1.97% | −2.59% | −3.51% | 92% | 94% |
| Overall | −1.60% | −2.44% | −2.79% | 92% | 95% |
| Class D | −1.76% | −2.17% | −2.97% | 90% | 93% |
| Class F (optional) | −1.98% | −2.06% | −2.30% | 91% | 96% |

TABLE 50

Random Access Main 10
Over VTM-2.0.1

| | Y | U | V | EncT | DecT |
|---|---|---|---|---|---|
| Class A1 | −1.15% | −1.50% | −1.88% | 104% | 100% |
| Class A2 | −0.72% | −1.60% | −1.45% | 101% | 99% |
| Class B | −0.74% | −1.87% | −2.88% | 101% | 101% |
| Class C | −1.09% | −1.32% | −1.75% | 101% | 101% |
| Class E | | | | | |
| Overall | −0.91% | −1.60% | −2.09% | 101% | 100% |
| Class D | −0.78% | −1.42% | −1.60% | 100% | 94% |
| Class F (optional) | −1.02% | −1.22% | −1.48% | 98% | 100% |

TABLE 51

Low delay B Main10
Over VTM-2.0.1

| | Y | U | V | EncT | DecT |
|---|---|---|---|---|---|
| Class A1 | | | | | |
| Class A2 | | | | | |
| Class B | −0.30% | −0.84% | −0.69% | 101% | 99% |
| Class C | −0.46% | −0.68% | −0.98% | 100% | 99% |
| Class E | −0.49% | −0.87% | −2.10% | 100% | 100% |
| Overall | −0.40% | −0.79% | −1.22% | 101% | 99% |
| Class D | −0.21% | −0.47% | −0.77% | 100% | 96% |
| Class F (optional) | −0.35% | −0.44% | −0.53% | 100% | 98% |

TABLE 52

All Intra Main 10
Over VTM-2.0.1

| | Y | U | V | EncT | DecT |
|---|---|---|---|---|---|
| Class A1 | −1.94% | −2.46% | −2.33% | 123% | 94% |
| Class A2 | −1.25% | −2.24% | −1.67% | 125% | 98% |
| Class B | −1.37% | −2.30% | −3.05% | 123% | 96% |
| Class C | −2.15% | −2.33% | −2.95% | 117% | 97% |
| Class E | −2.15% | −2.77% | −3.60% | 119% | 95% |
| Overall | −1.75% | −2.40% | −2.77% | 121% | 96% |
| Class D | −1.80% | −2.03% | −2.82% | 119% | 93% |
| Class F (optional) | #VALUE! | #VALUE! | #VALUE! | #DIV/0! | #DIV/0! |

TABLE 53

Random Access Main 10
Over VTM-2.0.1

| | Y | U | V | EncT | DecT |
|---|---|---|---|---|---|
| Class A1 | −1.21% | −1.67% | −2.07% | 113% | 102% |
| Class A2 | −0.76% | −1.49% | −1.40% | 108% | 100% |
| Class B | −0.79% | −1.99% | −2.85% | 109% | 100% |
| Class C | −1.04% | −1.31% | −1.76% | 108% | 97% |
| Class E | | | | | |
| Overall | −0.93% | −1.65% | −2.11% | 109% | 99% |
| Class D | −0.76% | −1.22% | −1.53% | 107% | 91% |
| Class F (optional) | #VALUE! | #VALUE! | #VALUE! | #DIV/0! | #DIV/0! |

TABLE 54

Low delay B Main 10
Over VTM-2.0.1

|  | Y | U | V | EncT | DecT |
|---|---|---|---|---|---|
| Class A1 |  |  |  |  |  |
| Class A2 |  |  |  |  |  |
| Class B | −0.31% | −0.80% | −1.13% | 105% | 100% |
| Class C | −0.38% | −0.58% | −1.03% | 105% | 99% |
| Class E | −0.70% | −1.44% | −1.83% | 102% | 103% |
| Overall | −0.43% | −0.89% | −1.28% | 104% | 100% |
| Class D | −0.28% | −0.34% | −1.02% | 104% | 97% |
| Class F (optional) | #VALUE! | #VALUE! | #VALUE! | #DIV/0! | #DIV/0! |

Meanwhile, tests other than Tests 1 to 4 were additionally performed, and MTS signaling was not considered in the additional tests. In other words, the MTS signaling part was excluded from the conditions applied to Test 1 to Test 4. In the following tests, (1) one transform kernel is used for each transform set, (2) only four transform sets are applied, and (3) complexity of the worst case is reduced by half in order to reduce the number of multiplication operations. The experimental results for this are shown in Tables 55 to 58 below. Tables 55 and 56 are experimental results according to the conditions (1) to (3) above, and Tables 57 and 58 show experimental results when the MTS signaling part is not considered in Test 1, but two transform kernels are applied per the transform set.

TABLE 55

All Intra Main10
Over VTM-2.0.1

|  | Y | U | V | EncT | DecT |
|---|---|---|---|---|---|
| Class A1 | −1.63% | −2.25% | −2.14% | 137% | 93% |
| Class A2 | −0.84% | −1.73% | −1.13% | 139% | 97% |
| Class B | −0.87% | −1.69% | −2.45% | 140% | 95% |
| Class C | −1.07% | −1.61% | −2.07% | 138% | 101% |
| Class E | −1.40% | −2.17% | −3.09% | 139% | 96% |
| Overall | −1.13% | −1.85% | −2.20% | 139% | 96% |
| Class D | −0.84% | −1.37% | −1.79% | 139% | 96% |
| Class F (optional) | −0.93% | −1.47% | −1.83% | 137% | 97% |

TABLE 56

Random Access Main 10
Over VTM-2.0.1

|  | Y | U | V | EncT | DecT |
|---|---|---|---|---|---|
| Class A1 | −1.01% | −1.50% | −1.97% | 114% | 97% |
| Class A2 | −0.51% | −1.40% | −0.95% | 109% | 97% |
| Class B | −0.49% | −1.68% | −2.19% | 112% | 98% |
| Class C | −0.48% | −0.87% | −1.23% | 114% | 100% |
| Class E |  |  |  |  |  |
| Overall | −0.59% | −1.37% | −1.64% | 113% | 98% |
| Class D | −0.33% | −0.80% | −1.11% | 112% | 93% |
| Class F (optional) | −0.46% | −0.77% | −1.03% | 116% | 98% |

TABLE 57

All Intra Main10
Over VTM-2.0.1

|  | Y | U | V | EncT | DecT |
|---|---|---|---|---|---|
| Class A1 | −1.40% | −2.23% | −2.09% | 95% | 92% |
| Class A2 | −0.54% | −1.73% | −1.17% | 98% | 96% |
| Class B | −0.72% | −1.81% | −2.51% | 96% | 96% |
| Class C | −1.02% | −1.91% | −2.39% | 93% | 97% |
| Class E | −1.26% | −2.01% | −3.08% | 95% | 97% |
| Overall | −0.96% | −1.92% | −2.28% | 95% | 96% |
| Class D | −0.70% | −1.57% | −2.03% | 92% | 94% |
| Class F (optional) | −0.99% | −1.64% | −1.85% | 94% | 95% |

TABLE 58

Random Access Main 10
Over VTM-2.0.1

|  | Y | U | V | EncT | DecT |
|---|---|---|---|---|---|
| Class A1 | −0.95% | −1.48% | −1.78% | 103% | 99% |
| Class A2 | −0.45% | −1.35% | −1.12% | 100% | 98% |
| Class B | −0.43% | −1.52% | −2.05% | 101% | 99% |
| Class C | −0.35% | −1.09% | −1.22% | 101% | 100% |
| Class E |  |  |  |  |  |
| Overall | −0.52% | −1.36% | −1.59% | 101% | 99% |
| Class D | −0.22% | −1.36% | −1.19% | 100% | 93% |
| Class F (optional) | −0.36% | −1.00% | −1.13% | 98% | 99% |

In applying RST, one RST candidate is applied per the transform set, and due to the simplification 1 of the MTS flag according to RST selection and the improvement in the complexity for the worst case, the BD rate, the encoding time, and the decoding time have improved to 1.02%/94%/96% (AI), −0.58%/101%/99% (RA), and −0.28%/100%/99% (LD), respectively. In addition, when configuring one RST candidate per the transform set and applying Simplification 2 with improved complexity for the worst case, the BD rate, the encoding time, and the decoding time have improved to −1.16%/124%/98% (AI), −0.61%/109%/100% (RA), and −0.30%/105%/100% (LD). When Simplification 1 is applied, the memory usage is 10 KB, and when Simplification 2 is applied, the memory usage is 5 KB, a significant BD rate improvements have been achieved with reasonable memory costs and non- or very little increased encoding times.

According to an embodiment, tests 5 to 8 in which MTS signaling is not considered were performed. The configurations for Tests 5 to 8 are as follows, and specific descriptions of (A) to (D) for the configurations of the tests are shown in Table 59.

5) test 5: (A)
6) test 6: (A)+(B)
7) test 7: (A)+(D)+(C)
8) test 8: (A)+(B)+(D)

TABLE 59

| Feature | Description |
|---|---|
| (A) | 4 transform sets (instead of 35). 2 transforms per set. |
| (B) | Restricted RST to allow maximum 8 multiplications/pixel |
| (C) | RST is disabled for 4 × 4 TU. |
| (D) | 16 × 48 matrices are employed instead of 16 × 64 ones. |

The results of the above test are summarized as follows.

As a result of test 5, the encoding time was 128% (AI), 108% (RA), and 104% (LD) when compared with the conventional case (e.g., VTM anchor) that did not apply the above conditions, and the BD rate reduction was −1.59% (AI), −0.88% (RA), and −0.24% (LD).

In addition, as a result of test 6, when compared to VTM anchor, the encoding time was 128% (AI), 108% (RA), and 104% (LD), and the BD rate reduction was −1.40% (AI), −0.76%. (RA), and −0.21% (LD).

In addition, as a result of test 7, the encoding time was 125% (AI), 107% (RA), and 103% (LD) when compared to VTM anchor, and the BD rate reduction was −1.25% (AI), −0.69% (RA), and −0.18% (LD).

In addition, as a result of test 8, when compared to VTM anchor, the encoding time was 129% (AI), 107% (RA), and 104% (LD), and the BD rate reduction was −1.34% (AI), −0.71%. (RA), and −0.18% (LD).

The memory usage of Test 5, Test 6, and Test 7 was measured to be 10 KB, and the memory usage of Test 8 was measured to be 8 KB.

In this experiment, four features were proposed for the secondary transformation.

First, to Apply RST

For the secondary transformation, 4 transform sets are applied instead of 35 transform sets, and the mode mapping for the 4 transform sets is shown in Table 41 below. 16×64 (16×48 in test 8) and 16×16 transform matrices are applied to 8×8 and 4×4 blocks respectively, for convenience, a 16×64 (or 16×48) transform matrix may be specified as RST 8×8, and a 16×16 transform matrix may be specified as RST 4×4.

Second, to Reduce Complexity for the Worst Case

If RST 8×8 and RST 4×4 are used, the worst case for multiplication operation occurs when all transform units are composed of 4×4 transform unit or 8×8 transform unit. Thus, the upper 8×64 and 8×16 parts of the matrix, i. E., from the top of each transform matrix, 8 transform basic vectors are applied to the 4×4 transform unit or the 8×8 transform unit, respectively.

Third, RST Transform Matrix in Reduced Dimension

Test 8 applies a 16×48 transform matrix instead of a 16×64 transform matrix in the same transform set configuration. 48 input data are extracted from the 3 4×4 blocks excluding the bottom right 4×4 block in the most-top 8×8 area of the block to be converted. Due to the reduction in dimension, the memory usage required to store all RST transform matrices has been reduced from 10 KB to 8 KB along with a reasonable level of performance degradation.

Each test result is shown in the table below.

Tables 60 and 61 show the results for Test 5, which applied 4 transform sets and 2 transforms per the transform set. Tables 60 and 61 are the experimental results of turning off the inter MTS (application of MTS to the inter coding unit).

TABLE 60

| | All Intra Main 10 Over VTM-3.0 | | | | |
|---|---|---|---|---|---|
| | Y | U | V | EncT | DecT |
| Class A1 | −1.95% | −3.13% | −2.90% | 127% | 94% |
| Class A2 | −0.93% | −2.39% | −1.97% | 131% | 97% |
| Class B | −1.20% | −2.74% | −3.58% | 128% | 98% |
| Class C | −1.90% | −2.37% | −3.36% | 128% | 100% |
| Class E | −2.14% | −3.25% | −3.99% | 127% | 97% |

TABLE 60-continued

| | All Intra Main 10 Over VTM-3.0 | | | | |
|---|---|---|---|---|---|
| | Y | U | V | EncT | DecT |
| Overall | −1.59% | −2.75% | −3.22% | 128% | 98% |
| Class D | −1.64% | −2.43% | −2.97% | 128% | 101% |
| Class F | −1.85% | −2.01% | −2.36% | 131% | 101% |

TABLE 61

| | Random access Main10 Over VTM-3.0 | | | | |
|---|---|---|---|---|---|
| | Y | U | V | EncT | DecT |
| Class A1 | −1.25% | −2.05% | −2.16% | 110% | 99% |
| Class A2 | −0.71% | −1.50% | −1.28% | 107% | 100% |
| Class B | −0.72% | −2.24% | −3.31% | 107% | 101% |
| Class C | −0.91% | −1.57% | −1.80% | 108% | 101% |
| Class E | | | | | |
| Overall | −0.88% | −1.88% | −2.27% | 108% | 100% |
| Class D | −0.67% | −2.06% | −2.36% | 107% | 100% |
| Class F | −0.98% | −1.32% | −1.67% | 109% | 101% |

Results for Test 6 combining features (A) and (B) are in Tables 62 to 66. Tables 62 to 64 are the experimental results of turning off the inter MTS, Table 65 and Table 66 are the experimental results of turning on the inter MTS.

TABLE 62

| | All Intra Main10 Over VTM-3.0 | | | | |
|---|---|---|---|---|---|
| | Y | U | V | EncT | DecT |
| Class A1 | −1.90% | −3.09% | −2.94% | 127% | 93% |
| Class A2 | −0.85% | −2.23% | −1.76% | 130% | 95% |
| Class B | −1.06% | −2.60% | −3.52% | 128% | 97% |
| Class C | −1.43% | −2.20% | −3.06% | 128% | 99% |
| Class E | −1.99% | −3.02% | −3.90% | 127% | 98% |
| Overall | −1.40% | −2.60% | −3.09% | 128% | 97% |
| Class D | −1.01% | −2.26% | −2.73% | 127% | 101% |
| Class F | −1.39% | −1.94% | −2.27% | 129% | 100% |

TABLE 63

| | Random access Main10 Over VTM-3.0 | | | | |
|---|---|---|---|---|---|
| | Y | U | V | EncT | DecT |
| Class A1 | −1.23% | −1.89% | −2.19% | 110% | 99% |
| Class A2 | −0.66% | −1.51% | −1.30% | 106% | 100% |
| Class B | −0.63% | −2.37% | −3.29% | 107% | 100% |
| Class C | −0.63% | −1.36% | −1.73% | 108% | 101% |
| Class E | | | | | |
| Overall | −0.76% | −1.83% | −2.25% | 108% | 100% |
| Class D | −0.41% | −1.83% | −1.92% | 107% | 101% |
| Class F | −0.65% | −1.14% | −1.46% | 108% | 101% |

TABLE 64

| | Low delay B Main10 Over VTM-3.0 | | | | |
|---|---|---|---|---|---|
| | Y | U | V | EncT | DecT |
| Class A1 | | | | | |
| Class A2 | | | | | |
| Class B | −0.20% | −1.05% | −0.92% | 104% | 96% |
| Class C | −0.20% | −0.53% | −0.43% | 105% | 100% |
| Class E | −0.26% | −0.65% | −1.30% | 102% | 101% |
| Overall | −0.21% | −0.78% | −0.85% | 104% | 98% |
| Class D | −0.11% | −0.28% | −0.59% | 105% | 100% |
| Class F | −0.18% | −0.23% | −0.03% | 105% | 99% |

TABLE 65

| | Random access Main10 over VTM-3.0 | | | | |
|---|---|---|---|---|---|
| | Y | U | V | EncT | DecT |
| Class A1 | −1.28% | −2.04% | −2.29% | 108% | 98% |
| Class A2 | −0.68% | −1.74% | −1.33% | 104% | 98% |
| Class B | −0.67% | −2.47% | −3.15% | 106% | 100% |
| Class C | −0.70% | −1.18% | −1.84% | 105% | 100% |
| Class E | | | | | |
| Overall | −0.80% | −1.89% | −2.27% | 106% | 99% |
| Class D | −0.35% | −1.64% | −1.81% | 106% | 101% |
| Class F | −0.65% | −1.21% | −1.45% | 107% | 100% |

TABLE 66

| | Low delay B Main10 Over VTM-3.0 | | | | |
|---|---|---|---|---|---|
| | Y | U | V | EncT | DecT |
| Class A1 | | | | | |
| Class A2 | | | | | |
| Class B | −0.24% | −0.59% | −1.16% | 103% | 96% |
| Class C | −0.23% | −0.95% | −0.60% | 104% | 100% |
| Class E | −0.27% | −0.40% | −2.10% | 101% | 100% |
| Overall | −0.24% | −0.66% | −1.21% | 103% | 98% |
| Class D | −0.11% | −0.49% | −0.06% | 103% | 100% |
| Class F | −0.27% | −0.33% | 0.14% | 103% | 98% |

Results for Test 7 combining features (A), (B) and (C) are in Tables 67 to 71. Tables 67 to 69 are the experimental results of turning off the inter-MTS, and Tables 70 and 71 are the experimental results of turning on the inter-MTS.

TABLE 67

| | All Intra Main10 Over VTM-3.0 | | | | |
|---|---|---|---|---|---|
| | Y | U | V | EncT | DecT |
| Class A1 | −1.88% | −3.12% | −2.93% | 125% | 94% |
| Class A2 | −0.78% | −2.11% | −1.64% | 128% | 96% |
| Class B | −0.96% | −2.49% | −3.30% | 125% | 97% |
| Class C | −1.10% | −1.87% | −2.49% | 124% | 99% |
| Class E | −1.76% | −3.01% | −3.91% | 124% | 98% |
| Overall | −1.25% | −2.48% | −2.88% | 125% | 97% |
| Class D | −0.67% | −1.65% | −1.87% | 123% | 100% |
| Class F | −1.10% | −1.59% | −1.87% | 124% | 100% |

TABLE 68

| | Random access Main10 Over VTM-3.0 | | | | |
|---|---|---|---|---|---|
| | Y | U | V | EncT | DecT |
| Class A1 | −1.21% | −1.85% | −2.19% | 109% | 99% |
| Class A2 | −0.62% | −1.32% | −1.13% | 106% | 99% |
| Class B | −0.59% | −1.99% | −3.04% | 107% | 101% |
| Class C | −0.48% | −1.08% | −1.34% | 107% | 100% |
| Class E | | | | | |
| Overall | −0.69% | −1.59% | −2.03% | 107% | 100% |
| Class D | −0.26% | −1.34% | −1.34% | 106% | 100% |
| Class F | −0.51% | −0.92% | −1.10% | 107% | 101% |

TABLE 69

| | Low delay B Main10 Over VTM-3.0 | | | | |
|---|---|---|---|---|---|
| | Y | U | V | EncT | DecT |
| Class A1 | | | | | |
| Class A2 | | | | | |
| Class B | −0.22% | −1.10% | −1.19% | 104% | 96% |
| Class C | −0.15% | −0.20% | −0.36% | 105% | 100% |
| Class E | −0.17% | −0.61% | −1.96% | 101% | 101% |
| Overall | −0.18% | −0.68% | −1.11% | 103% | 100% |
| Class D | −0.10% | −0.17% | −0.49% | 104% | 101% |
| Class F | −0.16% | −0.38% | −0.96% | 104% | 99% |

TABLE 70

| | Random access Main10 Over VTM-3.0 | | | | |
|---|---|---|---|---|---|
| | Y | U | V | EncT | DecT |
| Class A1 | −1.26% | −1.78% | −2.19% | 107% | 98% |
| Class A2 | −0.65% | −1.41% | −1.17% | 104% | 98% |
| Class B | −0.63% | −2.10% | −3.00% | 105% | 100% |
| Class C | −0.55% | −1.03% | −1.35% | 105% | 99% |
| Class E | | | | | |
| Overall | −0.74% | −1.61% | −2.03% | 105% | 99% |
| Class D | −0.29% | −1.60% | −1.35% | 105% | 99% |
| Class F | −0.53% | −0.98% | −1.12% | 105% | 100% |

TABLE 71

| | Low delay B Main10 Over VTM-3.0 | | | | |
|---|---|---|---|---|---|
| | Y | U | V | EncT | DecT |
| Class A1 | | | | | |
| Class A2 | | | | | |
| Class B | −0.23% | −0.55% | −1.04% | 103% | 99% |
| Class C | −0.20% | −0.62% | −0.30% | 103% | 100% |
| Class E | −0.24% | −0.82% | −2.70% | 101% | 100% |
| Overall | −0.22% | −0.64% | −1.21% | 102% | 100% |
| Class D | −0.10% | −0.52% | −0.78% | 102% | 96% |
| Class F | −0.28% | −0.51% | −0.51% | 103% | 99% |

Results for Test 8 combining features (A), (B) and (D) are in Tables 72 and 73. Tables 71 to 74 are the experimental results of turning off the inter MTS.

TABLE 72

All Intra Main10
Over VTM-3.0

|  | Y | U | V | EncT | DecT |
|---|---|---|---|---|---|
| Class A1 | −1.89% | −3.01% | −2.80% | 128% | 94% |
| Class A2 | −0.80% | −2.18% | −1.70% | 132% | 96% |
| Class B | −1.03% | −2.46% | −3.33% | 129% | 97% |
| Class C | −1.30% | −2.07% | −3.05% | 128% | 100% |
| Class E | −1.90% | −2.98% | −3.60% | 128% | 97% |
| Overall | −1.34% | −2.50% | −2.95% | 129% | 97% |
| Class D | −0.57% | −2.15% | −2.63% | 128% | 102% |
| Class F | −1.24% | −1.78% | −2.08% | 130% | 100% |

TABLE 73

Random access Main10
Over VTM-3.0

|  | Y | U | V | EncT | DecT |
|---|---|---|---|---|---|
| Class A1 | −1.20% | −1.76% | −1.99% | 109% | 98% |
| Class A2 | −0.60% | −1.44% | −1.18% | 106% | 99% |
| Class B | −0.60% | −1.84% | −2.98% | 107% | 100% |
| Class C | −0.55% | −1.31% | −1.49% | 107% | 100% |
| Class E |  |  |  |  |  |
| Overall | −0.71% | −1.60% | −2.02% | 107% | 100% |
| Class D | −0.39% | −1.64% | −1.77% | 107% | 100% |
| Class F | −0.59% | −1.19% | −1.58% | 106% | 101% |

TABLE 74

Low delay B Main10
Over VTM-3.0

|  | Y | U | V | EncT | DecT |
|---|---|---|---|---|---|
| Class A1 |  |  |  |  |  |
| Class A2 |  |  |  |  |  |
| Class B | −0.18% | −0.84% | −1.16% | 104% | 98% |
| Class C | −0.14% | −0.47% | −0.58% | 105% | 100% |
| Class E | −0.21% | 0.65% | −1.30% | 102% | 100% |
| Overall | −0.18% | −0.35% | −1.00% | 104% | 99% |
| Class D | −0.11% | −0.46% | −0.60% | 105% | 101% |
| Class F | −0.22% | −0.70% | −0.97% | 105% | 100% |

As in Tests 5 to 8, by applying RST to four transform sets consisting of two RST candidates per the transform set without MTS signaling, the BD rate, encoding time and decoding time have improved to 1.59%/128%/97% (AI), −0.88%/108%/100% (RA), and −0.24%/104%/101% (LD) respectively. In addition, by limiting the maximum number of multiplication operations per upper pixel in the region to which the transformation is applied, the BD rate, encoding time, and decoding time have improved to 1.40%/128%/97% (AI) and −0.76%/108%/100% (RA), and −0.21%/104%/98% (LD) respectively. With a reasonable memory cost and an increase in encoding time, the BD rate has improved considerably.

Figure 17:
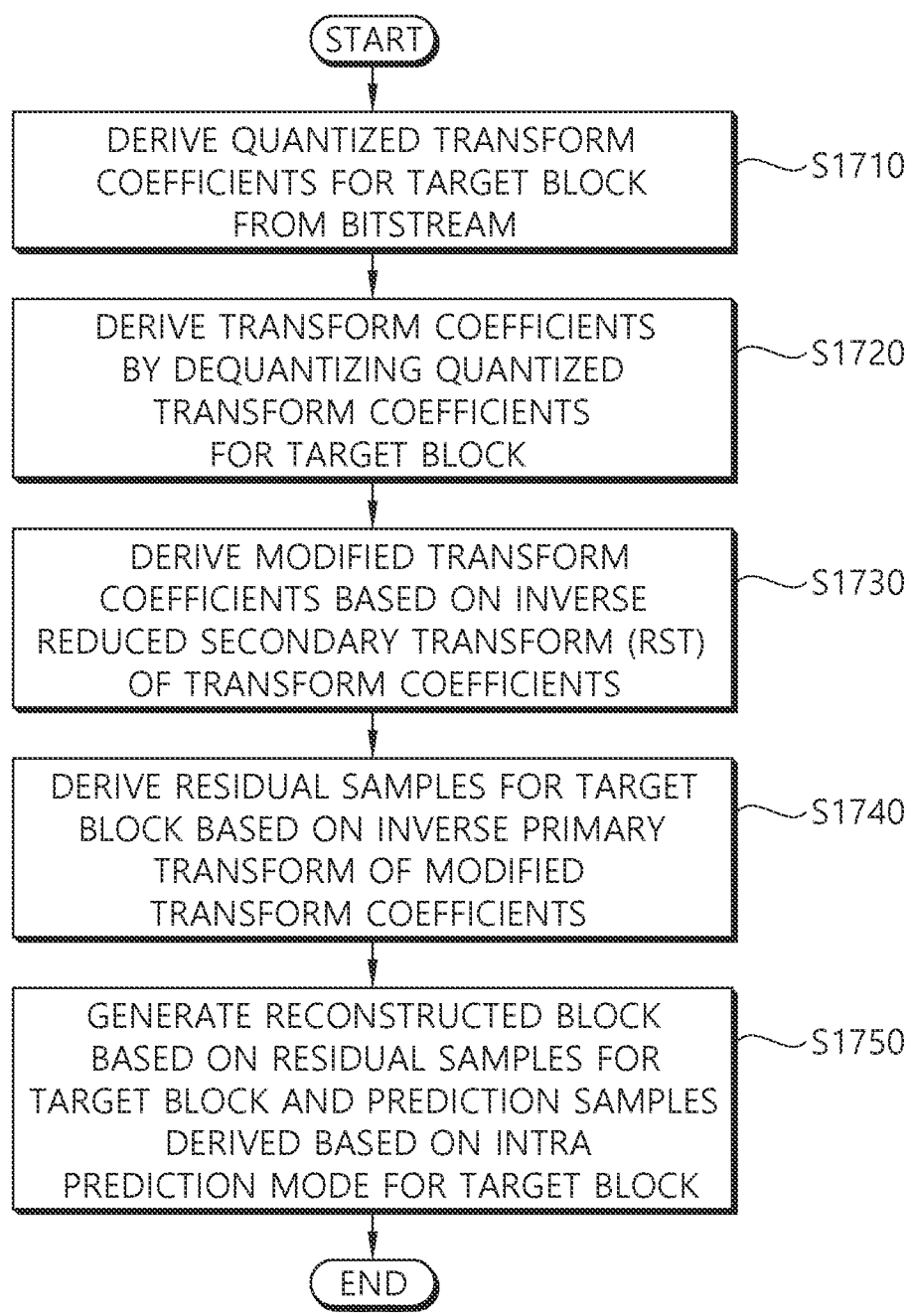
FIG. 17 is a flowchart illustrating an operation of a video decoding apparatus according to an embodiment of the present disclosure.

FIG. 17 is a flowchart illustrating an operation of a video decoding apparatus according to an embodiment of the present disclosure.

Each operation illustrated in FIG. 17 may be performed by the decoding apparatus 300 illustrated in FIG. 3. Specifically, S1710 may be performed by the entropy decoder 310 illustrated in FIG. 3, S1720 may be performed by the dequantizer 321 illustrated in FIG. 3, S1730 and S1740 may be performed by the inverse transformer 322 illustrated in FIG. 3, and S1750 may be performed by the adder 340 illustrated in FIG. 3. Operations according to S1710 to S1750 are based on some of the foregoing details explained with reference to FIG. 4 to FIG. 16. Therefore, a description of specific details overlapping with those explained above with reference to FIG. 3 to FIG. 16 will be omitted or will be made briefly.

The decoding apparatus 300 according to an embodiment may derive quantized transform coefficients for a target block from a bitstream (S1710). Specifically, the decoding apparatus 300 may decode information on the quantized transform coefficients for the target block from the bitstream and may derive the quantized transform coefficients for the target block based on the information on the quantized transform coefficients for the target block. The information on the quantized transform coefficients for the target block may be included in a sequence parameter set (SPS) or a slice header and may include at least one of information on whether a reduced transform (RST) is applied, information on a reduced factor, information on a minimum transform size to which the RST is applied, information on a maximum transform size to which the RST is applied, information on a reduced inverse transform size, and information on a transform index indicating any one of transform kernel matrices included in a transform set.

The decoding apparatus 300 according to an embodiment may derive transform coefficients by dequantizing the quantized transform coefficients for the target block (S1720).

The derived transform coefficients may be arranged according to the reverse diagonal scan order in units of 4×4 blocks, and the transform coefficients in the 4×4 block may also be arranged according to the reverse diagonal scan order. That is, the transform coefficients performed to inverse quantization may be arranged according to the inverse scan order applied in a video codec such as in VVC or HEVC.

The decoding apparatus 300 according to an embodiment may derive modified transform coefficients based on an inverse reduced secondary transform (RST) of the transform coefficients (S1730).

In an example, the inverse RST may be performed based on an inverse RST transform matrix, and the inverse RST transform matrix may be a non square matrix in which the number of columns is less than the number of rows.

In an embodiment, S1730 may include decoding a transform index, determining whether a condition for applying an inverse RST is satisfied based on the transform index, selecting a transform kernel matrix, and applying the inverse RST to the transform coefficients based on the selected transform kernel matrix and/or the reduced factor when the condition for applying the inverse RST is satisfied. In this case, the size of a reduced inverse transform matrix may be determined based on the reduced factor.

The decoding apparatus 300 according to an embodiment may derive residual samples for the target block based on an inverse transform of the modified transform coefficients (S1740).

The decoding apparatus 300 may perform an inverse primary transform on the modified transform coefficients for the target block, in which case a reduced inverse transform may be applied or a conventional separable transform may be used as the inverse primary transform.

The decoding apparatus 300 according to an embodiment may generate reconstructed samples based on the residual samples for the target block and prediction samples for the target block (S1750).

Referring to S1730, it may be identified that the residual samples for the target block are derived based on the inverse RST of the transform coefficients for the target block. From the perspective of the size of the inverse transform matrix, since the size of a regular inverse transform matrix is N×N but the size of the inverse RST matrix is reduced to N×R, it is possible to reduce memory usage in a case of performing the inverse RST by an R/N ratio compared to that in a case of performing a regular transform. Further, using the inverse RST matrix can reduce the number of multiplications (N×R) by the R/N ratio, compared to the number of multiplications N×N in a case of using the regular inverse transform matrix. In addition, since only R transform coefficients need to be decoded when the inverse RST is applied, the total number of transform coefficients for the target block may be reduced from N to R, compared to that in a case where N transform coefficients needs to be decoded when a regular inverse transform is applied, thus increasing decoding efficiency. That is, according to S1730, the (inverse) transform efficiency and decoding efficiency of the decoding apparatus 300 may be increased through the inverse RST.

Figure 18:
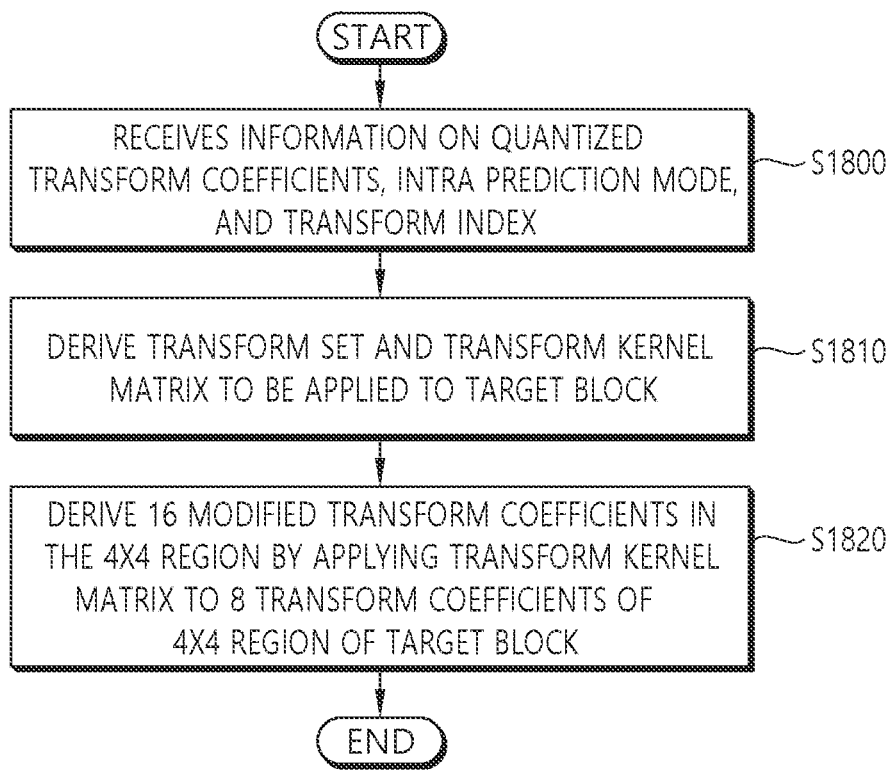
FIG. 18 is a control flowchart illustrating an inverse RST according to an embodiment of the present disclosure.

FIG. 18 is a control flowchart illustrating an inverse RST according to an embodiment of the present disclosure.

The decoding apparatus 300 receives information on quantized transform coefficients, an intra prediction mode, and a transform index through a bitstream (S1800).

Transform coefficients are derived from the quantized transform coefficients received through the bitstream via dequantization as shown in S1720 of FIG. 17.

To apply an inverse RST to the dequantized transform coefficients, a transform set and a transform kernel matrix to be applied to a target block are derived (S1810).

According to an example, the transform set may be derived based on a mapping relationship according to an intra prediction mode for the target block, and a plurality of intra prediction modes may be mapped to one transform set. Each one transform set may include a plurality of transform kernel matrices. A transform index may indicate any one of the plurality of transform kernel matrices. For example, when one transform set includes two transform kernel matrices, the transform index may indicate any one of the two transform kernel matrices.

A syntax element of the transform index according to an embodiment may indicate whether an inverse RST is applied and one of transform kernel matrices included in the transform set. When the transform set includes two transform kernel matrices, the syntax element of the transform index may have three values.

That is, according to an embodiment, the value of the syntax element of the transform index may include 0 indicating that the inverse RST is not applied to the target block, 1 indicating a first transform kernel matrix of the transform kernel matrices, and 2 indicating a second transform kernel matrix of the transform kernel matrices. This information is received as syntax information, and the syntax information is received as a bin string including 0 and 1.

The transform kernel matrix according to an example may be applied to a specified top-left region of the target block, for example, an 8×8 region or a 4×4 region, according to the reduced or simplified size of a secondary transform, and the size of modified transform coefficients output by applying the transform kernel matrix, that is, the number of transform coefficients, may be derived based on the transform index, the intra prediction mode, and the size of the target block to which the secondary transform is applied.

According to an example, when the inverse secondary transformation is applied to a region of the target block, that is, an 8×8 region or a 4×4 region, the inverse secondary transformation can be applied only to some of among transform coefficients included in an 8×8 region or a 4×4 region. For inverse secondary transformation, if only 8 of the transform coefficients of the 4×4 region are input, the transform kernel matrix applied to the 4×4 region is the 16×8 matrix.

According to an example, the 16×8 transform kernel matrix may be a transform kernel matrix based on Table 14. It may be a 16×8 matrix including only 8 columns from the left in a 16×16 matrix matrix obtained by taking a transpose to the matrix of Table 18. When there are 4 transform sets and two transform kernel matrices are included in each transform set, a transform index indicating whether an inverse secondary transform is applied and any one of transform kernel matrices included in the transform set may have a value of 0, 1 and 2. If the transform index is 0, it indicates that the inverse secondary transform is not applied. Therefore, if there are 4 transform sets, all 8 transform kernel matrices can be used for the inverse secondary transform.

As described above, the transform coefficients in a one-dimensional array derived through the dequantization may be subjected to a matrix operation with the transform kernel matrix, thereby deriving modified transform coefficients in a two-dimensional array.

The inverse transformer 321 according to the present embodiment can derive 16 modified transform coefficients in the 4×4 region by applying the transform kernel matrix to some transform coefficients of the 4×4 region to which the forward LFNST of the target block is applied (S1820). For example, the some transform coefficients are up to 8 transform coefficients according to the scanning order from the top-left position in the 4×4 region. Hereinafter, the area in which the 8 transform coefficients are arranged is referred to as the top-left area within the 4×4 region.

According to an embodiment, when any one of the height or width of the target block to which the transform is to be applied is less than 8, for example, the 4×4 transform block, the top 4×4 transform block of the 4×8 transform block, or the left 4×4 transform block of the 8×4 transform block may be applied to the inverse RST with a reduced transform matrix size.

According to an example, when performing the matrix operation between the transform coefficients of the top-left region of the 4×4 region and the transform kernel matrix, 8 of the transform coefficients of the top-left region of the 4×4 region are one-dimensionally arranged according to a forward diagonal scanning order, the transform coefficients of the one-dimensional array may be two-dimensionally arranged in the 4×4 region as shown in Table 12 or Table 13 according to the row-first direction or the column-first direction corresponding to the intra prediction mode applied to the target block after the matrix operation with the transform kernel matrix. That is, the inverse secondary transform can be applied to the 8 transform coefficients in the 4×4 region, and the 16 modified transform coefficients can be derived in the 4×4 region through the operation with the transform kernel matrix.

When the intra prediction mode applicable to the target block is one of 65 directional modes, the intra prediction mode is symmetric around intra prediction mode 34 in the top-left diagonal direction, and the intra prediction mode applied to the target block is one of mode 2 to mode 34 in the left direction with respect to the intra prediction mode 34, the modified transform coefficients are two-dimensionally arranged according to the row-first direction.

If the intra prediction mode applied to the target block is one of mode 35 to mode 66 in the right direction c the intra prediction mode mode 34, the modified transform coefficients may be two-dimensionally arranged according to the column-first direction.

In addition, if the intra prediction mode applied to the target block is the planar mode or the DC mode, the modified transform coefficients may be two-dimensionally arranged according to the row-first direction.

The inverse transformer 322 may apply the inverse RST to generate the modified transform coefficient of the 8×8 region or the 4×4 region as a 2 dimension block, and subsequently apply the inverse primary transformation to the modified transform coefficient of the 2 dimension block.

Figure 19:
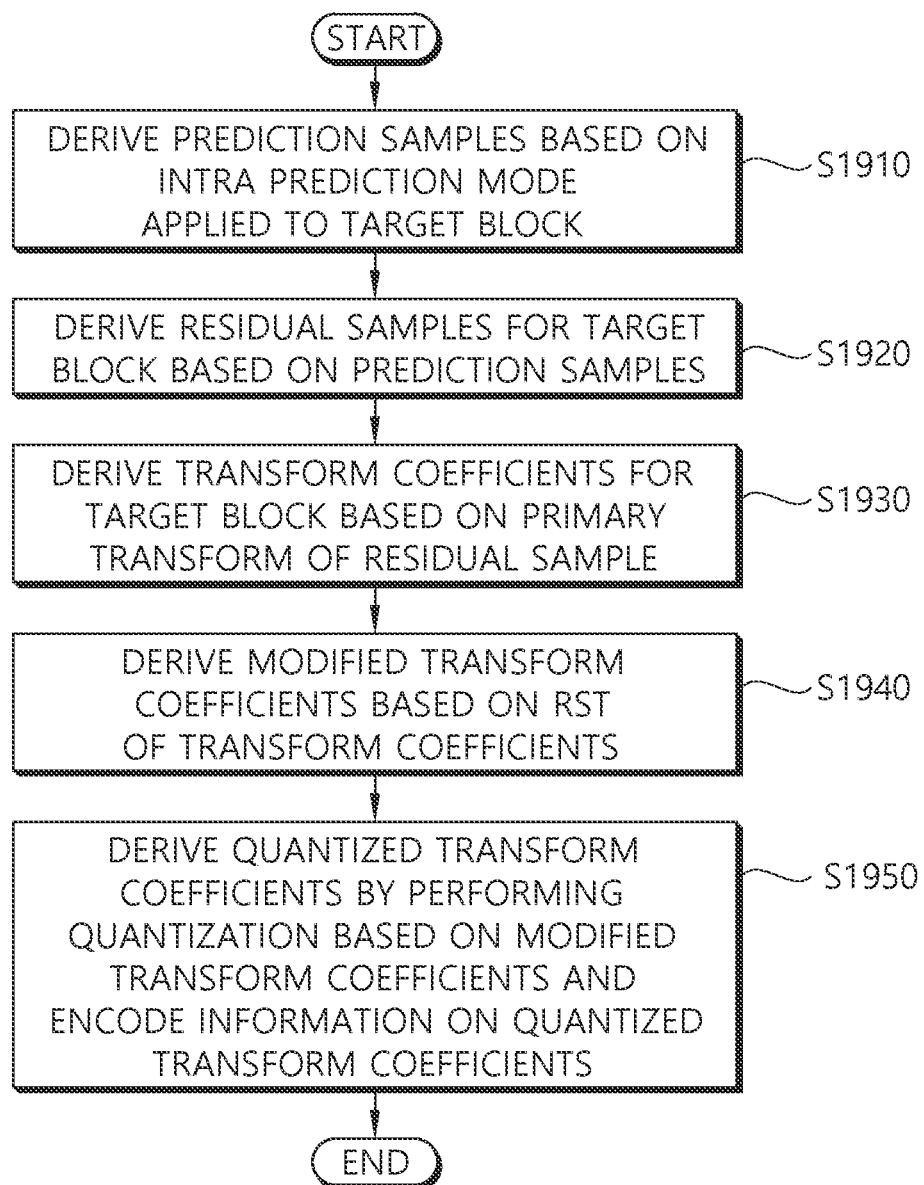
FIG. 19 is a flowchart illustrating an operation of a video encoding apparatus according to an embodiment of the present disclosure.

FIG. 19 is a flowchart illustrating an operation of a video encoding apparatus according to an embodiment of the present disclosure.

Each operation illustrated in FIG. 19 may be performed by the encoding apparatus 200 illustrated in FIG. 2. Specifically, S1910 may be performed by the predictor 220 illustrated in FIG. 2, S1920 may be performed by the subtractor 231 illustrated in FIGS. 2, S1930 and S1940 may be performed by the transformer 232 illustrated in FIG. 2, and S1950 may be performed by the quantizer 233 and the entropy encoder 240 illustrated in FIG. 2. Operations according to S1910 to S1950 are based on some of contents described in FIG. 4 to FIG. 16. Therefore, a description of specific details overlapping with those explained above with reference to FIG. 2, FIG. 4 to FIG. 16 will be omitted or will be made briefly.

The encoding apparatus 200 according to an embodiment may derive prediction samples based on an intra prediction mode applied to a target block (S1910).

The encoding apparatus 200 according to an embodiment may derive residual samples for the target block (S1920).

The encoding apparatus 200 according to an embodiment may derive transform coefficients for the target block based on primary transform of the residual sample (S1930). The primary transform may be performed through a plurality of transform kernels, and the transform kernels may be selected based on the intra prediction mode.

The decoding apparatus 300 may perform a secondary transform, specifically an NSST, on the transform coefficients for the target block, in which case the NSST may be performed based on a reduced transform (RST) or without being based on the RST. When the NSST is performed based on the reduced transform, an operation according to S1940 may be performed.

The encoding apparatus 200 according to an embodiment may derive modified transform coefficients for the target block based on the RST of the transform coefficients (S1940). In an example, the RST may be performed based on a reduced transform matrix or a transform kernel matrix, and the reduced transform matrix may be a non square matrix in which the number of rows is less than the number of columns.

In an embodiment, S1940 may include determining whether a condition for applying the RST is satisfied, generating and encoding the transform index based on the determination, selecting a transform kernel, and applying the RST to the residual samples based on the selected transform kernel matrix and/or a reduced factor when the condition for applying the RST is satisfied. In this case, the size of the reduced transform kernel matrix may be determined based on the reduced factor.

The encoding apparatus 200 according to an embodiment may derive quantized transform coefficients by performing quantization based on the modified transform coefficients for the target block and may encode information on the quantized transform coefficients (S1950).

Specifically, the encoding apparatus 200 may generate the information on the quantized transform coefficients and may encode the generated information on the quantized transform coefficients.

In an example, the information on the quantized transform coefficients may include at least one of information on whether the RST is applied, information on the reduced factor, information on a minimum transform size to which the RST is applied, and information on a maximum transform size to which the RST is applied.

Referring to S1940, it may be identified that the transform coefficients for the target block are derived based on the RST of the residual samples. From the perspective of the size of the transform kernel matrix, since the size of a regular transform kernel matrix is N×N but the size of the reduced transform matrix is reduced to R×N, it is possible to reduce memory usage in a case of performing the RST by an R/N ratio compared to that in a case of performing a regular transform. Further, using the reduced transform kernel matrix can reduce the number of multiplications (R×N) by the R/N ratio, compared to the number of multiplications N×N in a case of using the regular transform kernel matrix. In addition, since only R transform coefficients are derived when the RST is applied, the total number of transform coefficients for the target block may be reduced from N to R, compared to that in a case where N transform coefficients are derived when a regular transform is applied, thus reducing the amount of data transmitted by the encoding apparatus 200 to the decoding apparatus 300. That is, according to S1940, the transform efficiency and coding efficiency of the encoding apparatus 320 may be increased through the RST.

Figure 20:
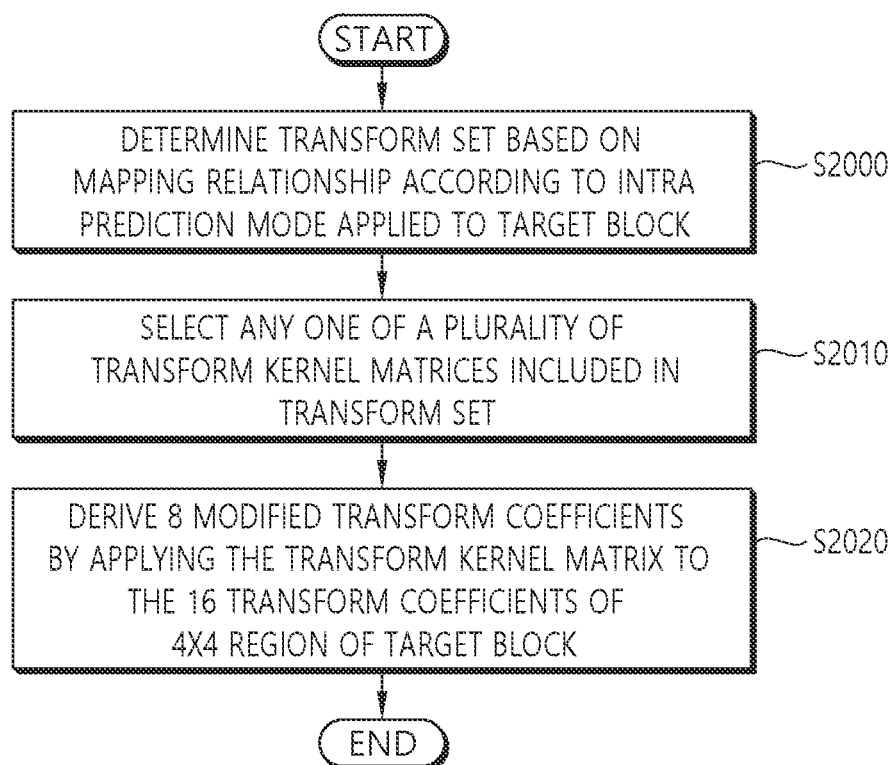
FIG. 20 is a control flowchart illustrating an RST according to an embodiment of the present disclosure.
Figure 21:
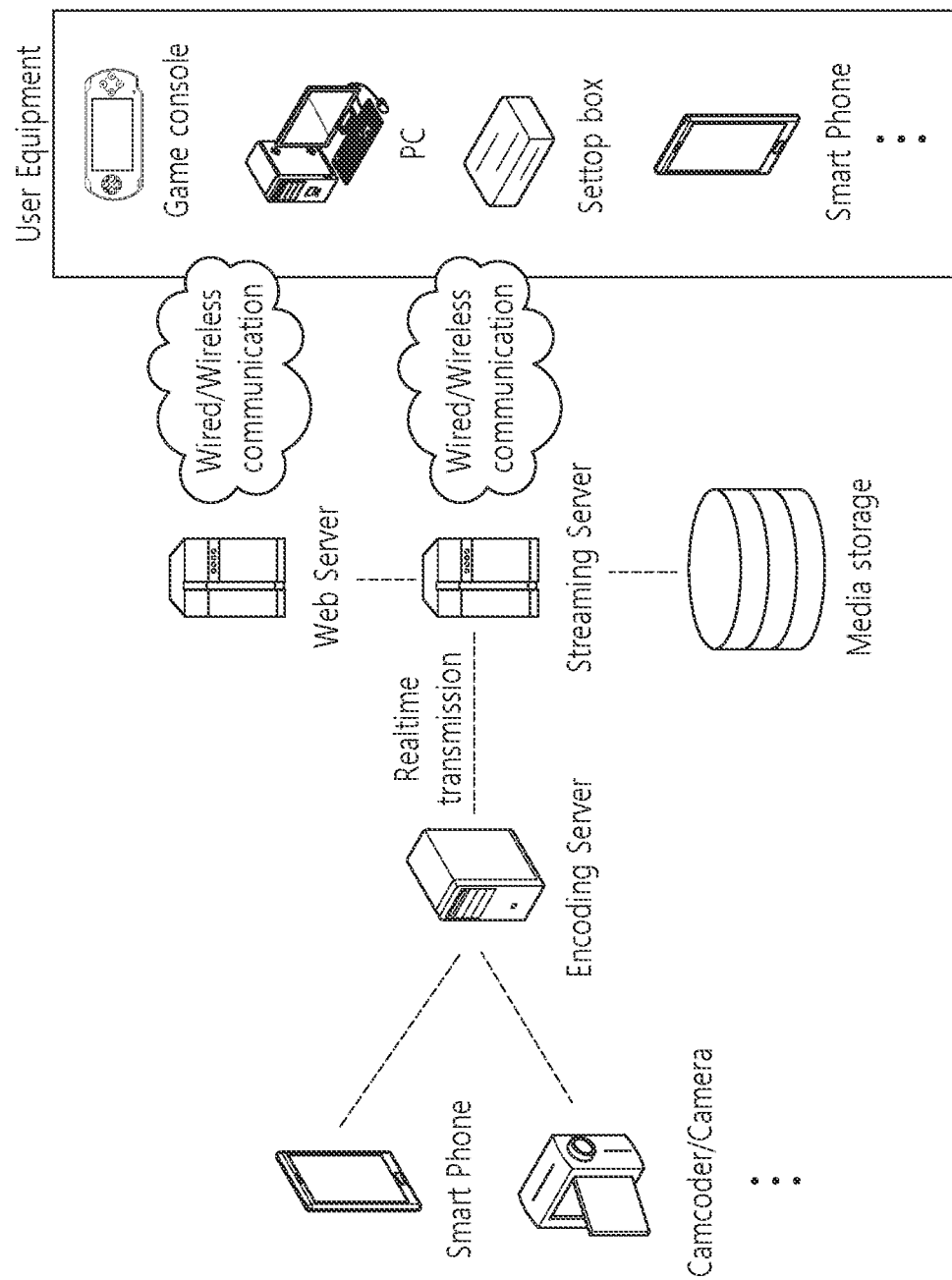
FIG. 21 illustrates the structure of a content streaming system to which the present disclosure is applied.

FIG. 20 is a control flowchart illustrating an RST according to an embodiment of the present disclosure.

First, the encoding apparatus 200 may determine a transform set based on a mapping relationship according to an intra prediction mode applied to a target block (S2000).

The transformer 232 may select any one of a plurality of transform kernel matrices included in the transform set (S2010).

According to an example, the transform set may be derived based on the mapping relationship according to the intra prediction mode of the target block, and a plurality of intra prediction modes may be mapped to one transform set. Each one transform set may include a plurality of transform kernel matrices. When one transform set includes two transform kernel matrices, a transform index indicating any one of the two transform kernel matrices may be encoded and may be signaled to the decoding apparatus.

When two transforms are applied to a residual sample, the residual sample may be referred to as a transform coefficient after being subjected to a primary transform, and may be referred to as a modified transform coefficient after being subjected to the primary transform and then a secondary transform, such as an RST.

According to an example, when the secondary transformation is applied to a region of the target block, that is, an 8×8 region or a 4×4 region, the secondary transformation can be applied only to some of among transform coefficients included in an 8×8 region or a 4×4 region. For example, when the secondary transformation may be apply to only 48 of the transform coefficients of the 8×8 region, the m×64 transform kernel matrix applied to the 8×8 region can be further reduced to the m×48 transform kernel matrix.

According to an example, m may be 16, and the 16×48 transform kernel matrix may be a transform kernel matrix in Table 14. When there are 4 transform sets and two transform kernel matrices are included in each transform set, a transform index indicating whether the inverse secondary transform is applied and any one of transform kernel matrices included in the transform set may have a value of 0, 1 and 2. If the transform index is 0, it indicates that the inverse secondary transform is not applied. Therefore, if there are 4 transform sets, all 8 transform kernel matrices can be used for the inverse secondary transform.

Alternatively, for example, when 8 transform coefficients are generated by applying the secondary transform to the 4×4 region, the m×16 transform kernel matrix may be applied to the 4×4 region. According to an example, m may be 8, and the 8×16 transform kernel matrix may be a matrix including the top 8 rows in Table 18. When there are 4 transform sets and 2 transform kernel matrices are included in each transform set, the transform index, indicating whether the secondary transform is applied and any one of transform kernel matrices included in the transform set, may have 0, 1, 2. If the transform index is 0, it indicates that the secondary transform is not applied. Therefore, if there are 4 transform sets, all 8 transform kernel matrices can be used for the secondary transform.

When performing the RST on transform coefficients using the transform kernel matrix, the transformer 232 one-dimensionally arrange the transform coefficients in a two-dimensional array, which have been subjected to the primary transform, according to either the row-first direction or the column-first direction, based on the intra prediction mode applied to the target block Specifically, The transformer 232 according to this embodiment may derive the 8 modified transform coefficients corresponding to the top-left region of the 4×4 region by applying the transform kernel matrix to the 16 transform coefficients of the 4×4 region of the target block (S2020).

The transform kernel matrix may be applied to a specified top-left region of the target block, for example, an 8×8 region or a 4×4 region or some of the 8×8 region, according to the reduced or simplified size of a secondary transform, and the size of modified transform coefficients output by applying the transform kernel matrix, that is, the number of modified transform coefficients, may be derived based on the size of the transform kernel matrix, the intra prediction mode, and the size of the target block to which the secondary transform is applied.

The two-dimensional transform coefficients to which the RST is applied need to be one-dimensionally arranged for a matrix operation with the transform kernel matrix, and a smaller number of modified transform coefficients than that of transform coefficients may be derived through an operation, such as Equation 6.

That is, the transform coefficients in the two-dimensional array in the specified region may be read in one dimension according to a certain direction, from which modified transform coefficients are derived through the matrix operation with the transform kernel matrix.

According to an example, 16 of the transform coefficients of the 4×4 region to which the transform is applied may be one-dimensionally arranged as shown in Table 12 or Table 13 according to the row-first direction or the column-first direction corresponding to the intra prediction mode applied to the target block, the derived 8 modified transform coefficients may be arranged according to the diagonal scanning direction in the top-left region of the 4×4 region.

When the intra prediction mode applicable to the target block is one of 65 directional modes, the intra prediction mode is symmetric around intra prediction mode 34 in the top-left diagonal direction, and the intra prediction mode applied to the target block is one of mode 2 to mode 34 in the left direction with respect to the intra prediction mode 34, the transform coefficients of the 4×4 region may be one-dimensionally arranged according to the row-first direction as shown in Table 12.

If the intra prediction mode applied to the target block is one of mode 35 to mode 66 in the right direction with respect to the intra prediction mode mode 34, the transform coefficients of the 4×4 region may be one-dimensionally arranged according to the column-first direction as shown in Table 13.

In addition, if the intra prediction mode applied to the target block is the planar mode or the DC mode, the transform coefficients of the 4×4 region may be one-dimensionally arranged according to the row-first direction.

When the RST is performed, information on the RST may be encoded by the entropy encoder 240.

First, the entropy encoder 240 may derive a syntax element value for the transform index indicating any one of the transform kernel matrices included in the transform set, may binarize the derived syntax element value for the transform index, and may encode bins of a syntax element bin string based on context information, that is, a context model, on a bin string of the transform index.

The encoded bin string of the syntax element may be output as a bitstream o the decoding apparatus 300 or to the outside.

In the above-described embodiments, the methods are explained on the basis of flowcharts by means of a series of steps or blocks, but the present disclosure is not limited to the order of steps, and a certain step may be performed in order or step different from that described above, or concurrently with another step. Further, it may be understood by a person having ordinary skill in the art that the steps shown in a flowchart are not exclusive, and that another step may be incorporated or one or more steps of the flowchart may be removed without affecting the scope of the present disclosure.

The above-described methods according to the present disclosure may be implemented as a software form, and an encoding apparatus and/or decoding apparatus according to the disclosure may be included in a device for image processing, such as, a TV, a computer, a smartphone, a set-top box, a display device or the like.

When embodiments in the present disclosure are embodied by software, the above-described methods may be embodied as modules (processes, functions or the like) to perform the above-described functions. The modules may be stored in a memory and may be executed by a processor. The memory may be inside or outside the processor and may be connected to the processor in various well-known manners. The processor may include an application-specific integrated circuit (ASIC), other chipset, logic circuit, and/or a data processing device. The memory may include a read-only memory (ROM), a random access memory (RAM), a flash memory, a memory card, a storage medium, and/or other storage device. That is, embodiments described in the present disclosure may be embodied and performed on a processor, a microprocessor, a controller or a chip. For example, function units shown in each drawing may be embodied and performed on a computer, a processor, a microprocessor, a controller or a chip.

Further, the decoding apparatus and the encoding apparatus to which the present disclosure is applied, may be included in a multimedia broadcasting transceiver, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an over the top (OTT) video device, an Internet streaming service providing device, a three-dimensional (3D) video device, a video telephony video device, and a medical video device, and may be used to process a video signal or a data signal. For example, the over the top (OTT) video device may include a game console, a Blu-ray player, an Internet access TV, a Home theater system, a smartphone, a Tablet PC, a digital video recorder (DVR) and the like.

In addition, the processing method to which the present disclosure is applied, may be produced in the form of a program executed by a computer, and be stored in a computer-readable recording medium. Multimedia data having a data structure according to the present disclosure may also be stored in a computer-readable recording medium. The computer-readable recording medium includes all kinds of storage devices and distributed storage devices in which computer-readable data are stored. The computer-readable recording medium may include, for example, a Blu-ray Disc (BD), a universal serial bus (USB), a ROM, a PROM, an EPROM, an EEPROM, a RAM, a CD-ROM, a magnetic tape, a floppy disk, and an optical data storage device. Further, the computer-readable recording medium includes media embodied in the form of a carrier wave (for example, transmission over the Internet). In addition, a bitstream generated by the encoding method may be stored in a computer-readable recording medium or transmitted through a wired or wireless communication network. Additionally, the embodiments of the present disclosure may be embodied as a computer program product by program codes, and the program codes may be executed on a computer by the embodiments of the present disclosure. The program codes may be stored on a computer-readable carrier.

FIG. 13 illustrates the structure of a content streaming system to which the present disclosure is applied.

Further, the contents streaming system to which the present disclosure is applied may largely include an encoding server, a streaming server, a web server, a media storage, a user equipment, and a multimedia input device.

The encoding server functions to compress to digital data the contents input from the multimedia input devices, such as the smart phone, the camera, the camcoder and the like, to generate a bitstream, and to transmit it to the streaming server. As another example, in a case where the multimedia input device, such as, the smart phone, the camera, the camcoder or the like, directly generates a bitstream, the encoding server may be omitted. The bitstream may be generated by an encoding method or a bitstream generation method to which the present disclosure is applied. And the streaming server may store the bitstream temporarily during a process to transmit or receive the bitstream.

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the contents streaming system may include a separate control server, and in this case, the control server functions to control commands/responses between respective equipment in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like. Each of servers in the contents streaming system may be operated as a distributed server, and in this case, data received by each server may be processed in distributed manner.

What is claimed is:

1. An image decoding method performed by a decoding apparatus, the method comprising:
   obtaining information on an intra prediction mode, information on quantized transform coefficients, and a transform index from a bitstream;
   deriving prediction samples for a target block based on the intra prediction mode of the target block;
   deriving transform coefficients of the target block based on a dequantization for the quantized transform coefficients of the target block;
   deriving modified transform coefficients of the target block based on an inverse non-separable transform using a transform kernel matrix for the transform coefficients;
   deriving residual samples for the target block based on an inverse primary transform for the modified transform coefficients; and
   generating a reconstructed picture based on the prediction samples and the residual samples for the target block,
   wherein the deriving of the modified transform coefficients comprises:
      determining a transform set based on the intra prediction mode of the target block;
      selecting the transform kernel matrix among two transform kernel matrices comprised in the transform set based on the transform index; and
      deriving 16 modified transform coefficients by applying the transform kernel matrix to 8 transform coefficients in a 4×4 region of the target block,
   wherein 65 directional modes among intra prediction modes are symmetric with respect to mode 34 which is an intra prediction mode in the top-left diagonal direction, and
   wherein based on the intra prediction mode of the target block being one of mode 2 to the mode 34 in the left direction with respect to the mode 34, the 16 modified transform coefficients are two-dimensionally arranged in the 4×4 region according to a row-first direction.

2. An image encoding method performed by an encoding apparatus, the method comprising:
   deriving prediction samples based on an intra prediction mode of a target block;
   deriving residual samples for the target block based on the prediction samples;
   deriving transform coefficients of the target block based on a primary transform for the residual samples;

deriving modified transform coefficients of the target block based on a non-separable transform using a transform kernel matrix for the transform coefficients;

deriving quantized transform coefficients of the target block based on a quantization for the modified transform coefficients; and encoding image information including information on the intra prediction mode, information on the quantized transform coefficients, and a transform index related to the transform kernel matrix, wherein the deriving of the modified transform coefficients comprises:

determining a transform set based on the intra prediction mode;

selecting the transform kernel matrix among two transform kernel matrices comprised in the transform set; and deriving 8 modified transform coefficients by applying the transform kernel matrix to 16 transform coefficients in a 4×4 region of the target block, wherein 65 directional modes among intra prediction modes are symmetric with respect to mode 34 which is an intra prediction mode in the top-left diagonal direction, and wherein based on the intra prediction mode of the target block being one of mode 2 to the mode 34 in the left direction with respect to the mode 34, the 16 transform coefficients of the 4×4 region are one-dimensionally arranged according to a row-first direction.

3. A transmission method of data for an image, the method comprising:

obtaining a bitstream for the image, wherein the bitstream is generated based on deriving prediction samples based on an intra prediction mode of a target block, deriving residual samples for the target block based on the prediction samples, deriving transform coefficients of the target block based on a primary transform for the residual samples, deriving modified transform coefficients of the target block based on a non-separable transform using a transform kernel matrix for the transform coefficients, deriving quantized transform coefficients of the target block based on a quantization for the modified transform coefficients, and encoding image information including information on the intra prediction mode, information on the quantized transform coefficients, and a transform index related to the transform kernel matrix; and transmitting the data comprising the bitstream, wherein the deriving of the modified transform coefficients comprises:

determining a transform set based on the intra prediction mode;

selecting the transform kernel matrix among two transform kernel matrices comprised in the transform set; and deriving 8 modified transform coefficients by applying the transform kernel matrix to 16 transform coefficients in a 4×4 region of the target block, wherein 65 directional modes among intra prediction modes are symmetric with respect to mode 34 which is an intra prediction mode in the top-left diagonal direction, and wherein based on the intra prediction mode of the target block being one of mode 2 to the mode 34 in the left direction with respect to the mode 34, the 16 transform coefficients of the 4×4 region are one-dimensionally arranged according to a row-first direction.

\* \* \* \* \*